United States Patent
Peters et al.

(10) Patent No.: US 12,077,337 B2
(45) Date of Patent: Sep. 3, 2024

(54) SYSTEMS AND METHODS FOR SEALING A CONTAINER

(71) Applicant: YUM CONNECT, LLC, Louisville, KY (US)

(72) Inventors: Mark Edwin Peters, New London, WI (US); Kevin Michael Swanson, Larsen, WI (US); Ryan Joseph Schuh, Kimberly, WI (US); Daniel E. Myers, Vancouver, WA (US); Michael Aaron Barger, Camas, WA (US); Robert A. De La O, Battle Ground, WA (US); Jacob Charles Dahl, Menasha, WI (US)

(73) Assignee: Yum Connect, LLC, Louisville, KY (US)

( * ) Notice: Subject to any disclaimer, the term of this patent is extended or adjusted under 35 U.S.C. 154(b) by 481 days.

(21) Appl. No.: 17/329,490

(22) Filed: May 25, 2021

(65) Prior Publication Data

US 2021/0292016 A1 Sep. 23, 2021

Related U.S. Application Data

(63) Continuation-in-part of application No. 16/700,164, filed on Dec. 2, 2019, now Pat. No. 11,472,579.
(Continued)

(51) Int. Cl.
*B65B 7/16* (2006.01)
*B29C 65/00* (2006.01)
(Continued)

(52) U.S. Cl.
CPC .......... *B65B 7/164* (2013.01); *B29C 65/7817* (2013.01); *B29C 66/53461* (2013.01);
(Continued)

(58) Field of Classification Search
CPC ..................................................... B65B 7/164
See application file for complete search history.

(56) References Cited

U.S. PATENT DOCUMENTS

| 370,615 A | 9/1887 | Folger |
|---|---|---|
| 3,279,652 A | 10/1966 | Willvonseder |

(Continued)

FOREIGN PATENT DOCUMENTS

| AU | 48137/93 A | 5/1995 |
|---|---|---|
| AU | 4813793 A | 5/1995 |

(Continued)

OTHER PUBLICATIONS

Clean Step XTC Product website accessed at http://www.cleanstep.pl/technologia on Mar. 24, 2021, 4 pages.
(Continued)

*Primary Examiner* — Lucas E. A. Palmer
(74) *Attorney, Agent, or Firm* — Foley & Lardner LLP

(57) ABSTRACT

Systems, apparatuses, and methods to seal a container are provided. An apparatus for securing a film to a container includes a body portion to house film and a sealing portion. The sealing portion includes a loading zone to receive a portion of film from the body portion and an aperture to receive a top portion of the container and the portion of the film therethrough to enable positioning within a sealing volume. A plurality of near-infrared light emitting diodes (NIR LEDs) face toward and at least partially surround the top portion of the container when positioned within the sealing volume. A controller is configured to receive sensor input from a sensor indicating that the top portion of the container is within the sealing volume and cause, in response thereto, activation of the plurality of NIR LEDs to secure the portion of the film to the top portion of the container.

33 Claims, 39 Drawing Sheets

Related U.S. Application Data

(60) Provisional application No. 62/848,735, filed on May 16, 2019, provisional application No. 62/775,227, filed on Dec. 4, 2018.

(51) Int. Cl.
*B29C 65/78* (2006.01)
*B65B 41/18* (2006.01)
*B65B 51/10* (2006.01)
*B65B 57/02* (2006.01)
*B65B 61/26* (2006.01)
*B29L 31/00* (2006.01)

(52) U.S. Cl.
CPC ............ *B29C 66/849* (2013.01); *B29C 66/98* (2013.01); *B65B 41/18* (2013.01); *B65B 51/10* (2013.01); *B65B 57/02* (2013.01); *B65B 61/26* (2013.01); *B29L 2031/7132* (2013.01)

(56) References Cited

U.S. PATENT DOCUMENTS

| | | | |
|---|---|---|---|
| 3,286,437 A | 11/1966 | Melvin | |
| 3,652,363 A | 3/1972 | Kinslow, Jr. | |
| 3,672,113 A | 6/1972 | Andra | |
| 3,706,175 A | 12/1972 | Anderson | |
| 3,716,963 A | 2/1973 | Amberg | |
| 3,726,453 A | 4/1973 | Shaffer et al. | |
| 3,838,805 A * | 10/1974 | Amberg ............ | B29C 66/24221 53/329.2 |
| 3,844,444 A | 10/1974 | Carroll | |
| 3,861,983 A | 1/1975 | Harrell | |
| 3,979,877 A | 9/1976 | Vetter | |
| 4,007,577 A | 2/1977 | Matthews et al. | |
| 4,035,987 A | 7/1977 | Nakazato | |
| 4,050,971 A | 9/1977 | Verkins | |
| 4,092,817 A * | 6/1978 | Rist, III ............. | B29C 65/7451 220/709 |
| 4,134,248 A * | 1/1979 | Freeman ............ | B29C 65/7841 53/298 |
| 4,184,310 A | 1/1980 | Shelby | |
| 4,345,412 A | 8/1982 | Balzer et al. | |
| 4,354,408 A | 10/1982 | Carte | |
| 4,492,345 A | 1/1985 | Bakker | |
| 4,566,250 A | 1/1986 | Matsumura | |
| 4,590,975 A | 5/1986 | Credle, Jr. | |
| 4,618,073 A | 10/1986 | Bartfield | |
| 4,625,498 A | 12/1986 | Parsons | |
| 4,936,100 A | 6/1990 | Leppa | |
| 4,944,337 A | 7/1990 | Credle, Jr. et al. | |
| 5,041,070 A | 8/1991 | Blaser | |
| 5,042,351 A | 8/1991 | Rosenthal | |
| 5,205,476 A | 4/1993 | Sorenson | |
| 5,221,040 A | 6/1993 | Sorenson | |
| 5,249,410 A * | 10/1993 | Bakker ................ | B29C 66/849 53/329.3 |
| D343,432 S | 1/1994 | Fekete et al. | |
| 5,277,646 A | 1/1994 | Fekete et al. | |
| D345,399 S | 3/1994 | Fekete et al. | |
| D345,400 S | 3/1994 | Fekete et al. | |
| D349,136 S | 7/1994 | Fekete et al. | |
| 5,332,147 A | 7/1994 | Sorenson | |
| 5,390,711 A | 2/1995 | Murphey | |
| 5,507,579 A | 4/1996 | Sorenson | |
| 5,511,360 A | 4/1996 | Bakker | |
| 5,577,370 A | 11/1996 | Pajak et al. | |
| 5,727,609 A | 3/1998 | Knight et al. | |
| 5,993,942 A | 11/1999 | Bakker | |
| 6,021,629 A | 2/2000 | Sterner, Sr. | |
| RE36,876 E | 9/2000 | Daniels | |
| 6,112,539 A | 9/2000 | Colberg | |
| 6,219,996 B1 | 4/2001 | Searle | |
| 6,282,869 B1 | 9/2001 | Bullock | |
| 6,291,037 B1 | 9/2001 | Bakker | |
| 6,334,109 B1 | 12/2001 | Kanevsky | |
| 6,351,928 B2 | 3/2002 | Torre | |
| 6,355,290 B1 | 3/2002 | Soehnlen | |
| 6,564,846 B1 | 5/2003 | Ribi | |
| 6,577,407 B1 | 6/2003 | Kopecki | |
| 6,578,475 B1 | 6/2003 | Siedlaczek | |
| 6,597,969 B2 | 7/2003 | Greenwald | |
| 6,601,760 B1 | 8/2003 | Nardozzi | |
| 6,646,659 B1 | 11/2003 | Brown | |
| 6,739,109 B1 * | 5/2004 | Fan ....................... | B65B 7/2878 53/329.3 |
| 6,739,773 B2 | 5/2004 | Spano | |
| 6,775,472 B2 | 8/2004 | Bakker | |
| 6,793,755 B2 | 9/2004 | Schaupp | |
| 6,802,919 B2 | 10/2004 | Massey | |
| 6,811,080 B1 | 11/2004 | Gold | |
| 6,859,215 B1 | 2/2005 | Brown | |
| 6,881,380 B1 | 4/2005 | Mootz | |
| 6,910,313 B2 | 6/2005 | De | |
| 6,941,980 B2 | 9/2005 | Rocchio | |
| 6,961,710 B1 | 11/2005 | Yanagisawa | |
| 7,040,566 B1 | 5/2006 | Rodrian et al. | |
| 7,050,938 B1 | 5/2006 | Prater | |
| 7,061,379 B2 | 6/2006 | Chen et al. | |
| 7,070,250 B2 | 7/2006 | Lester | |
| 7,089,718 B2 | 8/2006 | Biba | |
| 7,110,964 B2 | 9/2006 | Tengler | |
| 7,123,375 B2 | 10/2006 | Nobutani | |
| 7,124,098 B2 | 10/2006 | Hopson | |
| 7,126,716 B1 | 10/2006 | Kaufman | |
| 7,133,939 B1 | 11/2006 | Desai | |
| 7,182,007 B2 | 2/2007 | Berge | |
| 7,204,069 B2 | 4/2007 | Liao | |
| 7,222,470 B2 | 5/2007 | Ribi | |
| 7,297,969 B1 | 11/2007 | Wolinsky | |
| 7,308,916 B2 | 12/2007 | Akuzawa | |
| 7,344,070 B2 | 3/2008 | Nobutani | |
| 7,370,455 B2 | 5/2008 | Dewey | |
| 7,395,645 B2 | 7/2008 | Biba | |
| 7,401,445 B2 | 7/2008 | Bausch | |
| 7,404,349 B1 | 7/2008 | Fiske | |
| 7,424,443 B2 | 9/2008 | Yanagisawa | |
| 7,460,252 B2 | 12/2008 | Campbell | |
| 7,484,345 B2 | 2/2009 | Woods | |
| 7,510,756 B2 | 3/2009 | Ribi | |
| 7,533,604 B2 | 5/2009 | Halliday | |
| 7,563,339 B2 | 7/2009 | Gill | |
| 7,580,146 B2 | 8/2009 | Halsema | |
| 7,603,827 B2 | 10/2009 | Boyer, Jr. | |
| 7,610,736 B2 | 11/2009 | Von Seggern | |
| 7,644,744 B2 | 1/2010 | Fan | |
| 7,647,249 B2 | 1/2010 | Shroff | |
| 7,648,067 B2 | 1/2010 | Nobutani | |
| 7,689,461 B2 | 3/2010 | Minowa | |
| 7,726,599 B2 | 6/2010 | Lewis et al. | |
| 7,752,146 B2 | 7/2010 | Lert, Jr. | |
| 7,757,896 B2 | 7/2010 | Carpenter | |
| 7,762,181 B2 | 7/2010 | Boland | |
| 7,774,096 B2 | 8/2010 | Goerg et al. | |
| 7,819,489 B2 | 10/2010 | Gambino | |
| 7,908,778 B1 | 3/2011 | Dushane | |
| 7,913,879 B2 | 3/2011 | Carpenter | |
| 7,934,532 B2 | 5/2011 | Ribi | |
| 8,033,452 B2 | 10/2011 | Koakutsu | |
| 8,075,726 B2 | 12/2011 | Nakaya | |
| 8,098,408 B2 | 1/2012 | Sawada | |
| 8,162,181 B2 | 4/2012 | Carpenter | |
| 8,164,785 B2 | 4/2012 | Ferlitsch | |
| 8,175,739 B2 | 5/2012 | Floeder | |
| 8,201,904 B2 | 6/2012 | Vesanto | |
| 8,215,544 B2 | 7/2012 | Koakutsu | |
| 8,224,700 B2 | 7/2012 | Silver | |
| 8,249,946 B2 | 8/2012 | Froseth | |
| 8,264,725 B1 | 9/2012 | Pillutla | |
| 8,266,869 B1 | 9/2012 | Liu | |
| 8,297,471 B2 | 10/2012 | Dooley et al. | |
| 8,327,608 B2 | 12/2012 | Ebitz | |
| 8,381,497 B2 | 2/2013 | Scheibel | |
| 8,445,104 B2 | 5/2013 | Vigunas | |

(56) References Cited

U.S. PATENT DOCUMENTS

| | | |
|---|---|---|
| 8,453,879 B2 | 6/2013 | Carpenter |
| 8,459,542 B2 | 6/2013 | Koakutsu |
| D686,914 S | 7/2013 | Harvey et al. |
| D686,915 S | 7/2013 | Harvey et al. |
| 8,498,899 B2 | 7/2013 | Martucci |
| 8,505,593 B1 | 8/2013 | Denise |
| 8,537,399 B2 | 9/2013 | Chackalackal |
| 8,544,245 B2 | 10/2013 | Ehrmann |
| 8,565,916 B2 | 10/2013 | Zhang |
| 8,607,534 B2 | 12/2013 | Muehlemann |
| 8,616,258 B2 | 12/2013 | Ribi |
| 8,739,840 B2 | 6/2014 | Mattos, Jr. |
| 8,757,222 B2 | 6/2014 | Rudick |
| 8,757,479 B2 | 6/2014 | Clark |
| 8,770,428 B2 | 7/2014 | Brauer |
| 8,800,252 B2 | 8/2014 | Vodonos |
| 8,807,393 B2 | 8/2014 | Carpenter |
| 8,814,042 B2 | 8/2014 | Irudayam |
| 8,839,910 B2 | 9/2014 | Tanaka |
| 8,844,250 B2 | 9/2014 | Nemkov |
| 8,861,016 B2 | 10/2014 | Kodama |
| 8,867,087 B2 | 10/2014 | Takagi |
| 8,869,496 B2 | 10/2014 | Laumer |
| 8,873,096 B2 | 10/2014 | Nishimura |
| 8,887,992 B2 | 11/2014 | Koakutsu |
| 8,888,492 B2 | 11/2014 | Riscalla |
| 8,897,820 B2 | 11/2014 | Marovets |
| 8,913,284 B2 | 12/2014 | Nishimura |
| 8,919,233 B2 | 12/2014 | Lewis et al. |
| 8,928,925 B2 | 1/2015 | Komiyama |
| 8,943,784 B2 | 2/2015 | Iseki |
| 8,944,583 B2 | 2/2015 | Waschnig |
| 9,030,685 B2 | 5/2015 | Shima |
| 9,056,704 B2 | 6/2015 | Carvin |
| 9,067,775 B2 | 6/2015 | Mattos, Jr. |
| 9,073,681 B2 | 7/2015 | Huels |
| 9,096,337 B2 | 8/2015 | Maccagnani |
| 9,117,326 B2 | 8/2015 | Cerveny |
| 9,129,206 B2 | 9/2015 | Furuhata |
| 9,132,929 B2 | 9/2015 | Nash |
| 9,141,562 B2 | 9/2015 | Pickett |
| 9,156,279 B2 | 10/2015 | Shima |
| 9,159,094 B2 | 10/2015 | Hurst |
| 9,180,987 B2 | 11/2015 | Grimm |
| 9,221,275 B2 | 12/2015 | Till |
| 9,221,565 B2 | 12/2015 | Wilcox |
| 9,224,275 B2 | 12/2015 | Nishimura |
| 9,226,513 B2 | 1/2016 | Ream |
| 9,227,830 B2 | 1/2016 | Angus |
| 9,242,754 B2 | 1/2016 | Masuda |
| 9,248,947 B2 | 2/2016 | Georgelos |
| 9,272,534 B2 | 3/2016 | Domeier |
| 9,280,305 B2 | 3/2016 | Takasu |
| 9,280,690 B2 | 3/2016 | Furukawa |
| 9,302,463 B2 | 4/2016 | Heidrich |
| 9,320,373 B2 | 4/2016 | Burke et al. |
| 9,361,550 B2 | 6/2016 | Barros |
| 9,372,644 B2 | 6/2016 | Srinivasmurthy |
| 9,375,927 B1 | 6/2016 | Perego |
| 9,406,084 B2 | 8/2016 | Havas |
| 9,428,329 B2 | 8/2016 | Trombetta |
| 9,434,596 B2 | 9/2016 | Carpenter |
| 9,457,378 B2 | 10/2016 | Morselli |
| 9,463,616 B2 | 10/2016 | Domeier |
| 9,538,877 B2 | 1/2017 | Roberts |
| 9,550,596 B2 | 1/2017 | Sawada |
| 9,585,719 B2 | 3/2017 | Goldstein |
| 9,591,078 B2 | 3/2017 | Nishimura |
| 9,676,207 B2 | 6/2017 | Balar et al. |
| 9,676,504 B2 | 6/2017 | Minnette |
| 9,680,779 B2 | 6/2017 | Marovets |
| 9,689,601 B2 | 6/2017 | Hsu |
| 9,701,530 B2 | 7/2017 | Kline |
| 9,724,948 B2 | 8/2017 | Silbert |
| 9,731,514 B2 | 8/2017 | Eliav |
| 9,764,863 B2 | 9/2017 | Huels |
| 9,766,848 B2 | 9/2017 | Shima |
| 9,815,579 B2 | 11/2017 | Larsson |
| 9,821,922 B2 | 11/2017 | Haimi |
| 9,824,382 B2 | 11/2017 | Holman |
| 9,830,764 B1 | 11/2017 | Murphy |
| 9,845,574 B2 | 12/2017 | Bomstad |
| 9,850,015 B2 | 12/2017 | Hayashi |
| 9,865,023 B2 | 1/2018 | Insolia |
| 9,919,819 B2 | 3/2018 | Scolaro |
| 9,957,081 B2 | 5/2018 | Gayer |
| 9,963,291 B2 | 5/2018 | Karles |
| 9,988,201 B2 | 6/2018 | Darin et al. |
| 9,994,340 B2 | 6/2018 | Angus |
| 10,010,926 B2 | 7/2018 | Billings |
| 10,019,864 B2 | 7/2018 | Tomkins et al. |
| 10,021,874 B2 | 7/2018 | Clark |
| 10,029,836 B2 | 7/2018 | Danenberg |
| 10,029,904 B2 | 7/2018 | Carpenter |
| 10,032,201 B2 | 7/2018 | Hurst |
| 10,035,643 B2 | 7/2018 | Holman |
| 10,045,668 B2 | 8/2018 | Green et al. |
| 10,051,874 B2 | 8/2018 | Carmichael |
| 10,053,280 B2 | 8/2018 | Holman |
| 10,059,473 B2 | 8/2018 | Volby |
| 10,059,498 B2 | 8/2018 | Barton |
| 10,086,602 B2 | 10/2018 | Vilas Boas |
| 10,086,964 B2 | 10/2018 | Thring |
| 10,089,669 B2 | 10/2018 | Hurst |
| 10,106,282 B2 | 10/2018 | Daniel |
| 10,115,142 B2 | 10/2018 | Holman |
| 10,124,614 B1 | 11/2018 | Leo et al. |
| 10,144,225 B2 | 12/2018 | Koers |
| 10,144,541 B2 | 12/2018 | Rea |
| 10,152,841 B2 | 12/2018 | Rendell |
| 10,176,505 B2 | 1/2019 | Holman |
| 10,196,184 B2 | 2/2019 | Keller |
| 10,226,058 B2 | 3/2019 | Ingold |
| 10,252,545 B2 | 4/2019 | Koers |
| 10,262,352 B2 | 4/2019 | Holman |
| 10,269,052 B2 | 4/2019 | Shinkle, II |
| 10,279,600 B2 | 5/2019 | Gertlowski |
| 10,286,684 B2 | 5/2019 | Schach |
| 10,287,039 B2 | 5/2019 | Heyn |
| 10,308,398 B2 | 6/2019 | Miller |
| 10,315,809 B2 | 6/2019 | Shinozaki |
| 10,346,899 B2 | 7/2019 | Holman |
| 10,354,258 B2 | 7/2019 | Marovets |
| 10,384,922 B2 | 8/2019 | Carpenter |
| 10,414,529 B1 | 9/2019 | Bayer |
| 10,464,360 B2 | 11/2019 | Silbert |
| 10,492,626 B2 | 12/2019 | Auda |
| 10,496,961 B2 | 12/2019 | Ophardt |
| 2001/0052219 A1 | 12/2001 | Fan |
| 2002/0004749 A1 | 1/2002 | Froseth |
| 2002/0029855 A1 | 3/2002 | Vasilakes et al. |
| 2002/0032582 A1 | 3/2002 | Feeney |
| 2002/0174025 A1 | 11/2002 | Hind |
| 2003/0012920 A1 | 1/2003 | Bakker |
| 2003/0014305 A1 | 1/2003 | Harden |
| 2003/0015274 A1 | 1/2003 | Mallman |
| 2003/0019188 A1 | 1/2003 | Biba |
| 2003/0021969 A1 | 1/2003 | Aloisi |
| 2003/0033915 A1 | 2/2003 | Glemser |
| 2003/0061922 A1* | 4/2003 | Biba .................... B65B 7/167 |
| | | 83/13 |
| 2003/0065565 A1 | 4/2003 | Wagner |
| 2003/0074254 A1 | 4/2003 | Iijima |
| 2003/0080005 A1 | 5/2003 | Toussant et al. |
| 2003/0110083 A1 | 6/2003 | Taylor |
| 2003/0182154 A1 | 9/2003 | Myers |
| 2003/0200725 A1 | 10/2003 | Aloisi |
| 2003/0228964 A1* | 12/2003 | Biba ................ B65H 23/048 |
| | | 493/81 |
| 2004/0020171 A1* | 2/2004 | Biba ................ B29C 66/652 |
| | | 53/476 |
| 2004/0020172 A1* | 2/2004 | Biba ................. B65H 23/16 |
| | | 53/329.3 |
| 2004/0031242 A1 | 2/2004 | Aloisi |

(56) References Cited

U.S. PATENT DOCUMENTS

| | | |
|---|---|---|
| 2004/0031243 A1 | 2/2004 | Aloisi |
| 2004/0035088 A1 | 2/2004 | Loeffler |
| 2004/0045257 A1 | 3/2004 | Bakker |
| 2004/0068968 A1 | 4/2004 | Biba |
| 2004/0093250 A1 | 5/2004 | Hasegawa |
| 2004/0105126 A1 | 6/2004 | Minowa |
| 2004/0158499 A1 | 8/2004 | Dev |
| 2004/0182503 A1 | 9/2004 | Stadele |
| 2004/0210488 A1 | 10/2004 | Doherty |
| 2004/0238555 A1 | 12/2004 | Parks |
| 2004/0267544 A1 | 12/2004 | Michelson |
| 2005/0006449 A1 | 1/2005 | D'Amato |
| 2005/0015256 A1 | 1/2005 | Kargman |
| 2005/0021407 A1 | 1/2005 | Kargman |
| 2005/0075934 A1 | 4/2005 | Knight |
| 2005/0102179 A1 | 5/2005 | Caplinger |
| 2005/0237556 A1 | 10/2005 | Watkins |
| 2005/0242178 A1 | 11/2005 | Minowa |
| 2005/0247173 A1 | 11/2005 | Alsten |
| 2005/0274092 A1 | 12/2005 | Rohret |
| 2005/0275894 A1 | 12/2005 | Minowa |
| 2006/0010137 A1 | 1/2006 | Johnson |
| 2006/0081653 A1 | 4/2006 | Boland |
| 2006/0089881 A1 | 4/2006 | Landry |
| 2006/0155600 A1 | 7/2006 | Mays |
| 2006/0162284 A1 | 7/2006 | Nakagawa et al. |
| 2006/0178986 A1 | 8/2006 | Giordano |
| 2006/0222429 A1 | 10/2006 | Kurashina |
| 2006/0244989 A1 | 11/2006 | Evans |
| 2007/0056871 A1 | 3/2007 | Griffiths |
| 2007/0094087 A1 | 4/2007 | Mitchell |
| 2007/0150371 A1 | 6/2007 | Gangji |
| 2007/0150996 A1 | 7/2007 | Mccarville |
| 2007/0157559 A1 | 7/2007 | Till |
| 2007/0221728 A1 | 9/2007 | Ferro |
| 2008/0048012 A1 | 2/2008 | Liou |
| 2008/0052158 A1 | 2/2008 | Ferro |
| 2008/0052173 A1 | 2/2008 | Liou |
| 2008/0140500 A1 | 6/2008 | Kurkure |
| 2008/0164274 A1 | 7/2008 | Stettes |
| 2008/0278750 A1 | 11/2008 | Lehotsky |
| 2008/0295659 A1 | 12/2008 | Tobin et al. |
| 2009/0049804 A1 | 2/2009 | Choi |
| 2009/0066996 A1 | 3/2009 | Minowa |
| 2009/0204883 A1 | 8/2009 | Talanis |
| 2009/0287568 A1 | 11/2009 | Cesmedziev |
| 2010/0161521 A1 | 6/2010 | Friend |
| 2010/0223888 A1* | 9/2010 | Aarts .................. B65B 7/02 |
| | | 53/139.1 |
| 2010/0237091 A1 | 9/2010 | Garson |
| 2010/0250234 A1 | 9/2010 | Azimi |
| 2010/0325000 A1 | 12/2010 | Teraoka |
| 2011/0006074 A1 | 1/2011 | Machers |
| 2011/0041464 A1* | 2/2011 | Park .................. B65B 59/003 |
| | | 53/476 |
| 2011/0049180 A1 | 3/2011 | Carpenter |
| 2011/0072764 A1 | 3/2011 | Daniek |
| 2011/0264284 A1 | 10/2011 | Rudick |
| 2011/0315706 A1 | 12/2011 | Lockwood |
| 2012/0012604 A1 | 1/2012 | Pfister |
| 2012/0084154 A1 | 4/2012 | Dresner |
| 2012/0207887 A1 | 8/2012 | Battersby et al. |
| 2012/0239683 A1 | 9/2012 | Starkman |
| 2012/0285986 A1 | 11/2012 | Irvin |
| 2012/0290412 A1 | 11/2012 | Marovets |
| 2012/0306987 A1 | 12/2012 | Kim |
| 2013/0054016 A1 | 2/2013 | Canter |
| 2013/0054695 A1 | 2/2013 | Holman |
| 2013/0146652 A1 | 6/2013 | Koakutsu |
| 2013/0215055 A1 | 8/2013 | Okuma |
| 2014/0000217 A1 | 1/2014 | Granili |
| 2014/0012706 A1 | 1/2014 | Foerster |
| 2014/0022576 A1 | 1/2014 | Shima |
| 2014/0041748 A1 | 2/2014 | Angus |
| 2014/0080102 A1 | 3/2014 | Krishna |
| 2014/0092422 A1 | 4/2014 | Shima |
| 2014/0149937 A1 | 5/2014 | Holliday |
| 2014/0156361 A1 | 6/2014 | Hughes |
| 2014/0165502 A1 | 6/2014 | Wah |
| 2014/0183084 A1 | 7/2014 | Brebion |
| 2014/0201094 A1 | 7/2014 | Herrington |
| 2014/0214561 A1 | 7/2014 | Butler |
| 2014/0244526 A1 | 8/2014 | Georges |
| 2014/0261858 A1 | 9/2014 | Mattos, Jr. |
| 2014/0272020 A1 | 9/2014 | Wilson |
| 2014/0290181 A1 | 10/2014 | Edwards |
| 2014/0293297 A1 | 10/2014 | Nagahara |
| 2014/0312104 A1 | 10/2014 | Kim et al. |
| 2015/0034661 A1 | 2/2015 | Cooper |
| 2015/0083727 A1 | 3/2015 | Smolko |
| 2015/0114923 A1 | 4/2015 | Horz |
| 2015/0181923 A1 | 7/2015 | Holman |
| 2015/0183534 A1 | 7/2015 | Holman |
| 2015/0185974 A1 | 7/2015 | Holman |
| 2015/0186966 A1 | 7/2015 | Holman |
| 2015/0186968 A1 | 7/2015 | Holman |
| 2015/0186969 A1 | 7/2015 | Holman |
| 2015/0186970 A1 | 7/2015 | Holman |
| 2015/0186971 A1 | 7/2015 | Holman |
| 2015/0186981 A1 | 7/2015 | Holman |
| 2015/0187026 A1 | 7/2015 | Holman |
| 2016/0023471 A1 | 1/2016 | Jeter |
| 2016/0201347 A1 | 7/2016 | Lala |
| 2016/0264348 A1 | 9/2016 | Camera |
| 2016/0267567 A1 | 9/2016 | Shinkle, II |
| 2016/0267816 A1 | 9/2016 | Anderson |
| 2016/0304226 A1 | 10/2016 | Rossini |
| 2016/0355282 A1 | 12/2016 | Valli |
| 2016/0355291 A1 | 12/2016 | Mahar et al. |
| 2016/0361886 A1 | 12/2016 | Suzuki et al. |
| 2017/0011319 A1 | 1/2017 | Elliot |
| 2017/0029145 A1 | 2/2017 | Volby |
| 2017/0032448 A1 | 2/2017 | Kitajima |
| 2017/0035183 A1 | 2/2017 | Faverio |
| 2017/0043305 A1 | 2/2017 | Igarashi |
| 2017/0043943 A1 | 2/2017 | Lamb |
| 2017/0087793 A1 | 3/2017 | Mark |
| 2017/0121044 A1 | 5/2017 | Castellari |
| 2017/0190474 A1 | 7/2017 | Miller |
| 2017/0197741 A1 | 7/2017 | Carvin |
| 2017/0210498 A1 | 7/2017 | Jenkins |
| 2017/0210553 A1 | 7/2017 | Burress |
| 2017/0224142 A1 | 8/2017 | Darin et al. |
| 2017/0283101 A1* | 10/2017 | Gorbatenko .......... B65B 51/10 |
| 2017/0283102 A1 | 10/2017 | Strauch |
| 2017/0291746 A1 | 10/2017 | Darin et al. |
| 2017/0305585 A1 | 10/2017 | Rizzi |
| 2017/0305586 A1 | 10/2017 | Rizzi |
| 2017/0310848 A1 | 10/2017 | Iwahara |
| 2017/0325482 A1 | 11/2017 | Deng |
| 2017/0365017 A1 | 12/2017 | Ells |
| 2018/0000266 A1 | 1/2018 | Hulseman et al. |
| 2018/0016038 A1 | 1/2018 | Herlin |
| 2018/0016047 A1* | 1/2018 | Miyamoto ............ B65B 51/26 |
| 2018/0068515 A1 | 3/2018 | Edwards |
| 2018/0099806 A1 | 4/2018 | Li |
| 2018/0108096 A1 | 4/2018 | Insolia |
| 2018/0197163 A1 | 7/2018 | Kelly |
| 2018/0200906 A1 | 7/2018 | Senoo |
| 2018/0215488 A1 | 8/2018 | Sebastian et al. |
| 2018/0218562 A1 | 8/2018 | Conway |
| 2018/0250970 A1 | 9/2018 | Silbert |
| 2018/0253263 A1 | 9/2018 | Hower |
| 2018/0300785 A1 | 10/2018 | Hurst |
| 2018/0312288 A1 | 11/2018 | Hopner |
| 2018/0334275 A1 | 11/2018 | Haupt |
| 2018/0338509 A1 | 11/2018 | Carmichael |
| 2018/0345619 A1 | 12/2018 | Lang |
| 2019/0084266 A1 | 3/2019 | Grünwald |
| 2019/0100339 A1* | 4/2019 | Tanoue ................. B65B 7/2807 |
| 2019/0108708 A1 | 4/2019 | Rendell |
| 2019/0174933 A1 | 6/2019 | Auda |
| 2019/0180392 A1 | 6/2019 | Auda |
| 2019/0182390 A1 | 6/2019 | Auda |

(56) References Cited

U.S. PATENT DOCUMENTS

| | | | |
|---|---|---|---|
| 2019/0193891 A1 | 6/2019 | Livesley-james | |
| 2019/0200799 A1 | 7/2019 | Meshulam | |
| 2019/0291407 A1* | 9/2019 | Schwartzburg | B41F 17/22 |
| 2020/0171760 A1 | 6/2020 | Cittadino et al. | |
| 2020/0172272 A1* | 6/2020 | Cittadino | B29C 66/53461 |
| 2020/0268173 A1 | 8/2020 | Auda | |
| 2021/0292016 A1 | 9/2021 | Peters et al. | |

FOREIGN PATENT DOCUMENTS

| | | | |
|---|---|---|---|
| AU | 2012254875 A1 | 6/2013 | |
| AU | 2015329971 A1 | 4/2017 | |
| AU | 2015329972 A1 | 4/2017 | |
| AU | 2017224048 A1 | 8/2018 | |
| CA | 2681759 A1 | 10/2008 | |
| CA | 2865589 A1 | 9/2013 | |
| CA | 2865590 A1 | 9/2013 | |
| CA | 3047440 A1 | 4/2016 | |
| CA | 3047441 A1 | 4/2016 | |
| CA | 2964046 A1 | 5/2016 | |
| CA | 2865590 A1 | 9/2017 | |
| CA | 2871876 C | 12/2017 | |
| CA | 2983472 C | 6/2018 | |
| CA | 2964930 C | 7/2018 | |
| CA | 3006133 C | 10/2019 | |
| CN | 1924787 A | 3/2007 | |
| CN | 201296476 Y | 8/2009 | |
| CN | 201301001 Y | 9/2009 | |
| CN | 201424140 Y | 3/2010 | |
| CN | 102915601 A | 2/2013 | |
| CN | 103679362 A | 3/2014 | |
| CN | 204197427 U | 3/2015 | |
| CN | 105046339 A | 11/2015 | |
| CN | 105163927 A | 12/2015 | |
| CN | 104443487 B | 4/2016 | |
| CN | 104326121 B | 8/2016 | |
| CN | 205418267 U | 8/2016 | |
| CN | 104326122 B | 2/2017 | |
| CN | 205998190 U | 3/2017 | |
| CN | 107804499 A | 3/2018 | |
| CN | 108021995 A | 5/2018 | |
| EP | 0719227 B1 | 1/1999 | |
| EP | 2605909 B1 | 1/2014 | |
| EP | 3204210 A1 | 8/2017 | |
| EP | 3204211 A1 | 8/2017 | |
| EP | 3377325 A1 | 9/2018 | |
| EP | 2762317 B1 | 3/2019 | |
| JP | S5854474 A | 3/1983 | |
| JP | H06103285 A | 4/1994 | |
| JP | 2001306666 A | 11/2001 | |
| JP | 2002190068 A | 7/2002 | |
| JP | 2003016529 A | 1/2003 | |
| JP | 2005-231716 A | 9/2005 | |
| JP | 2005231716 A | 9/2005 | |
| JP | 2006346869 A | 12/2006 | |
| JP | 2007-161336 A | 6/2007 | |
| JP | 2007161336 A | 6/2007 | |
| JP | 2009-37341 A | 2/2009 | |
| JP | 2009037341 A | 2/2009 | |
| JP | 2014-219855 A | 11/2014 | |
| JP | 2014219855 A | 11/2014 | |
| JP | 2015111390 A | 6/2015 | |
| JP | 5867563 B2 | 1/2016 | |
| JP | 5867564 B2 | 1/2016 | |
| JP | 5867565 B2 | 1/2016 | |
| JP | 5860841 B2 | 2/2016 | |
| JP | 6273815 B2 | 1/2018 | |
| JP | 6390250 B2 | 8/2018 | |
| KR | 93-0007681 A | 5/1993 | |
| KR | 930007681 A | 5/1993 | |
| KR | 950005668 B1 | 5/1995 | |
| KR | 19990011615 U | 3/1999 | |
| KR | 20020074952 A | 10/2002 | |
| KR | 20-0296194 Y1 | 11/2002 | |
| KR | 200296194 Y1 | 11/2002 | |
| KR | 2019-0036782 A | 4/2019 | |
| KR | 20190036782 A | 4/2019 | |
| MX | 2008011202 A | 9/2008 | |
| MX | 2010008550 A | 9/2010 | |
| MX | 2012012504 A | 1/2013 | |
| MX | 2012012505 A | 1/2013 | |
| MX | 2014010241 A | 12/2014 | |
| MX | 2014010242 A | 12/2014 | |
| MX | 347029 B | 4/2017 | |
| MX | 348413 B | 6/2017 | |
| MX | 2017005041 A | 7/2017 | |
| WO | 9509766 A1 | 4/1995 | |
| WO | WO 95/09766 A1 | 4/1995 | |
| WO | 9929508 A1 | 6/1999 | |
| WO | WO 99/29508 A1 | 6/1999 | |
| WO | 03103930 A2 | 12/2003 | |
| WO | WO 03/103930 A2 | 12/2003 | |
| WO | 2011153610 A2 | 12/2011 | |
| WO | WO 2011/153610 A2 | 12/2011 | |
| WO | 2012116823 A1 | 9/2012 | |
| WO | WO 2012/116823 A1 | 9/2012 | |
| WO | 2016055598 A1 | 4/2016 | |
| WO | 2016055599 A1 | 4/2016 | |
| WO | WO 2016/055598 A1 | 4/2016 | |
| WO | WO 2016/055599 A1 | 4/2016 | |
| WO | 2016140197 A1 | 9/2016 | |
| WO | WO 2016/140197 A1 | 9/2016 | |
| WO | 2017134431 A1 | 8/2017 | |
| WO | 2017136771 A1 | 8/2017 | |
| WO | 2017144314 A1 | 8/2017 | |
| WO | WO 2017/134431 A1 | 8/2017 | |
| WO | WO 2017/144314 A1 | 8/2017 | |
| WO | 2017177058 A1 | 10/2017 | |
| WO | 2017178228 A1 | 10/2017 | |
| WO | WO 2017/178228 A1 | 10/2017 | |
| WO | 2017177058 A4 | 11/2017 | |
| WO | 2017207131 A1 | 12/2017 | |
| WO | 2017221077 A2 | 12/2017 | |
| WO | 2018005294 A1 | 1/2018 | |
| WO | 2017221077 A3 | 2/2018 | |
| WO | WO 2017/221077 A3 | 2/2018 | |
| WO | 2018068869 A1 | 4/2018 | |
| WO | 2018108361 A1 | 6/2018 | |
| WO | WO 2018/108361 A1 | 6/2018 | |
| WO | 2018154378 A1 | 8/2018 | |
| WO | WO 2018/154378 A1 | 8/2018 | |
| WO | 2018182114 A1 | 10/2018 | |
| WO | WO 2018/182114 A1 | 10/2018 | |
| WO | 2019042600 A1 | 3/2019 | |
| WO | 2019042686 A1 | 3/2019 | |
| WO | WO 2019/042600 A1 | 3/2019 | |
| WO | WO 2019/042686 A1 | 3/2019 | |
| WO | 2019077524 A1 | 4/2019 | |
| WO | WO 2019/077524 A1 | 4/2019 | |
| WO | 2019118479 A1 | 6/2019 | |
| WO | WO 2019/118479 A1 | 6/2019 | |
| WO | 2019180320 A1 | 9/2019 | |
| WO | WO 2019/180320 A1 | 9/2019 | |
| WO | 2020014183 A1 | 1/2020 | |
| WO | 2020030932 A1 | 2/2020 | |

OTHER PUBLICATIONS

International Search Report and Written opinion for PCT application No. PCT/US2019/064122, mailed on Sep. 8, 2020, 24 pages.
Invitation to Pay Additional Fee received for PCT Patent application No. PCT/US2019/064122, mailed on Mar. 12, 2020, 15 pages.
James, A.J., "Useful for places where you can't take your shoes off", accessed at https://www.linkedin.com/posts/sayed-saif-pmp%C2%AE-837a063b_useful-for-places-where-you-cant-take-your-ugcPost-6770449686890332161-HHwD, retrieved on Mar. 10, 2021, pp. 2.
U.S. Appl. No. 62/463,101, filed Feb. 24, 2017 entitled "Apparatus and Methods for Sealing Open-Topped Containers with Heat-Shrinking Film Material".
International Preliminary Report on Patentability received for PCT Application No. PCT/US2019/064122, mailed on Jun. 17, 2021, 19 pages.

(56) References Cited

OTHER PUBLICATIONS

"Arby's medias on Instagram;" Picgra.; retrieved Mar. 8, 2019 from https://picgra.com/location/arby-s/5760301.
"Fast Food Review: Roast Ham and Swiss Market Fresh Sandwich from Arby's;" posted Jun. 22, 2009; retrieved Mar. 8, 2019 from https://www.grubgrade.com/reviews/fast-food-review-roast-ham-and-swiss-market-fresh-sandwich-from-arbys/.
19Crimes; Living Wine Labels; retrieved Mar. 4, 2019 from https://www.9crimes.com.
Arby's Wrapper obtained at least as early as Dec. 4, 2017; 3 pp.
Cornelius A.B.S. Unit Operator's Manual, Retrieved from the Internet URL: https://www.manualslib.com/manual/1485020/Cornelius-A-B-S-Unit.html, 2 pages.
Final office action for U.S. Appl. No. 17/110,955 mailed on Feb. 3, 2023, 14 pages.
Final office action received for U.S. Appl. No. 17/110,987, mailed on Feb. 3, 2023, 16 pages.
https://dailynews-india.com/environment-first-kfc-turns-printed-food-receipts-into-eco-friendly-napkins/, retrieved Mar. 5, 2020.
International Search Report and Written Opinion received for PCT Application No. PCT/IB2020/061544, mailed on Feb. 8, 2021, 13 Pages.
International Search Report and Written Opinion received for PCT Application No. PCT/US2018/064977, mailed on May 7, 2019, 33 pages.
Introducing Nforme; retrieved Mar. 4, 2019 from https://vimeo.com/305768354/a0a3a40a32?utm_campaign=nForme&utm_source=hs_email&utm_medium=email&utm_content=2&_hsenc=p2ANqtz-_WjXQoyWJwbD7Uo1G3aTzDRWPMz_u5qthtjbyF7QIvSirS2RppnS2JDzW4IsLcvcMO7Dyz9FexkR_jZVYproCT5aoP4w&_hsmi=2.
McDonalds New Equipment Evaluation—All Day Breakfast; retreived Mar. 4, 2019 from https://www.youtube.com/watch?v=CYKgiH9jeCY&feature=youtu.be.
Non-Final office action for U.S. Appl. No. 17/110,955 mailed on Jul. 25, 2022, 11 pages.
Non-Final office action received for U.S. Appl. No. 16/701,453 mailed on Nov. 23, 2021, 16 pages.
Non-final office action received for U.S. Appl. No. 17/110,987, mailed on Aug. 5, 2022, 13 pages.
Quick Serve Restaurants (QSR); Star Micronics; retrieved Apr. 18, 2019 from https://www.starmicronics.com/pages/QuickServiceRestaurantsQSR.
Non-Final Rejection received for U.S. Appl. No. 17/976,884 mailed on Jun. 30, 2023, 9 pages.
James, A.J., "Useful for places where you can't take your shoes off", accessed at https://www.linkedin.com/posts/sayed-saif-prnp%C2%AE-837a063b_useful-for-places-where-you-cant-take-your-ugcPost-6770449686890332161-HHwD, retrieved on Mar. 10, 2021, pp. 2.
International Search Report and Written opinion for PCT application No. PCT/US2019/064122, mailed on Sep. 9, 2020, 24 pages.

* cited by examiner

SYSTEMS AND METHODS FOR SEALING A CONTAINER

CROSS-REFERENCE TO RELATED APPLICATION(S)

This application is a continuation-in-part of U.S. Application Ser. No. 16/700,164, filed Dec. 2, 2019, entitled "Film Securing Apparatus and Method", which claims priority to U.S. Provisional Application No. 62/848,735, entitled "Film Securing Apparatus and Method", filed May 16, 2019, and to U.S. Provisional Application No. 62/775,227, entitled "Film Securing Apparatus and Method", filed Dec. 4, 2018; each of which is incorporated by reference herein in its entirety.

FIELD OF THE INVENTION

Example embodiments of the present invention generally relate to systems and methods for utilizing film to form a seal for a container.

BACKGROUND

A variety of systems to automatically secure lids and the like to containers are known. For example, a number of automatic lid securing devices are known in the beverage industry. However, many automatic lid securing devices are poorly suited for user interaction without extensive training and review of manuals. Further, such lid securing devices are designed for industrial use and not well adaptable for commercial retail space, such as for individual use.

Another shortcoming associated with existing lid sealing devices relates to the limited ability of such systems to accommodate containers of alternate shapes, sizes, and materials. As such, known lid securing devices are commonly tailored to operate with containers having only a single size and shape or a very limited deviation associated with the size and shape of the container. Furthermore, many lid securing devices require containers of a particular material or the use of an adhesive to ensure proper securement of a lid to the container.

There is a need for a film securing device that can be quickly and conveniently configured to provide a seal for containers having various sizes and shapes. Additionally, a need exists to improve the efficiency of such film sealing to meet user demands.

BRIEF SUMMARY

To achieve these and other advantages, and in accordance with the purpose of the disclosed subject matter, as embodied herein and described, the disclosed subject matter includes systems, apparatuses, and methods related to example sealing apparatuses described herein.

Some example embodiments of the present invention provide a film sealing apparatus and corresponding systems and methods that secure film from a supply of film (e.g., a roll of film) over the top of a container. Notably, the container may vary in size and shape, but may still be utilized with example sealing apparatuses. Further, the sealing apparatus may be automated and may simply require a user to position a top portion of a container (e.g., cup, bowl, soup container, tray, etc.) into a sealing portion of the apparatus through an aperture. In response, the sealing apparatus may sense the presence of the container and automatically secure a portion of film over the container—thereby providing an automatic seal. Some such example sealing apparatuses provide a beneficial individual container sealer that can be quickly and easily employed by a user.

In some example embodiments, a portion of film may be cut and positioned within a loading zone in the sealing portion. A user may push the top of the container upwardly into the portion of the film and through the aperture to a sealing volume of the sealing portion. With the top of the container and the portion of the film positioned within the sealing volume, one or more energy-emitting element(s) may activate and cause the film to secure around the opening of the container, such as through heat shrinkage—thereby forming a sealed lid.

In some embodiments, the energy-emitting elements may be a plurality of near-infrared light emitting diodes (NIR LEDs). The NIR LEDs may be placed on printed circuit boards, such as in rows, and operated to cause formation of the seal. The use of NIR LEDs as the energy-emitting elements has shown to provide increased sealing efficiency over halogen light bulbs. This may lead to decreased cycle time—thereby enabling more seals to be created (such as per minute). Another potential benefit is the increased ability to control operation of the power output and/or the specific ones of the NIR LEDs, which may allow variations and unique positioning/placement of the NIR LEDs to further increase efficiency when the seal is formed.

In some embodiments, a support roller for supporting the roll of film supplying the film to the apparatus may be employed, where the support roller is designed to automatically cause alignment of the film laterally as it is pulled off the roll of film and translated along the film path within the sealing apparatus. Notably, depending on manufacturing and/or handling, the rolls of film may not be perfectly straight on their side edge and, thus, as the roll of film rotates on the support roller, the film may come off at different lateral angles leading to a nip (e.g., defined by a drive roller and a pinch roller). However, various components of the sealing apparatus may be positioned and/or designed to operate at a specific lateral position on the film path. For example, a piercer may be positioned to pierce the film at a desired lateral position. Similarly, a printer may be configured to print onto the film at a desired lateral position. If the film comes off the roll of film at an undesirable angle, it could be out of alignment with such components—providing for various inconsistencies (e.g., the film being printed and/or pierced in the wrong place). Accordingly, in some embodiments, the support roller may include an edge shuttle that translates laterally along the axis of the support roller. The edge shuttle may have an engagement feature that interacts with one or more edges of the roll of film. A biasing element (e.g., a spring) may bias the edge shuttle toward the center of the support roller to cause repositioning of the roll of film on the support roller as it rotates—thereby maintaining lateral alignment of the film as it is pulled from the roll of film.

In some embodiments, the roll of film installed in the sealing apparatus may have a radio frequency identification (RFID) tag associated therewith (such as attached to a core of the roll of film). The sealing apparatus may include an RFID read/write system that is configured to read from and write to the RFID tag of the installed roll of film. In some such example embodiments, the sealing apparatus may write to the RFID tag the current estimated amount of film remaining on the roll of film—thereby keeping an updated amount of film remaining with the roll. In that way, if the roll of film is moved to a new sealing apparatus or re-installed (such as after swapping it out with a different roll of film—perhaps for a different product), then the sealing apparatus could read the amount of film remaining for the roll and could keep track accordingly. Such information could be used to help inform a maintainer when the amount of film remaining on the installed roll of film is low and/or enable automatic re-order functionality. In some embodiments, the RFID tag of the installed roll of film may include identification data that enables identification of the film by the sealing apparatus. Such example embodiments may be used to control operation of the sealing apparatus, such as by enabling and/or disabling various features/components of the sealing apparatus. Such functionality may help ensure that proper sealing of the containers is occurring.

In some embodiments, a container presence sensor may be employed proximate the aperture that receives the top portion of the container being sealed. The container presence sensor may be configured to sense the presence of the container and stop or prevent advancement of the film into a loading zone. In this regard, if a container is pushed into the aperture prior to or during advancement of the film into the loading zone (which the container passes through before entering the aperture) the film may jam or bunch, thereby creating a maintenance issue and wasting film—and likely frustrating the user. In some cases, less than the planned amount of film may be brought into the sealing volume and, thus, an improper seal may be formed—which may waste the film and/or create an undesirable situation for a user that is planning on having a proper seal for the container. However, utilizing the container presence sensor, the advancement of film can be stopped or prevented and a corresponding error message may be presented to the user so that they can remove the container from the aperture to allow complete advancement of the film into the loading zone— thereby enabling a proper seal to be formed when the user subsequently moves the container into the sealing volume through the aperture.

In an example embodiment, an apparatus for securing a film to a container is provided herein. The apparatus comprises a body portion to house film and a sealing portion comprising a sealing volume for receiving a top portion of the container and a plurality of near-infrared light emitting diodes (NIR LEDs) positioned within the sealing volume so as to at least partially surround the top portion of the container when the top portion of the container is positioned within the sealing volume. The sealing portion further comprises a sensor configured to sense when the top portion of the container is at least partially positioned within the sealing volume. The sealing portion further comprises a loading zone sized to receive a portion of film from the body portion and position the portion of the film for insertion into the sealing volume with the top portion of the container. The apparatus includes a controller configured to receive sensor input from the sensor indicating that the top portion of the container is at least partially positioned within the sealing volume; and cause, in response thereto, activation of at least one of the plurality of NIR LEDs to secure the portion of the film to the top portion of the container.

In some embodiments, the controller is configured to operate the at least one of the plurality of NIR LEDs for a sealing cycle to secure the portion of film to the top portion of the container. The controller is further configured to adjust energy output of at least one first NIR LED of the plurality of NIR LEDs relative to at least one second NIR LED of the plurality of NIR LEDs during the sealing cycle such that an operation characteristic of the at least one first NIR LED is different than the at least one second NIR LED. The operation characteristic is at least one of an amount of time of operation or a power output.

In some embodiments, the portion of the film defines a rectangular shape with four sides and four corners. The top portion of the container defines a circular shape with a perimeter. The four corners of the portion of the film extend past the perimeter of the circular shape of the top portion a greater distance than a center point along each of the four sides such that there is a relative excess of film past the top portion at each of the four corners. The at least one of the plurality of NIR LEDs comprise at least a first set of edge NIR LEDs and a second set of corner NIR LEDs. The first set of edge NIR LEDs is positioned within the sealing volume proximate at least one center point of one side of the portion of the film. The second set of corner NIR LEDs is positioned within the sealing volume proximate at least one corner of the portion of the film. The controller is configured to operate the at least one of the plurality of NIR LEDs for a sealing cycle to secure the portion of film to the top portion of the container. During the sealing cycle, the controller is configured to operate the first set of edge NIR LEDs differently than the second set of corner NIR LEDs. In some embodiments, during the sealing cycle, the controller is configured to operate the second set of corner NIR LEDs to provide a greater amount of energy to the portion of the film than the first set of edge NIR LEDs so as to provide increased energy to the corners of the portion of the film to encourage increased film shrinking at the corners of the portion of the film. In some embodiments, the controller is configured to operate the second set of corner NIR LEDs for a greater amount of time of operation or at a greater power output than the first set of edge NIR LEDs. In some embodiments, the first set of edge NIR LEDs is positioned within the sealing volume proximate each center point of the four sides of the portion of the film, and the second set of corner NIR LEDs is positioned within the sealing volume proximate each corner of the portion of the film.

In some embodiments, the top portion of the container defines a plane corresponding to a container lip. The at least one of the plurality of NIR LEDs comprise at least a first set of NIR LEDs and a second set of NIR LEDs. The first set of NIR LEDs is positioned within the sealing volume at a first vertical position corresponding to the plane corresponding to the container lip when the top portion of the container is positioned within the sealing volume. The second set of NIR LEDs is positioned within the sealing volume at a second vertical position. The second vertical position is below the first vertical position. The controller is configured to operate the plurality of NIR LEDs for a sealing cycle to secure the portion of film to the top portion of the container. During the sealing cycle, the controller is configured to operate the first set of NIR LEDs differently than the second set of NIR LEDs. In some embodiments, during the sealing cycle, the controller is configured to operate the second set of NIR LEDs to provide a greater amount of energy to the portion of the film than the first set of NIR LEDs so as to provide increased energy below the container lip to encourage increased film shrinking below the container lip. In some embodiments, the controller is configured to operate the second set of NIR LEDs for a greater amount of time of operation or at a greater power output than the first set of NIR LEDS.

In some embodiments, the controller is configured to operate the at least one of the plurality of NIR LEDs according to one of a plurality of operation profiles during a sealing cycle to secure the portion of film to the top portion of the container. The plurality of operation profiles include at least a first operation profile and a second operation profile. An operation characteristic of the first operation profile is different than the second operation profile. The operation characteristic is at least one of an amount of time of operation of one or more of the plurality of NIR LEDs or a power output of the one or more of the plurality of NIR LEDs. In some embodiments, an identification sensor is configured to sense identification data associated with the film housed in the body portion. The controller is configured to determine, based on the identification data, to operate the at least one of the plurality of NIR LEDs according to the first operation profile during the sealing cycle. In some embodiments, a user interface is configured to receive user input. The controller is configured to determine, based on the user input, to operate the at least one of the plurality of NIR LEDs according to the first operation profile during the sealing cycle.

In some embodiments, the controller is configured to operate the at least one of the plurality of NIR LEDs for a sealing cycle to secure the portion of film to the top portion of the container. The controller is configured to operate the at least one of the plurality of NIR LEDs for less than 2 seconds during the sealing cycle to achieve securement of the portion of the film to the top portion of the container.

In some embodiments, the at least one of the plurality of NIR LEDs comprise at least a first set of NIR LEDs and a second set of NIR LEDs. The first set of NIR LEDs is mounted to a first printed circuit board. The second set of NIR LEDs is mounted to a second printed circuit board. The first printed circuit board includes a first thermistor configured to measure temperature corresponding to operation of the first set of NIR LEDs. The second printed circuit board includes a second thermistor configured to measure temperature corresponding to operation of the second set of NIR LEDs. In some embodiments, the controller is configured to prevent or adjust operation of the at least one of the plurality of NIR LEDs in an instance in which the first thermistor or the second thermistor indicate that a temperature is greater than a temperature threshold. In some embodiments, the first printed circuit board further includes a first heat sink, and wherein the second printed circuit board further includes a second heat sink. In some embodiments, a fan is configured to circulate air around the plurality of NIR LEDs. The controller is configured to operate the fan in an instance in which the first thermistor or the second thermistor indicate that a temperature is greater than a temperature threshold.

In some embodiments, each of the plurality of NIR LEDs operates at a wavelength ranging from 0.75 μm-1.4 μm.

In some embodiments, the body portion comprises a support roller configured to hold a roll of film thereon. The support roller comprises a spindle configured to rotate about an axis. The spindle comprises a contact portion that is configured to contact an outer circumferential surface of the roll of film. The support roller further comprises an edge shuttle configured to translate along the axis between a first position and a second position. The edge shuttle defines an engagement feature configured to interact with an edge of the roll of film. A biasing element is configured to bias the edge shuttle toward a center of the support roller.

In some embodiments, the film is housed as a roll of film and comprises a radio frequency identification (RFID) tag. The RFID tag includes supply data comprising a remaining amount of supply of the roll of film. The apparatus further includes an RFID read/write system configured to read the supply data from the RFID tag when the roll of film is housed in the body portion. The controller is configured to: determine an updated remaining amount of supply on the roll of film; and cause the RFID read/write system to update the supply data on the RFID tag of the roll of film with the updated remaining amount of supply on the roll of film.

In another example embodiment, a sealing portion securing a film to a container is provided. The sealing portion comprises a sealing volume for receiving a top portion of the container and a plurality of near-infrared light emitting diodes (NIR LEDs) positioned within the sealing volume so as at least partially surround the top portion of the container when the top portion of the container is positioned within the sealing volume. The sealing portion further includes a sensor configured to sense when the top portion of the container is at least partially positioned within the sealing volume and a loading zone sized to receive a portion of film from the body portion and position the portion of the film for insertion into the sealing volume with the top portion of the container. When the top portion of the container is at least partially positioned within the sealing volume, at least one of the plurality of NIR LEDs are activated to secure the portion of the film to the top portion of the container.

In yet another example embodiment, a method for securing a film to a container is provided, the method comprises providing an apparatus comprising a body portion to house film and a sealing portion. The sealing portion comprises a sealing volume for receiving a top portion of the container and a plurality of near-infrared light emitting diodes (NIR LEDs) positioned within the sealing volume so as to at least partially surround the top portion of the container when the top portion of the container is positioned within the sealing volume. The sealing portion further includes a sensor configured to sense when the top portion of the container is at least partially positioned within the sealing volume and a loading zone sized to receive a portion of film from the body portion and position the portion of the film for insertion into the sealing volume with the top portion of the container. The apparatus further includes a controller. The method further includes receiving sensor input indicating that the top portion of the container is at least partially positioned within the sealing volume; and causing, in response thereto, activation of at least one of the plurality of NIR LEDs to secure the portion of the film to the top portion of the container.

In yet another example embodiment, an apparatus for securing a film to a container is provided. The apparatus comprises a body portion to house a roll of film. The body portion comprises a support roller configured to support the roll of film thereon. The support roller comprises a spindle configured to rotate about an axis. The spindle comprises a contact portion that is configured to contact an outer circumferential surface of the roll of film. The support roller further includes an edge shuttle configured to translate along the axis between a first position and a second position. The edge shuttle defines an engagement feature configured to interact with an edge of the roll of film. The support roller further includes a biasing element configured to bias the edge shuttle along the axis toward a center of the support roller. The apparatus further includes a drive roller and a pinch roller, wherein the drive roller and the pinch roller define a nip that is configured to receive the film from the roll of film therethrough. The apparatus further includes a motor configured to, when operated, drive the drive roller to cause translation of the film along a film path toward a loading zone. The apparatus further includes a sealing portion comprising a sealing volume for receiving a top portion of the container, one or more energy emitting elements, a sensor configured to sense when the top portion of the container is at least partially positioned within the sealing volume, and the loading zone sized to receive a portion of the film from the body portion and position the portion of the film for insertion into the sealing volume with the top portion of the container. The apparatus further includes a controller configured to receive sensor input from the sensor indicating that the top portion of the container is at least partially positioned within the sealing volume and cause, in response thereto, activation of the one or more energy emitting elements to secure the portion of the film to the top portion of the container.

In some embodiments, when the motor is operated and the film is positioned within the nip, the film is pulled off the roll of film supported by the support roller and the roll of film rotates such that a different portion of the outer circumferential surface of the roll of film contacts the contact surface of the spindle. In some embodiments, the edge shuttle is configured to redirect the edge of the roll of film as the roll of film rotates to align the film with the film path. In some embodiments, a piercer is configured to pierce a hole into the film as the film is positioned along the film path. The piercer is in a fixed lateral position with respect to the film path. The edge shuttle is configured to align the film with the film path to ensure that the hole is formed in a desired hole position on the portion of the film that forms a seal with the top portion of the container. In some embodiments, a printer is configured to print onto the film as the film is positioned along the film path. The edge shuttle is configured to align the film with the film path to ensure that printed information is printed in a desired printed position on the portion of the film that forms a seal with the top portion of the container. In some embodiments, the edge shuttle is configured to align the film with the film path to ensure that the film is aligned with a piercer for piercing a hole into the film, a printer for printing onto the film, a cutter for cutting the portion of the film, and the loading zone for receiving the portion of the film.

In some embodiments, the engagement feature defines a flange that extends radially away from the axis.

In some embodiments, the engagement feature defines a tapered surface, wherein a slope of the tapered surface leads toward the center of the roll of film to utilize gravity to aid in redirecting the edge of the roll of film.

In some embodiments, the edge shuttle defines a first edge shuttle and the edge of the roll of film defines a first edge of the roll of film, wherein the biasing element defines a first biasing element. The support roller further comprises a second edge shuttle configured to translate along the axis, wherein the second edge shuttle defines a second engagement feature configured to interact with a second edge of the roll of film. The second edge is opposite the first edge of the roll of film. The support roller further includes a second biasing element configured to bias the second edge shuttle along the axis toward the center of the roll of film.

In some embodiments, the edge shuttle is configured to freely rotate with respect to the spindle.

In some embodiments, the motor comprises at least one motor that is configured to operate to drive rotation of the drive roller and the support roller. The drive roller defines a smaller diameter than the support roller such that the drive roller operates with a faster rate of turn than the support roller so as to cause tension in the film being pulled along the film path.

In some embodiments, the motor is further configured to operate to drive rotation of the spindle.

In some embodiments, the pinch roller is configured to move between an engaged position with the drive roller to form the nip and an unengaged position spaced therefrom. The body portion comprises a cover that is configured to move between an open position and a closed position. When the cover moves to the open position, the pinch roller is configured to automatically move to the unengaged position so as to enable loading of film onto the drive roller.

In yet another example embodiment, a support roller configured to support a roll of film thereon for use in securing film from the roll of film to a container is provided. The support roller comprises a spindle configured to rotate about an axis, wherein the spindle comprises a contact portion that is configured to contact an outer circumferential surface of the roll of film. The support roller further comprises an edge shuttle configured to translate along the axis between a first position and a second position. The edge shuttle defines an engagement feature configured to interact with an edge of the roll of film. The support roller further includes a biasing element configured to bias the edge shuttle along the axis toward a center of the support roller.

In some embodiments, the engagement feature defines a flange that extends radially away from the axis.

In some embodiments, the engagement feature defines a tapered surface, wherein a slope of the tapered surface leads toward the center of the support roller to utilize gravity to aid in redirecting the edge of the roll of film.

In some embodiments, the edge shuttle defines a first edge shuttle and the edge of the roll of film defines a first edge of the roll of film. The biasing element defines a first biasing element. The support roller further comprises a second edge shuttle configured to translate along the axis. The second edge shuttle defines a second engagement feature configured to interact with a second edge of the roll of film. The second edge is opposite the first edge of the roll of film. The support roller further includes a second biasing element configured to bias the second edge shuttle along the axis toward the center of the support roller.

In yet another example embodiment, an apparatus for securing a film to a container is provided. The apparatus comprises a body portion to house a roll of film, wherein the roll of film comprises a radio frequency identification (RFID) tag. The RFID tag includes supply data comprising a remaining amount of supply of the roll of film. The apparatus further includes a drive roller and a pinch roller, wherein the drive roller and the pinch roller define a nip that is configured to receive the film from the roll of film therethrough. The apparatus further includes a motor configured to, when operated, drive the drive roller to cause translation of the film along a film path toward a loading zone. The apparatus further includes an RFID read/write system configured to read the supply data from the RFID tag when the roll of film is housed in the body portion. The apparatus further includes a sealing portion comprising a sealing volume for receiving a top portion of the container, one or more energy emitting elements, a sensor configured to sense when the top portion of the container is at least partially positioned within the sealing volume, and the loading zone sized to receive a portion of the film from the body portion and position the portion of the film for insertion into the sealing volume with the top portion of the container. The apparatus further includes a controller configured to: operate the motor to cause advancement of the portion of the film into the loading zone; determine an updated remaining amount of supply on the roll of film; and cause the RFID read/write system to update the supply data on the RFID tag of the roll of film with the updated remaining amount of supply on the roll of film.

In some embodiments, the RFID tag includes film identification data. The controller is further configured to receive, via the RFID read/write system, the identification data corresponding to an installed roll of film; and cause, based on the identification data, at least one of enabling operation of one or more components of the apparatus, disabling operation of the one or more components of the apparatus, or revised operation of the one or more components of the apparatus.

In yet another example embodiment, an apparatus for securing a film to a container is provided. The apparatus comprises a body portion to house a roll of film, a drive roller, and a pinch roller. The drive roller and the pinch roller define a nip that is configured to receive the film from the roll of film therethrough. The apparatus further includes a motor configured to, when operated, drive the drive roller to cause translation of the film along a film path toward a loading zone. The apparatus further includes a sealing portion comprising a sealing volume for receiving a top portion of the container, one or more energy emitting elements, and the loading zone sized to receive a portion of the film from the body portion and position the portion of the film for insertion into the sealing volume with the top portion of the container. The apparatus further includes a container presence sensor positioned within or below the aperture or the sealing volume and configured to sense presence of the container. The apparatus further includes a controller configured to receive sensor input from the container presence sensor indicating the presence of the container proximate the aperture; and cause, in response thereto, at least one of cessation or prevention of operation of the motor to prevent further advancement of the film into the loading zone while the container is proximate the aperture.

In some embodiments, the container presence sensor is a first sensor. The sealing portion comprises a second sensor configured to sense when the top portion of the container is at least partially positioned within the sealing volume. The controller is further configured to receive sensor input from the second sensor indicating that the top portion of the container is at least partially positioned within the sealing volume; and cause, in response thereto, activation of the one or more energy emitting elements to secure the portion of the film to the top portion of the container.

In some embodiments, the container presence sensor comprises a break beam sensor.

In some embodiments, the container presence sensor comprises a reflection sensor.

In some embodiments, the container presence sensor comprises a light curtain sensor.

Some additional embodiments include apparatuses, systems, and methods including various example embodiments, such as described herein.

BRIEF DESCRIPTION OF THE DRAWINGS

Figure 1:
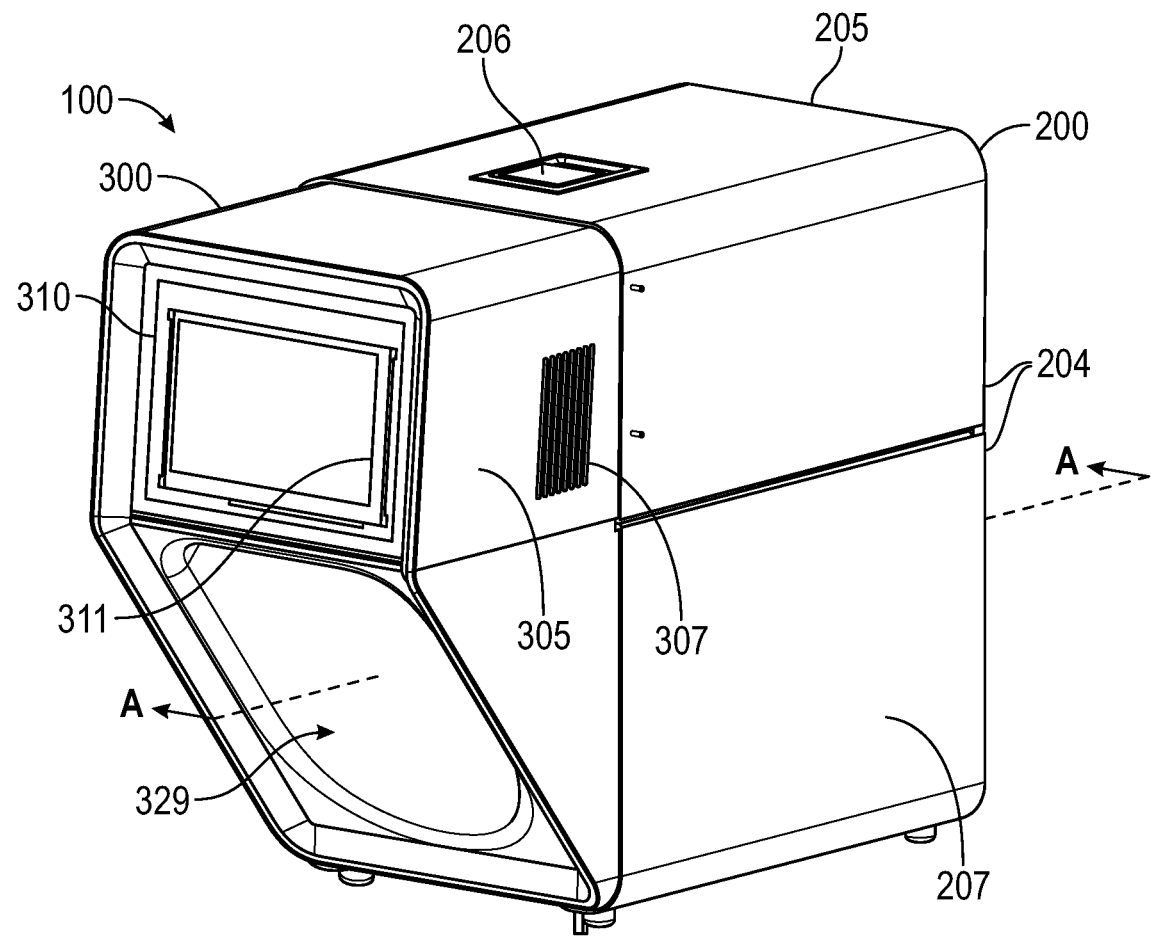

Having thus described the invention in general terms, reference will now be made to the accompanying drawings, which are not necessarily drawn to scale, and wherein:

FIG. 1 is a top perspective view of an example sealing apparatus, in accordance with some embodiments described herein.

Figure 2:
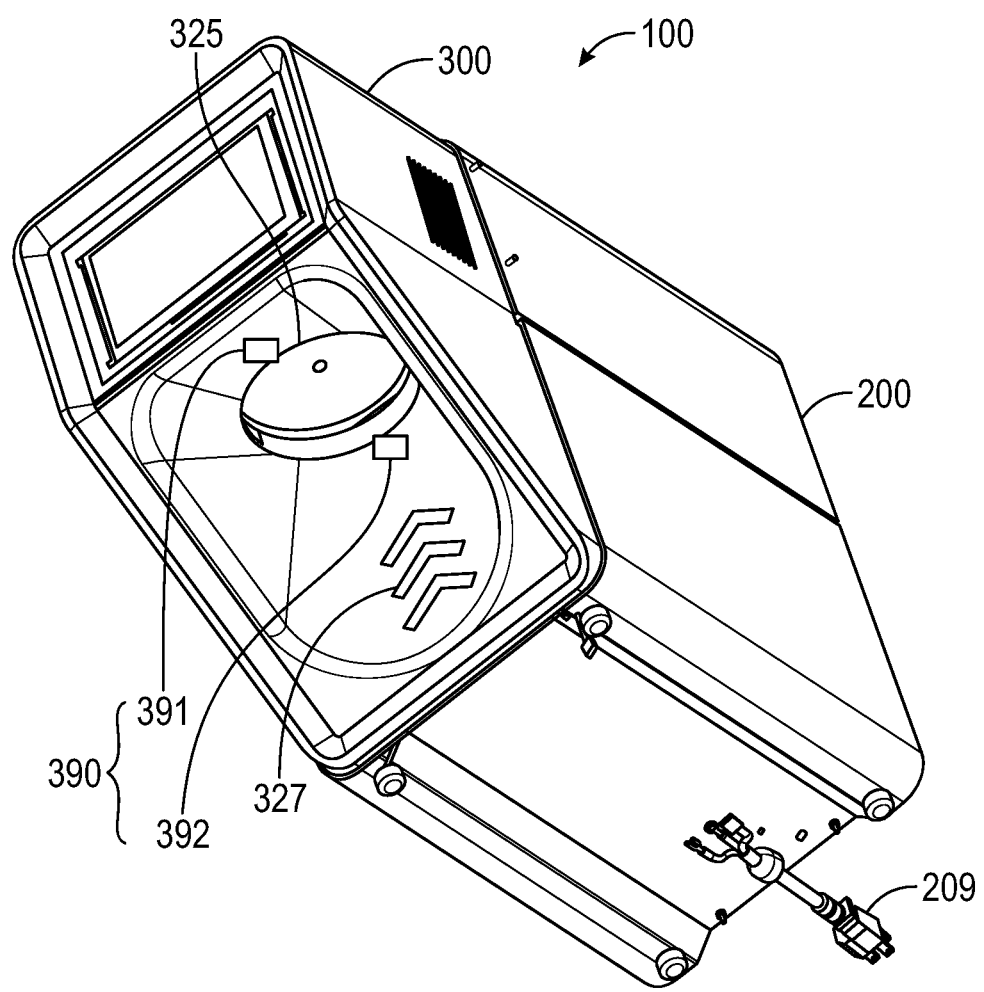

FIG. 2 is a bottom perspective view of the example sealing apparatus shown in FIG. 1, in accordance with some embodiments described herein.

Figure 3:
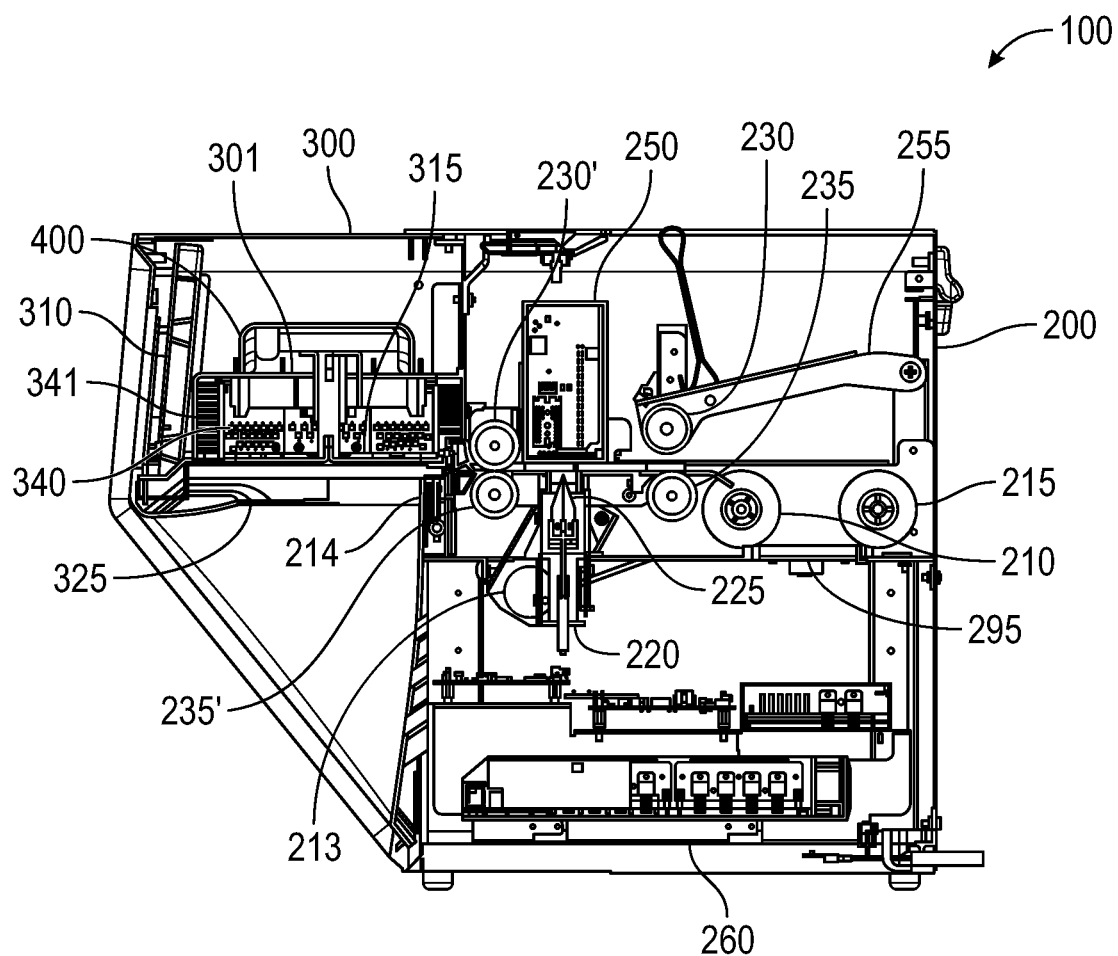

FIG. 3 is a cross-sectional side view of the example sealing apparatus shown in FIG. 1 taken along line A-A, in accordance with some embodiments described herein.

Figure 4:
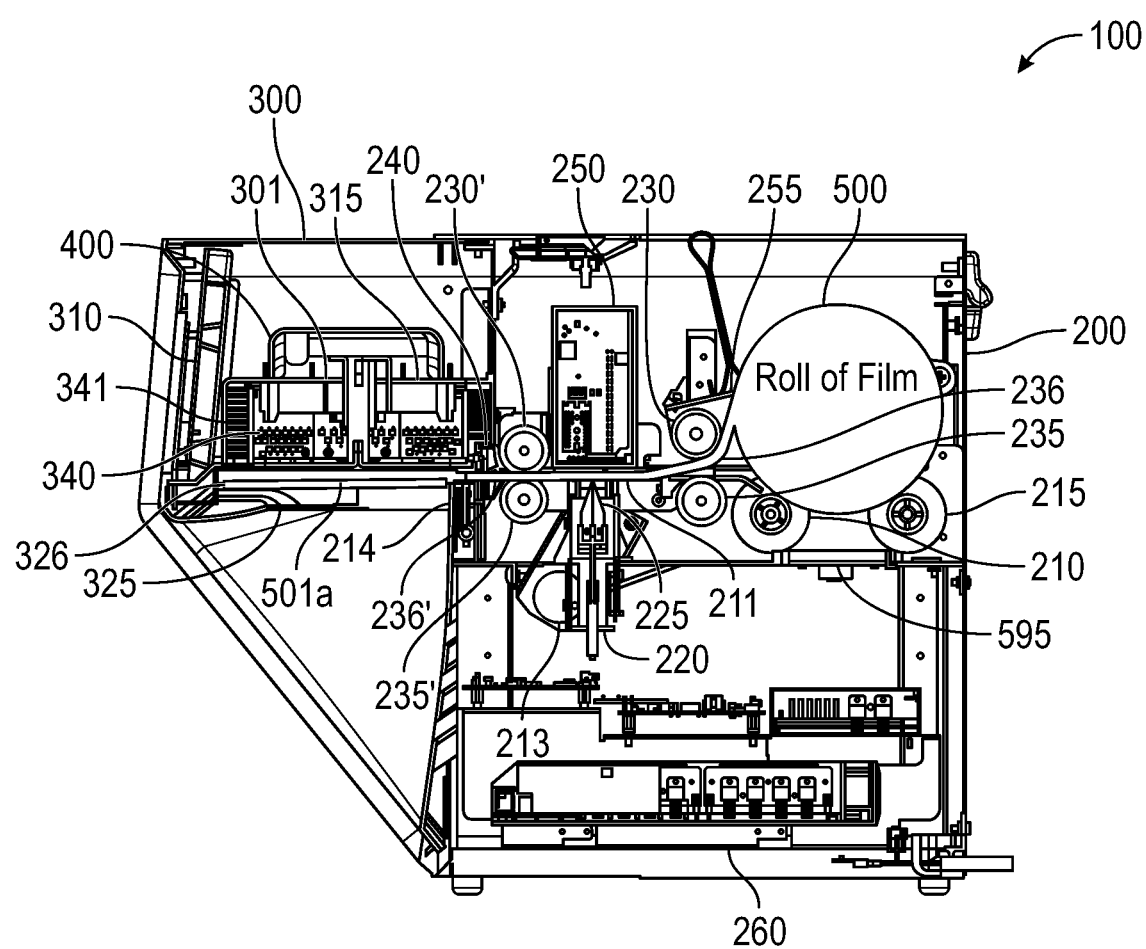

FIG. 4 is a cross-sectional side view of the example sealing apparatus shown in FIG. 1 taken along line A-A, wherein a roll of film is installed within the sealing apparatus and a portion of the film is ready for sealing, in accordance with some embodiments described herein.

Figure 5:
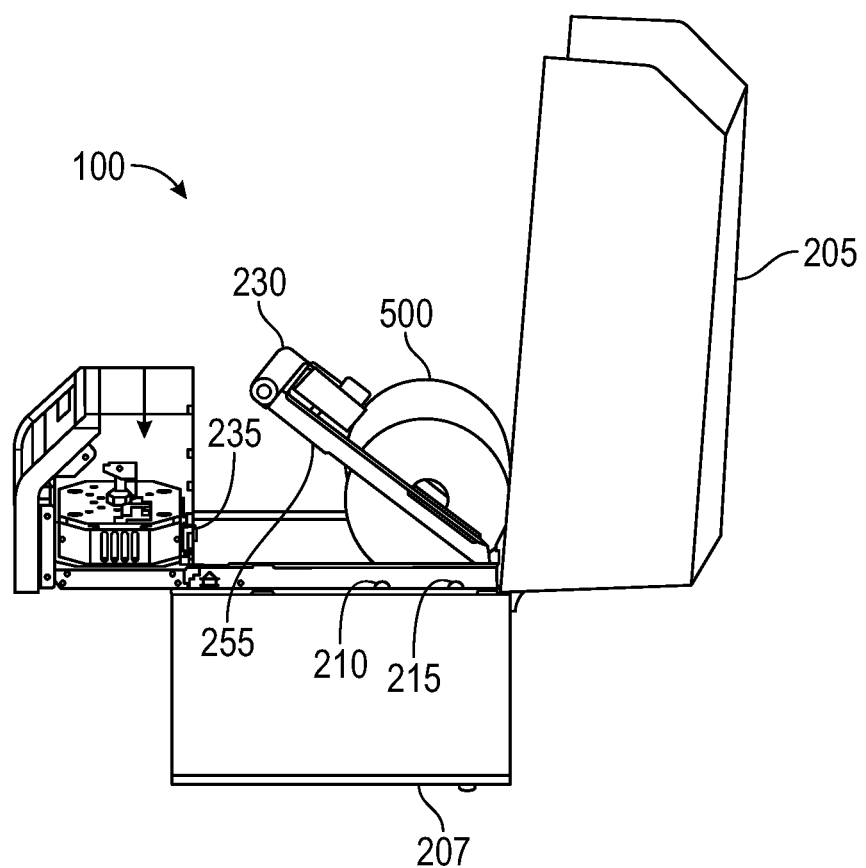

FIG. 5 is a side view of the example sealing apparatus shown in FIG. 1 with a body cover in an opened position, wherein an arm is also in the opened position, in accordance with some embodiments described herein.

Figure 6:
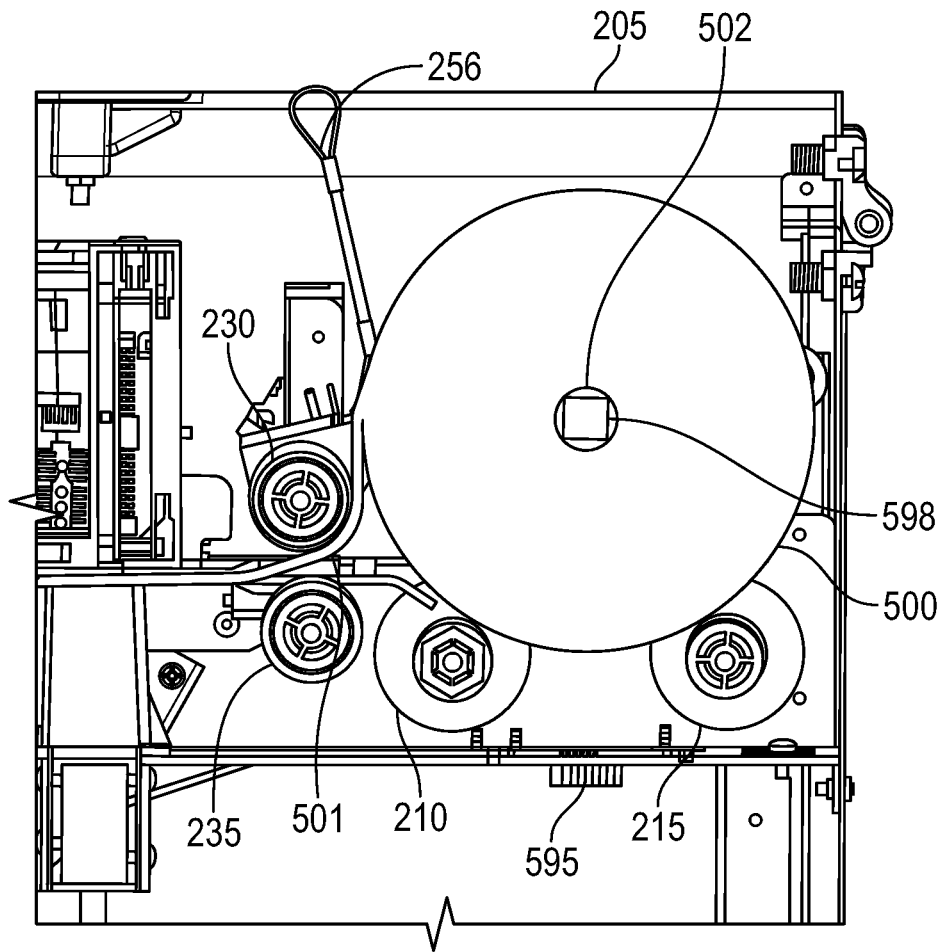

FIG. 6 is a close-up view of a roll of film loaded into the example sealing apparatus of FIG. 1, in accordance with some embodiments described herein.

Figure 7:
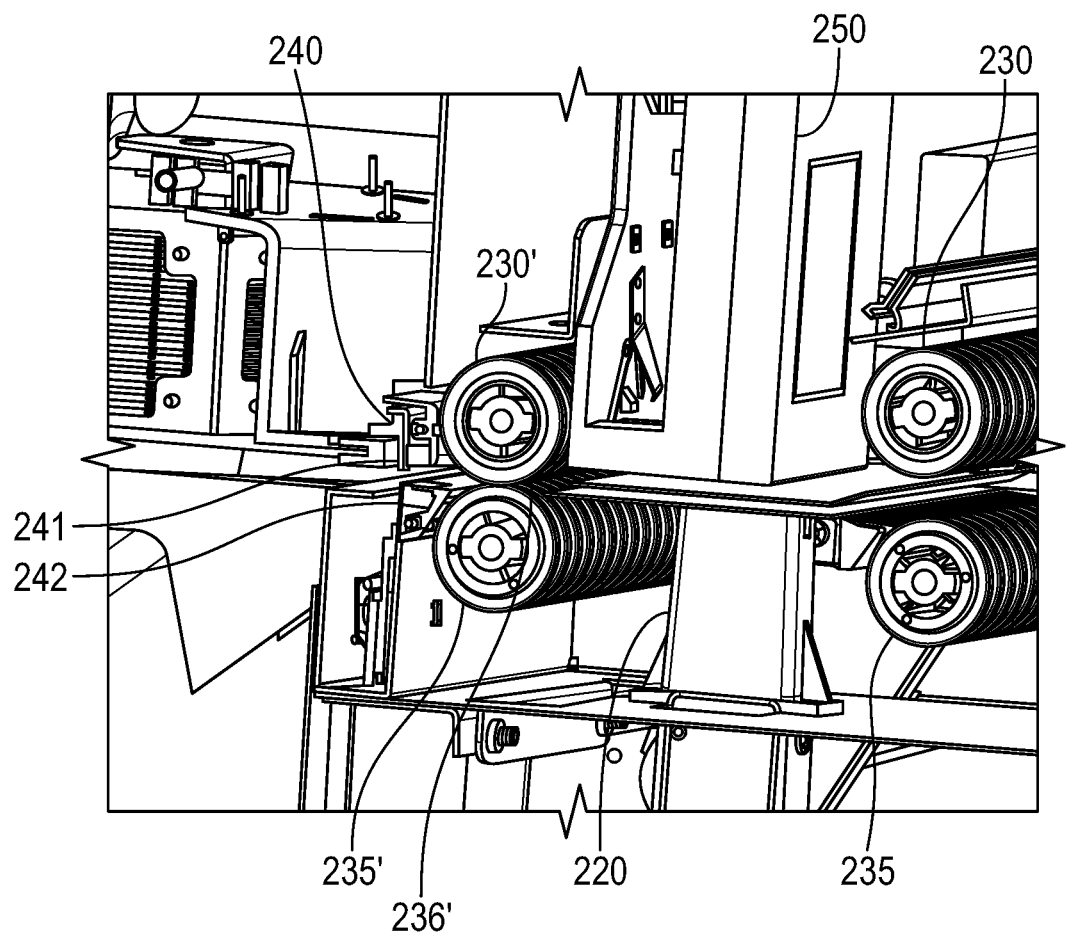

FIG. 7 is a close-up view of a portion of the example sealing apparatus shown in FIG. 1, wherein example nips are shown, in accordance with some embodiments described herein.

Figure 8:
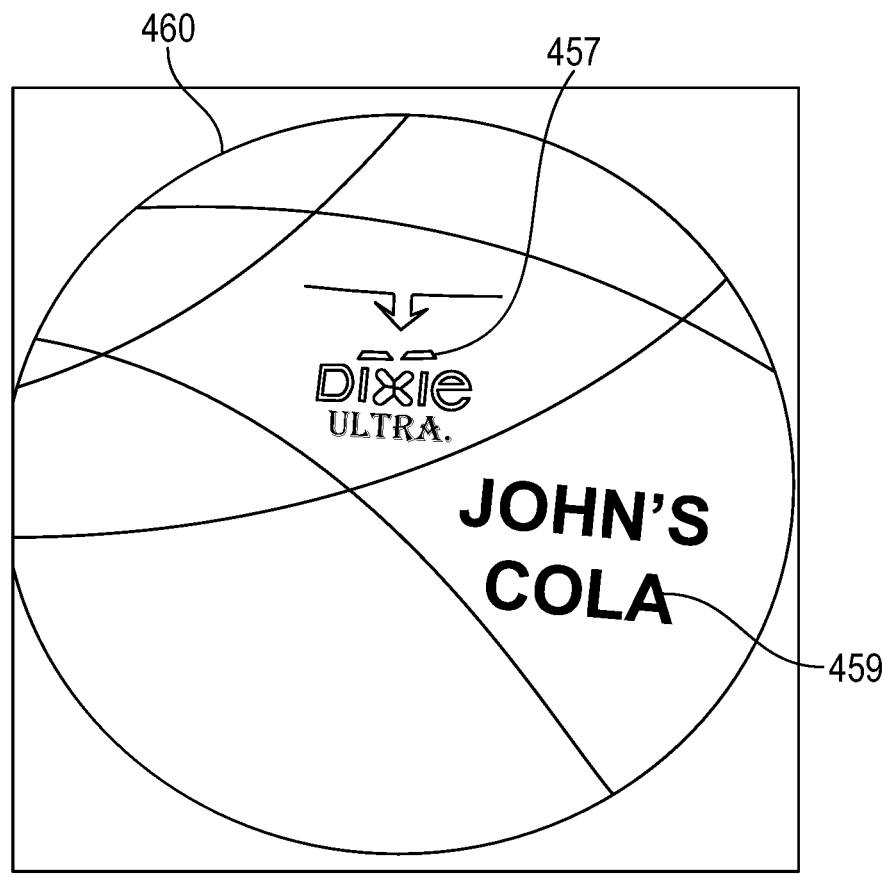
Figure 9:
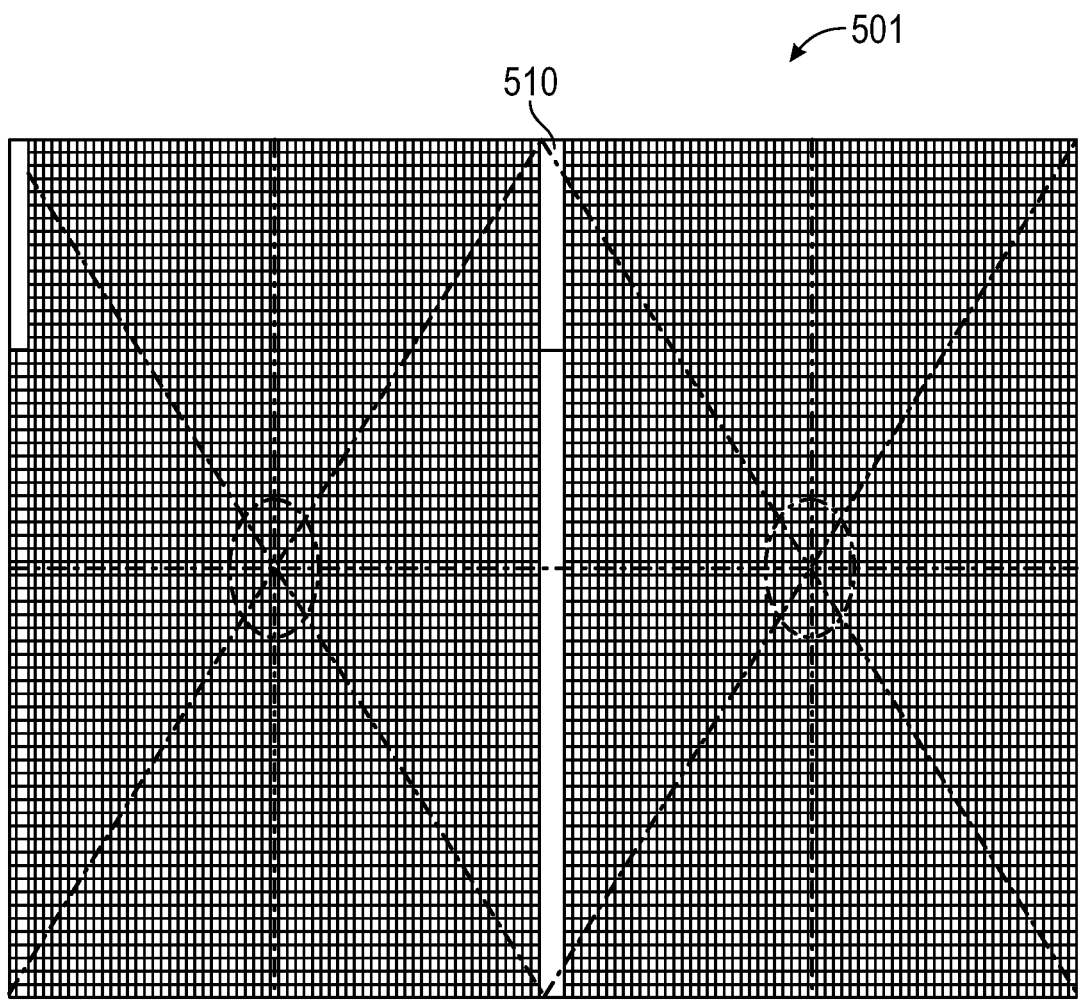

FIG. 8 is a top view of an example sealed container with a customized message printed on the lid, in accordance with some embodiments described herein FIG. 9 is a top view of a portion of an example film usable with the example sealing apparatus shown in FIG. 1, in accordance with some embodiments described herein.

Figure 10:
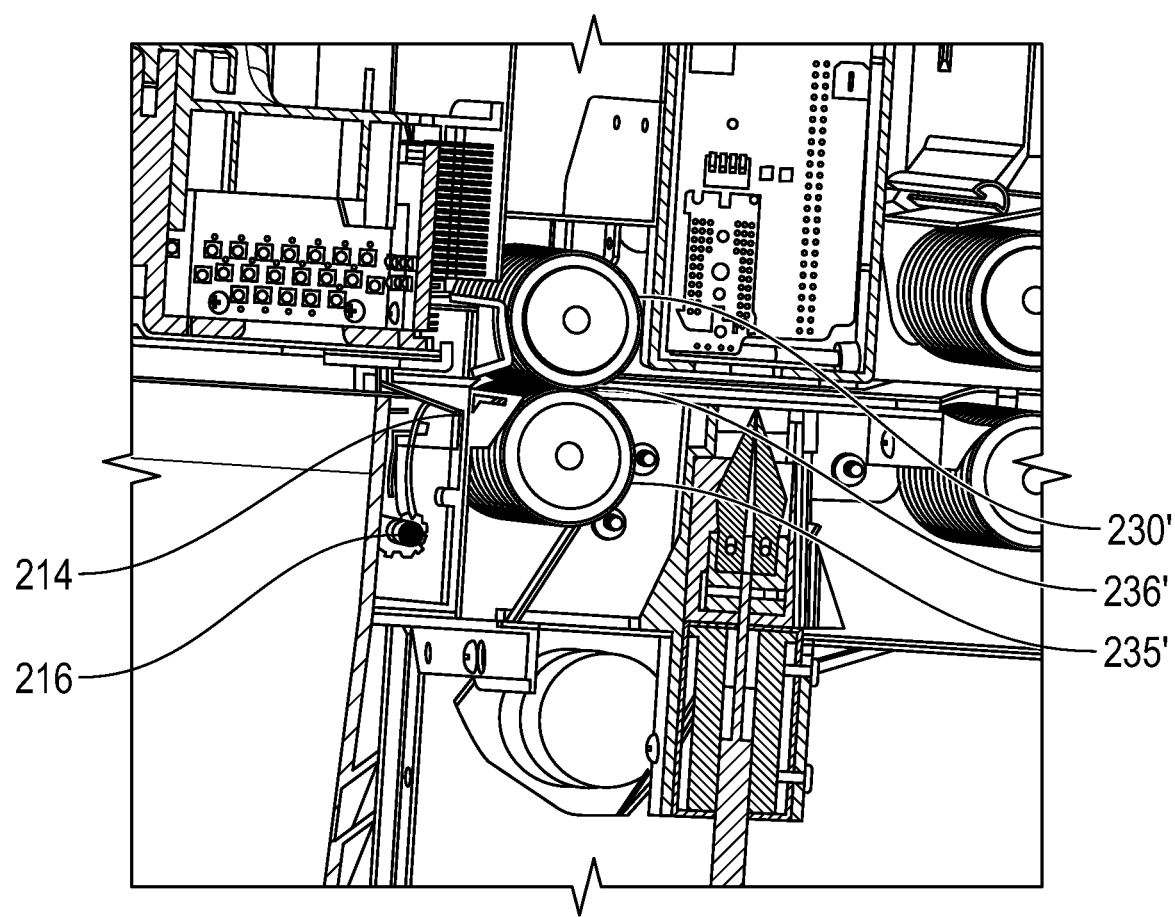

FIG. 10 is a close-up view of another portion of the example sealing apparatus shown in FIG. 1, wherein a cutter is shown, in accordance with some embodiments described herein.

Figure 11:
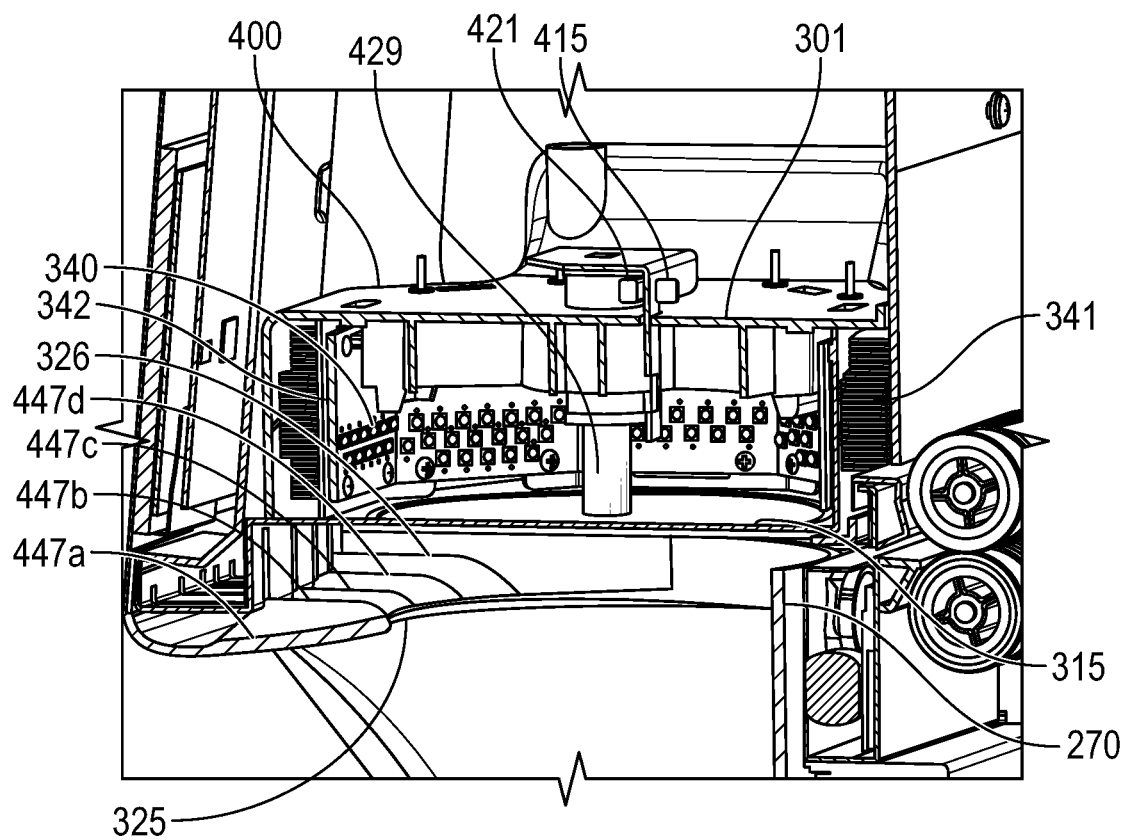

FIG. 11 is a close-up of a cross-sectional view of the example sealing apparatus shown in FIG. 1, where the sealing volume and a plurality of near-infrared light emitting diodes (NIR LEDs) are shown, in accordance with some embodiments described herein.

Figure 11A:
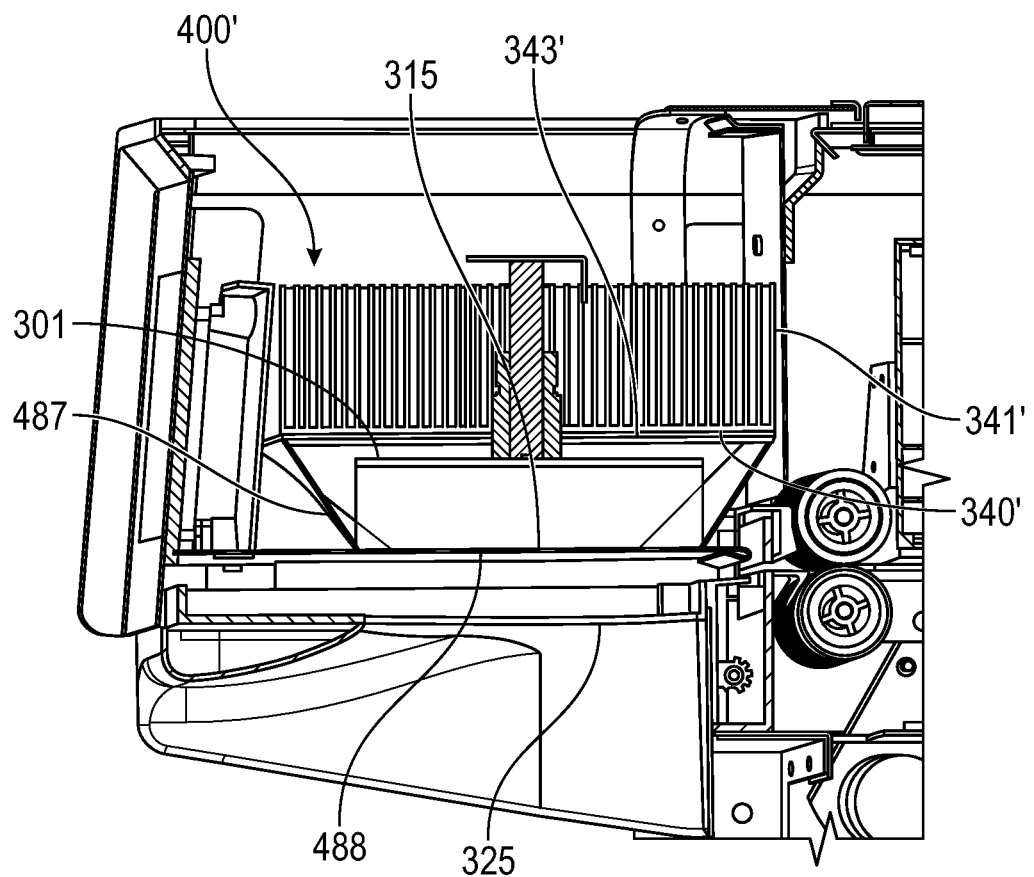

FIG. 11A is a close-up of a cross-sectional view of another example sealing apparatus, where the plurality of NIR LEDs are positioned to face downwardly into the sealing volume to cause securing of the film to the top portion of a container placed into the sealing volume, in accordance with some embodiments described herein.

Figure 12A:
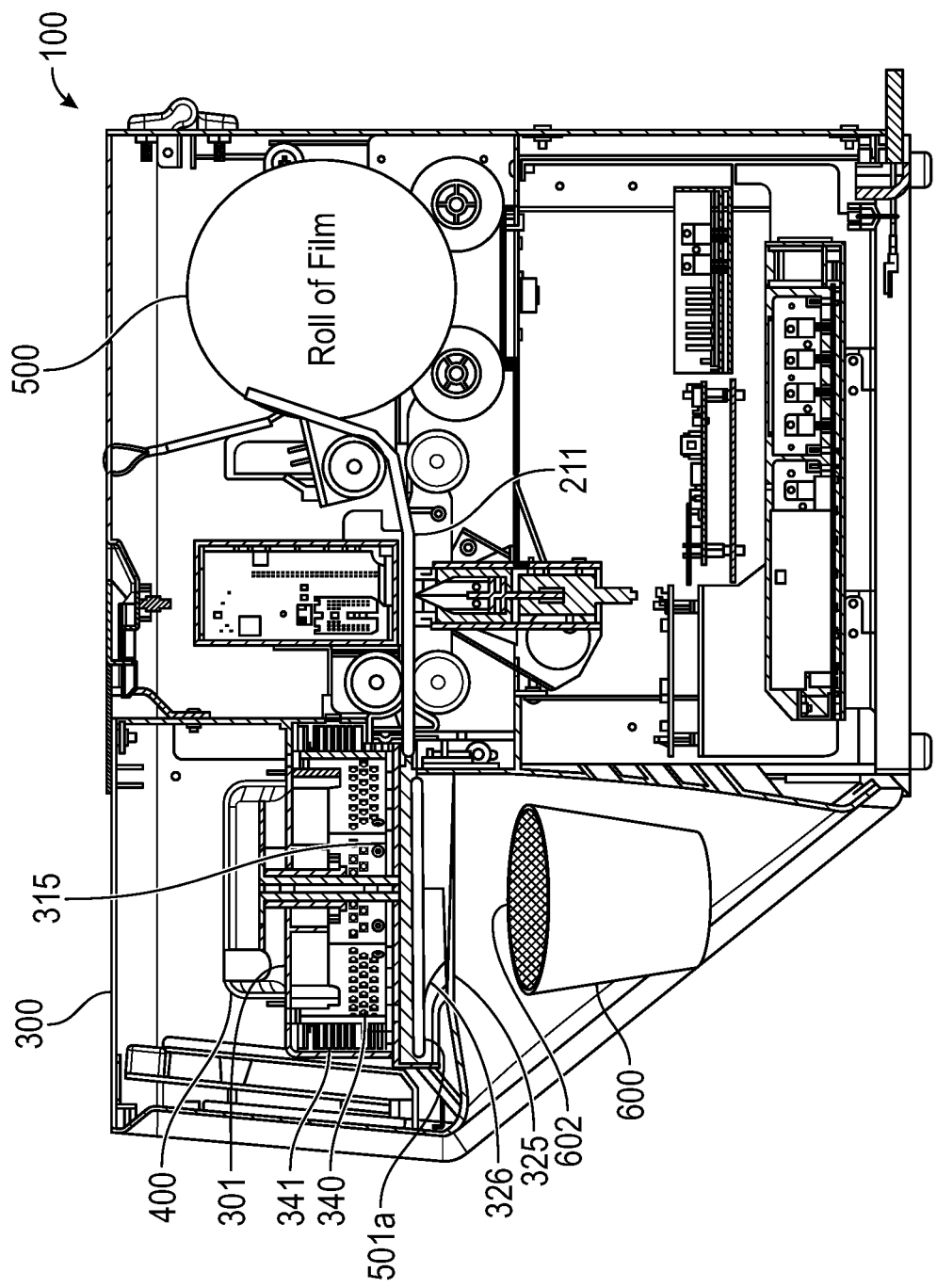

FIG. 12A is a cross-sectional side view of the example sealing apparatus, wherein a container is positioned below an aperture and ready for sealing, in accordance with some embodiments described herein.

Figure 12B:
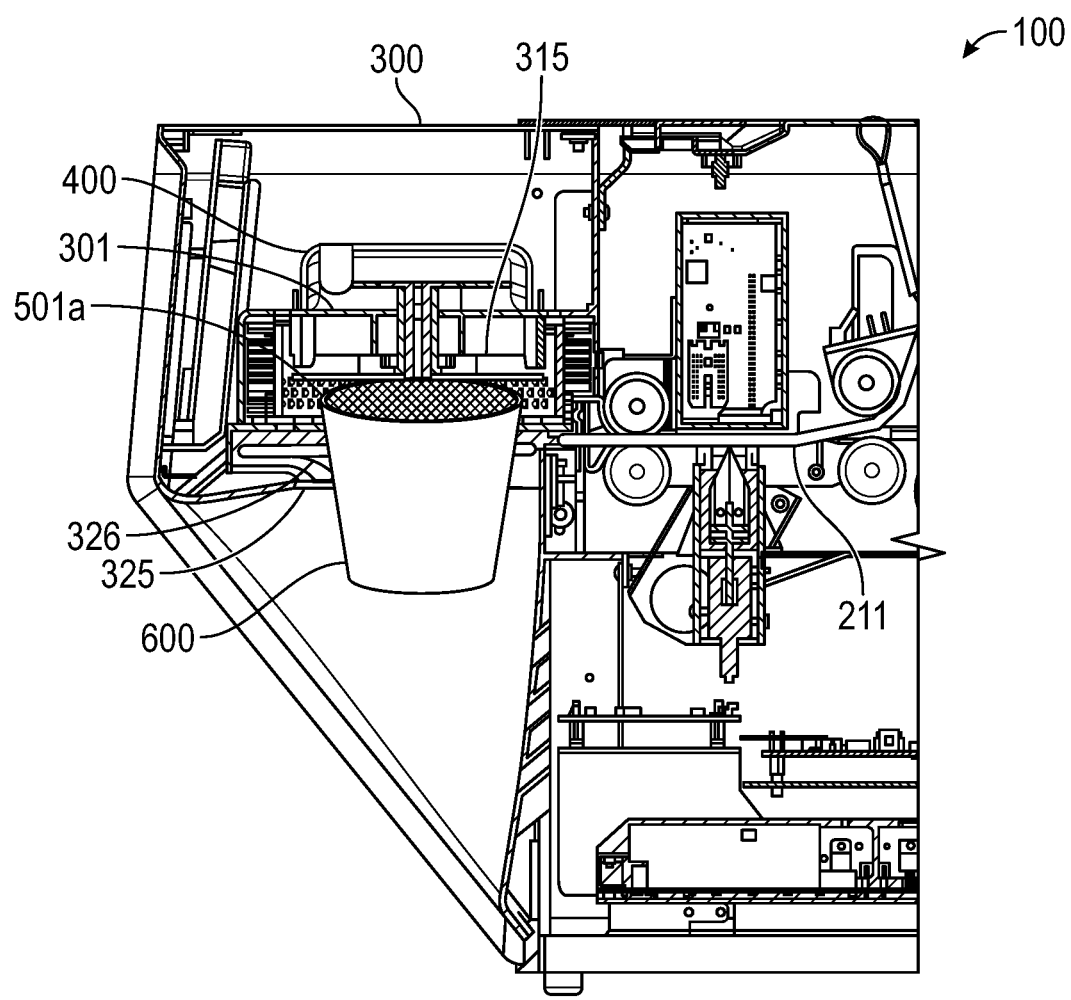

FIG. 12B is a partial side cross-sectional view of the example sealing apparatus shown in FIG. 12A, wherein the container is partially positioned within a sealing volume and the portion of the film has been sealed over a top portion of the container, in accordance with some embodiments described herein.

Figure 12C:
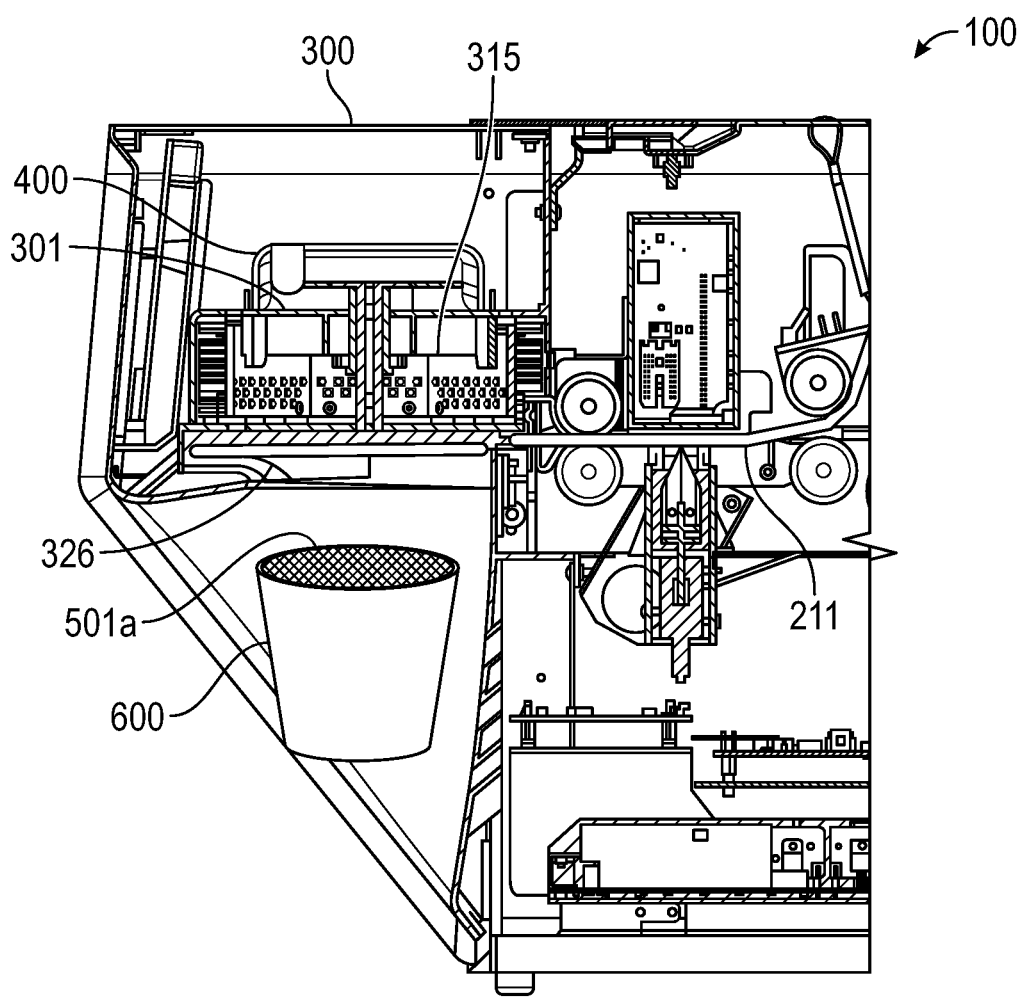

FIG. 12C is a partial side cross-sectional view of the example sealing apparatus shown in FIG. 12A, wherein the sealed container has been removed from the aperture, in accordance with some embodiments described herein.

Figure 13A:
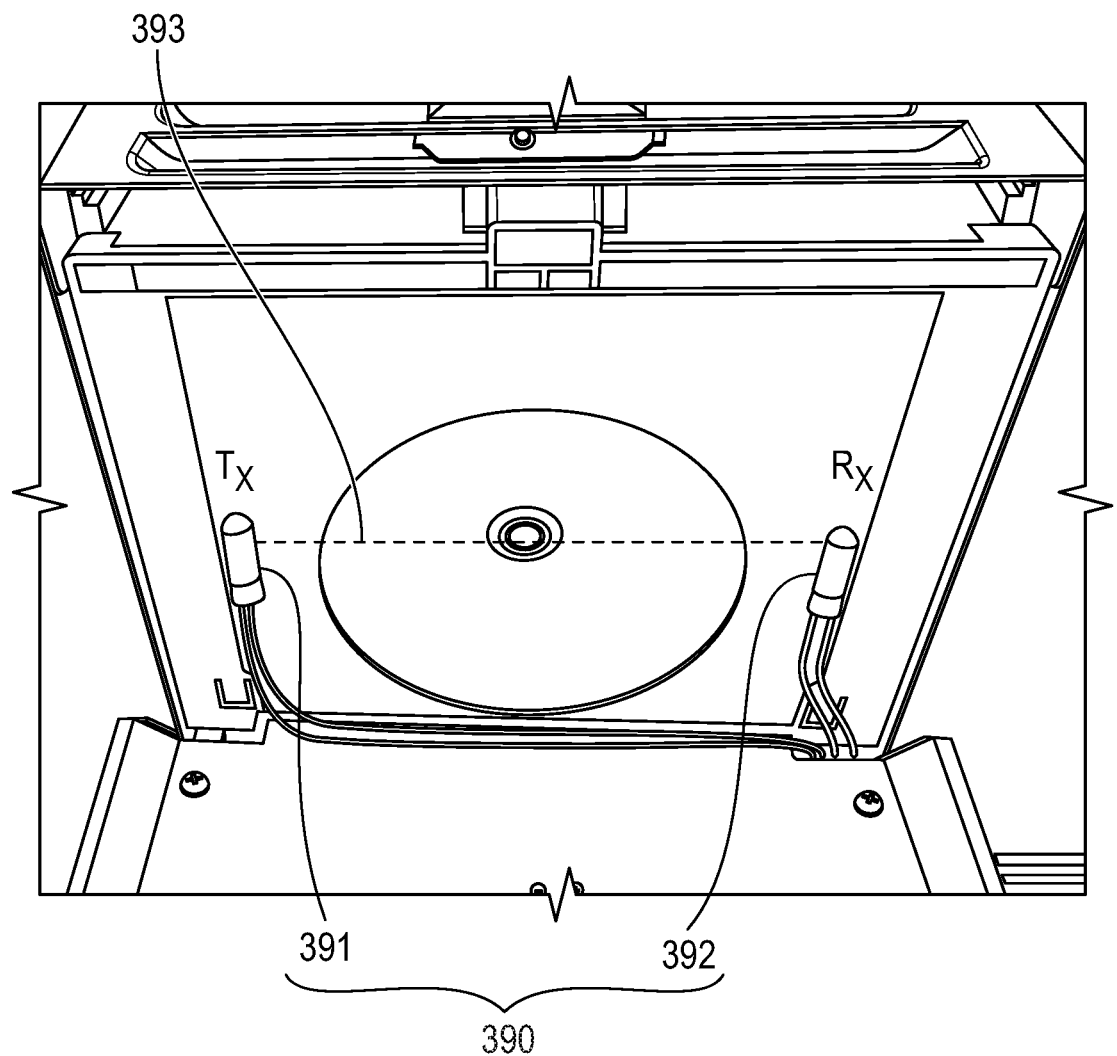

FIG. 13A is a close-up view illustrating an example container presence sensor proximate the aperture for the sealing portion of the example sealing apparatus shown in FIG. 1, in accordance with some embodiments described herein.

Figure 13B:
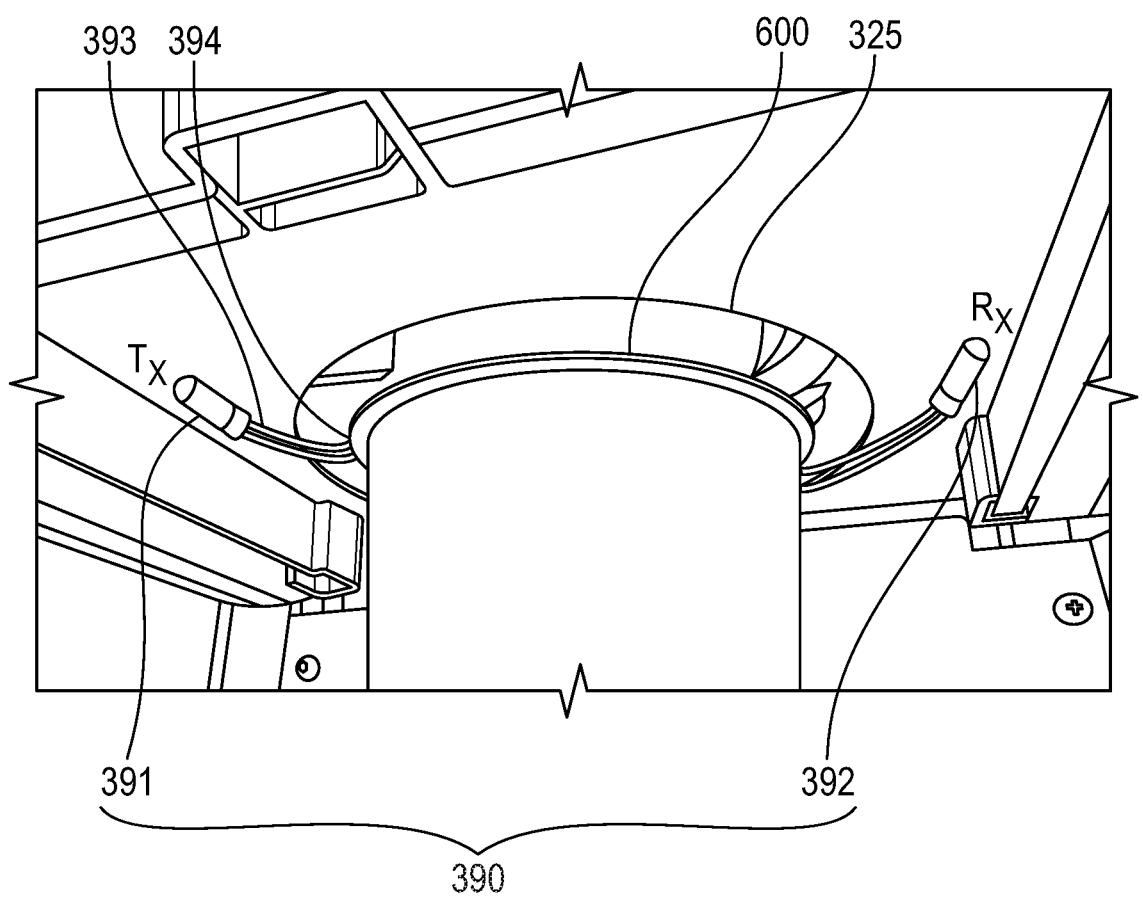

FIG. 13B is a close-up view illustrating an example container positioned so as to be sensed by the container presence sensor shown in FIG. 13A, in accordance with some embodiments described herein.

Figure 14A:
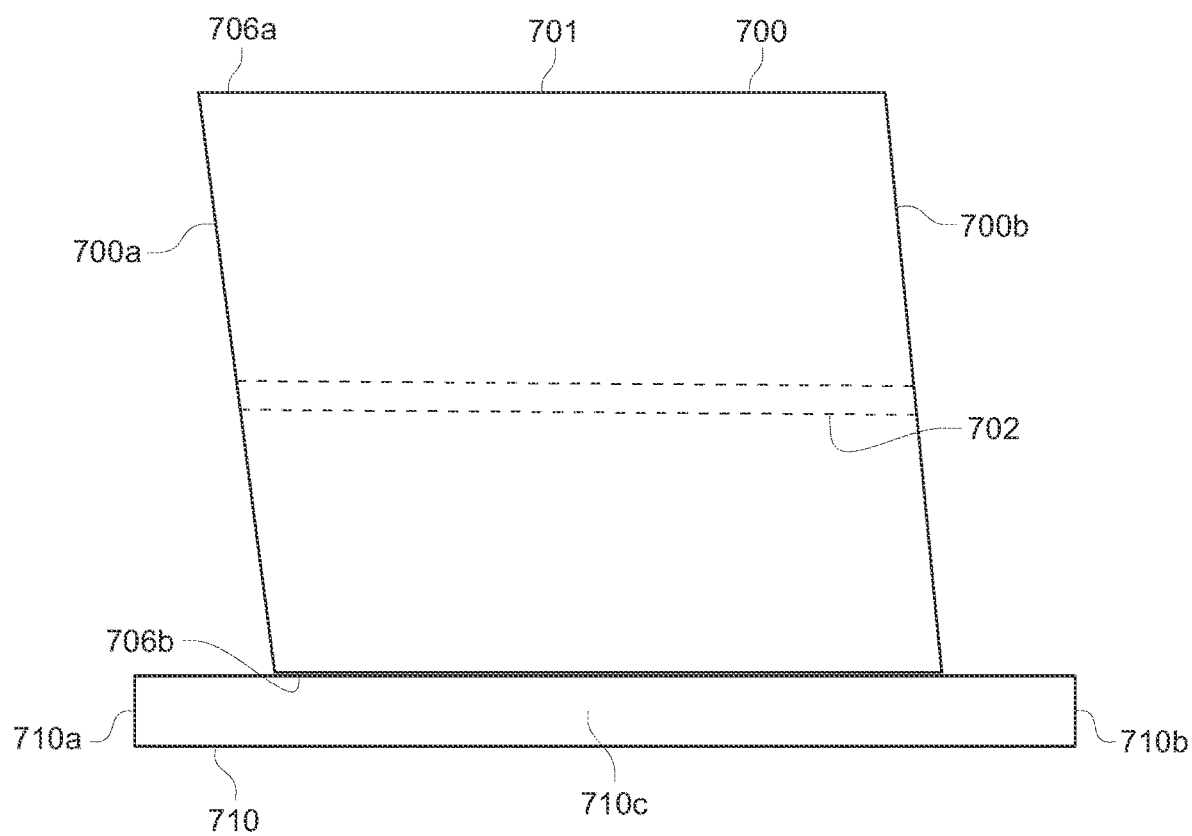

FIG. 14A illustrates an example lopsided roll of film installed on an example support roller, in accordance with some embodiments described herein.

Figure 14B:
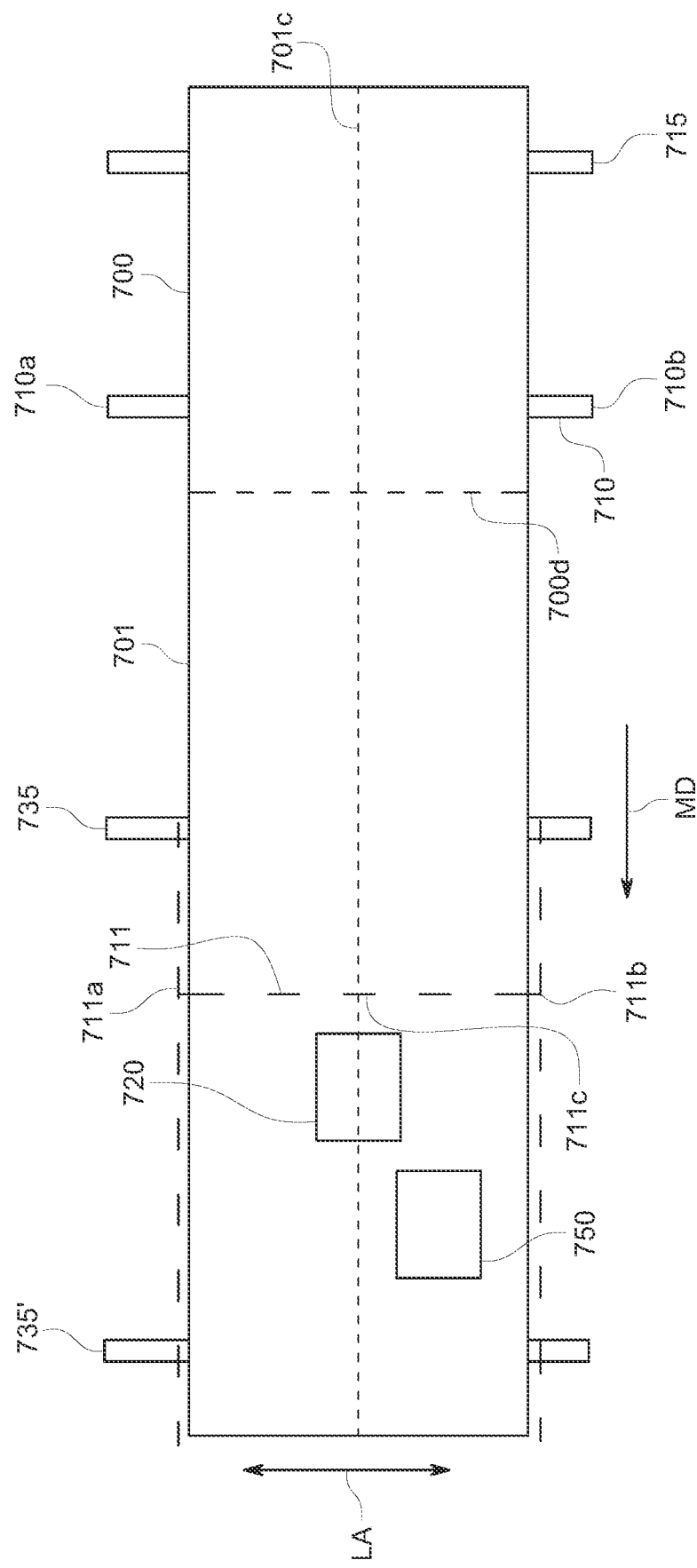

FIG. 14B illustrates a schematic of film from the lopsided roll of film being fed along a film path within an example sealing apparatus, in accordance with some embodiments described herein.

Figure 15A:
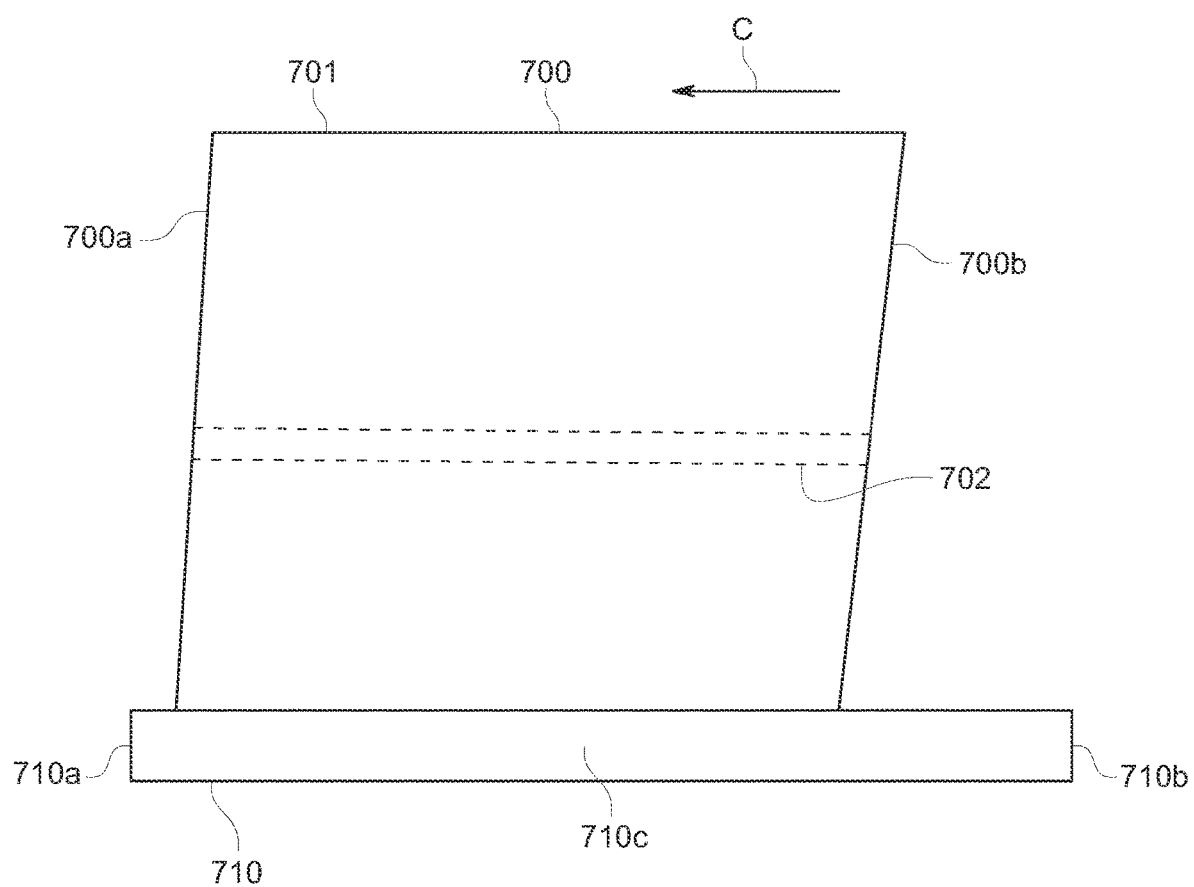

FIG. 15A illustrates the example lopsided roll of film installed on the example support roller of FIG. 14A, where the roll has rotated on the support roller, in accordance with some embodiments described herein.

Figure 15B:
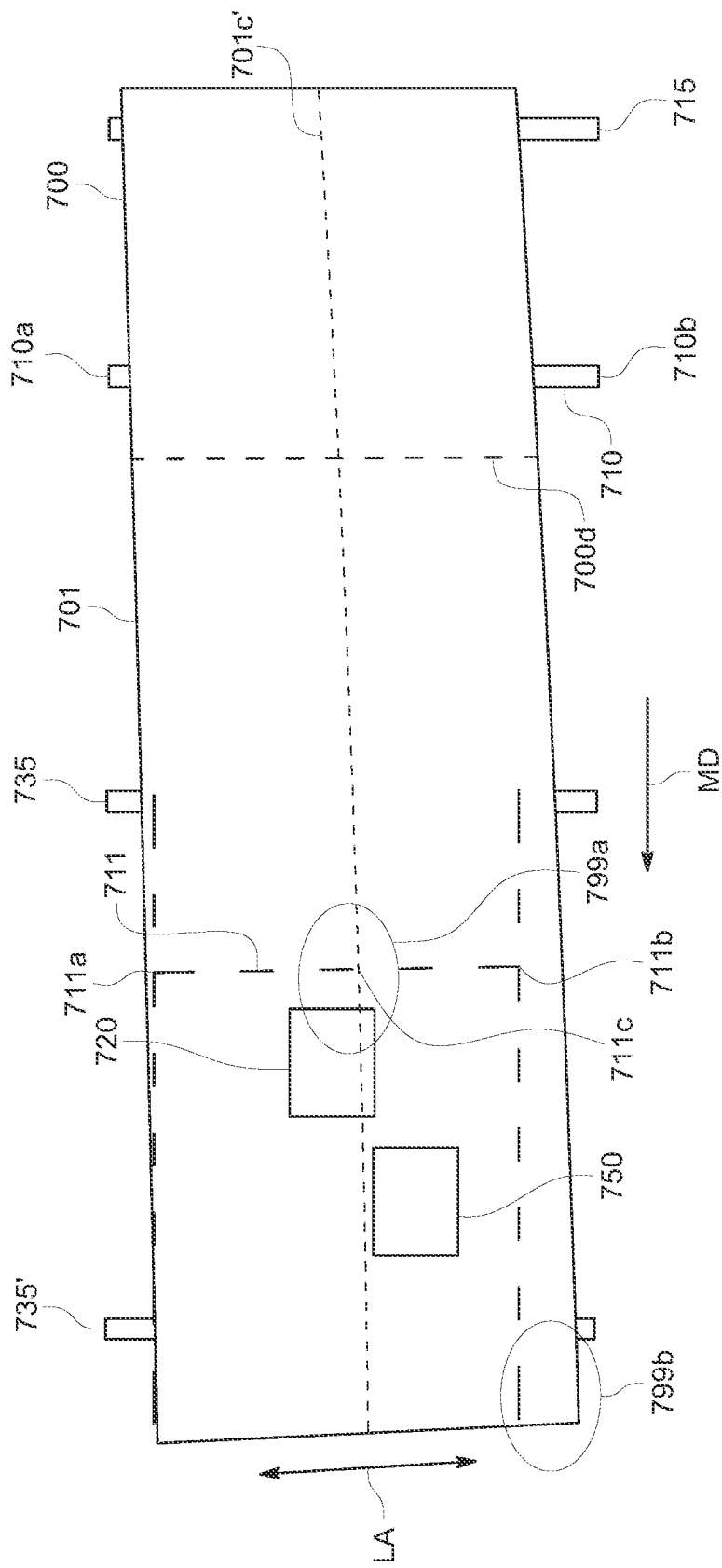

FIG. 15B illustrates the schematic of FIG. 14B, where the lopsided roll of film has now rotated on the support roller and film therefrom is being fed along the film path within the example sealing apparatus, in accordance with some embodiments described herein.

Figure 16:
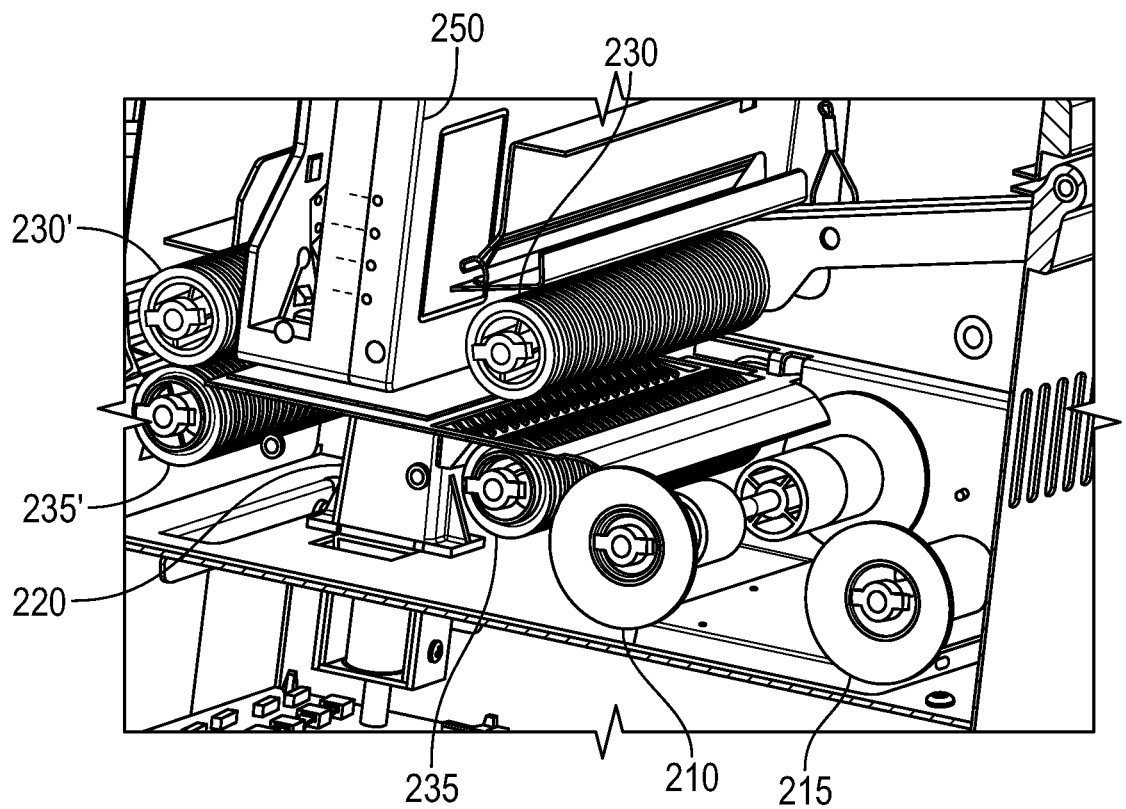

FIG. 16 is a perspective view of a portion of the body portion of the example sealing apparatus of FIG. 1, showing an example support roller, in accordance with some embodiments described herein.

Figure 17:
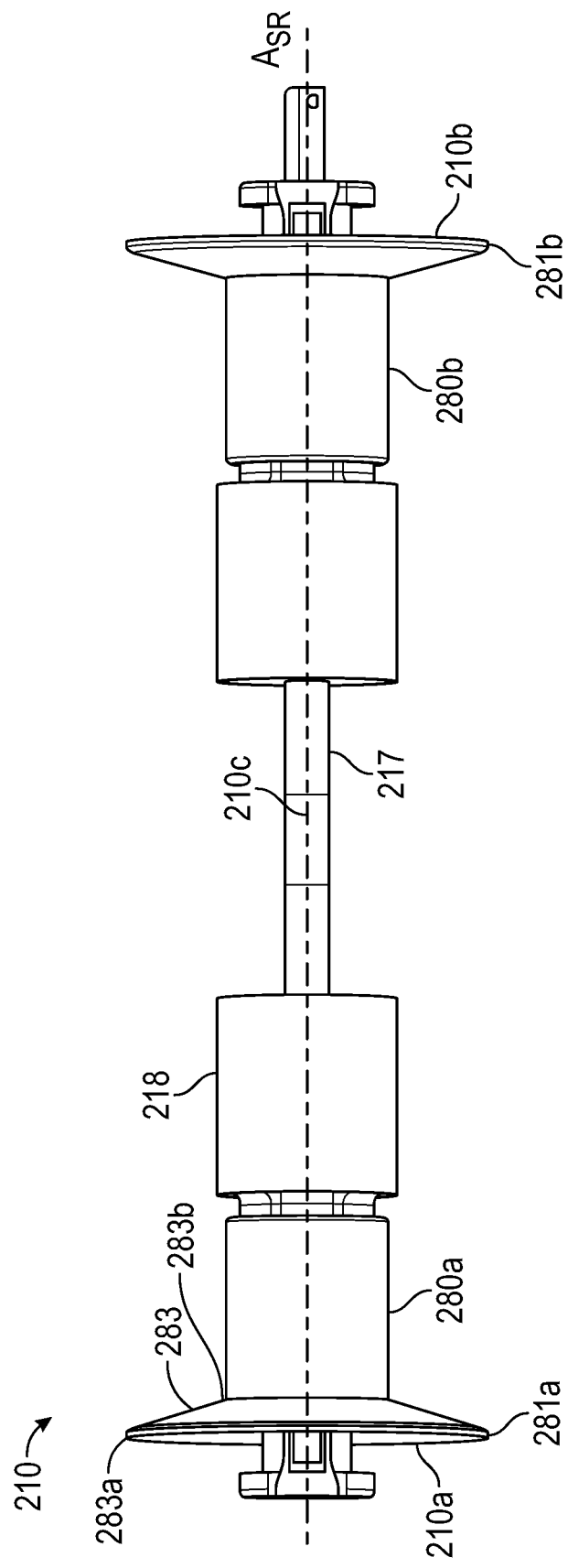

FIG. 17 is a front view of the example support roller shown in FIG. 16, in accordance with some embodiments described herein.

Figure 17A:
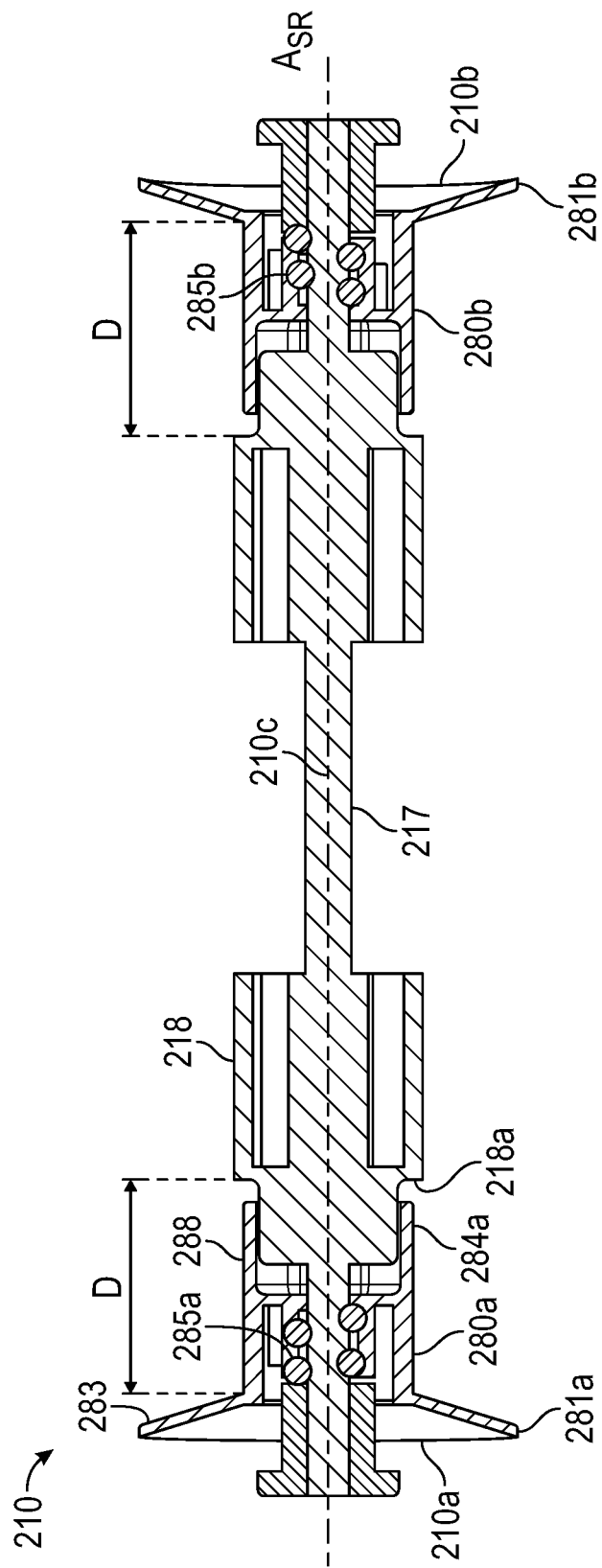

FIG. 17A is a cross-sectional view of the example support roller shown in FIG. 16, taken along line B-B, in accordance with some embodiments described herein.

Figure 18A:
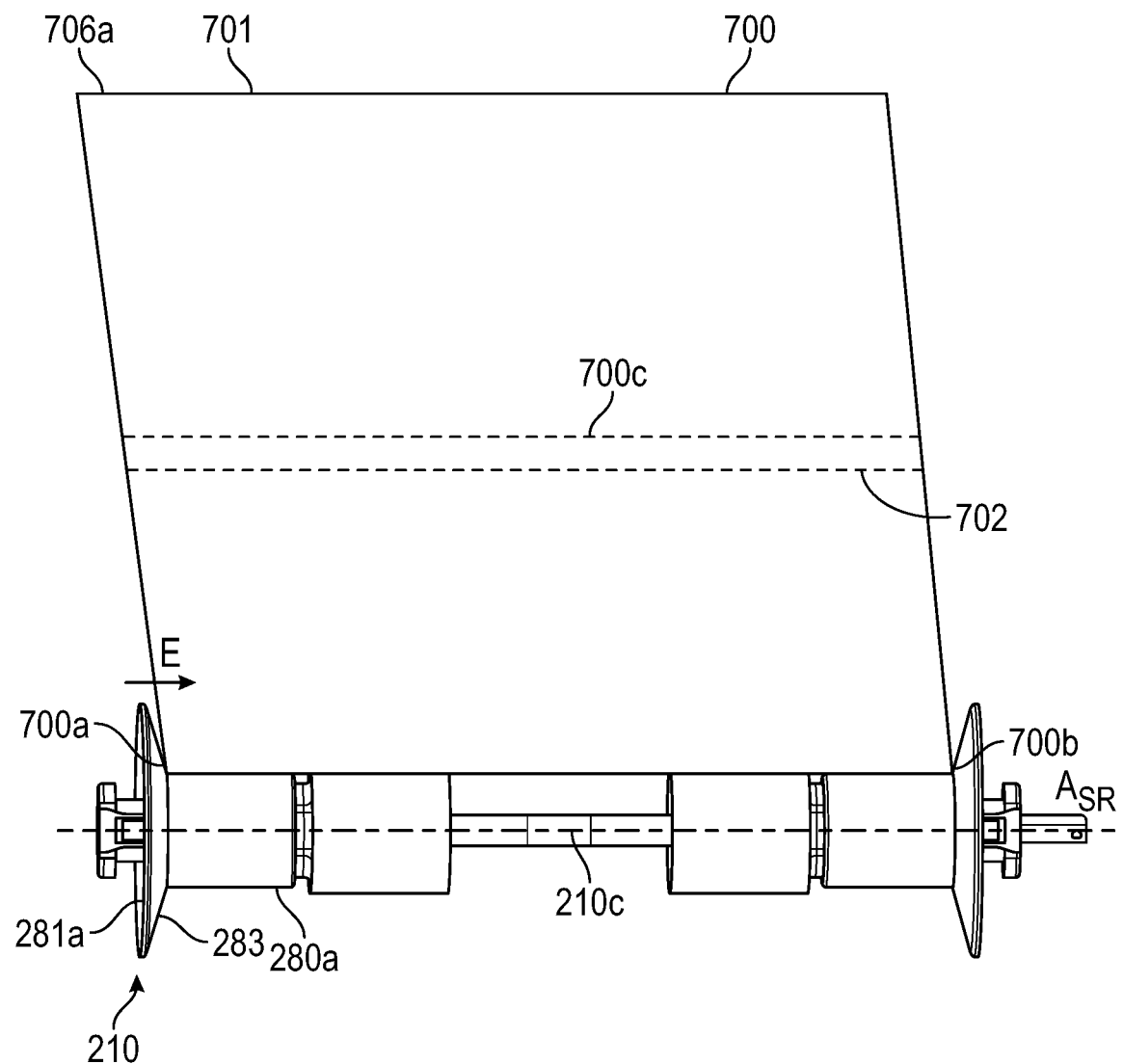

FIG. 18A illustrates an example lopsided roll of film installed on the support roller shown in FIG. 17, in accordance with some embodiments described herein.

Figure 18B:
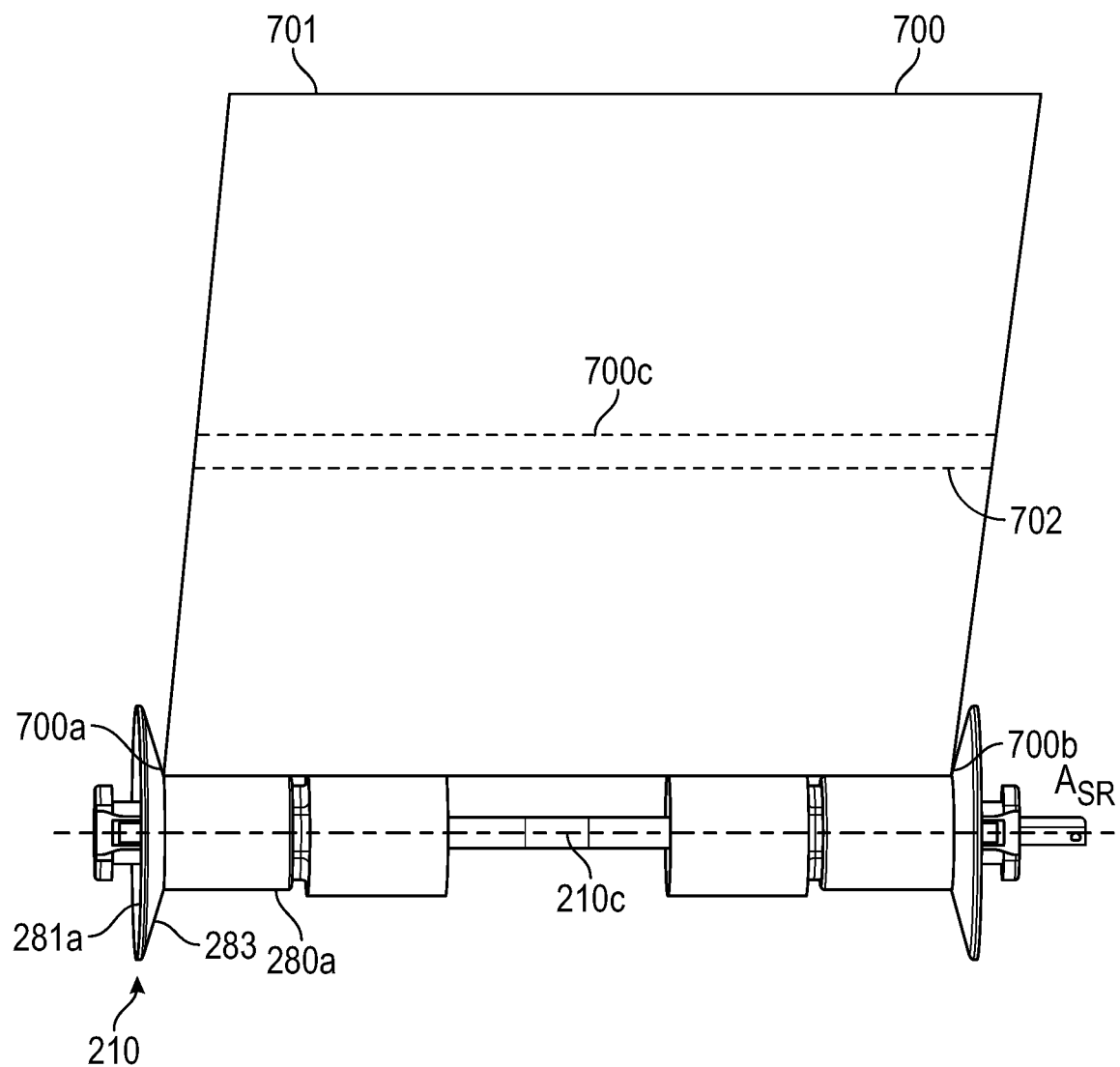

FIG. 18B illustrates the example lopsided roll of film installed on the support roller shown in FIG. 17 after rotation of the roll of film, in accordance with some embodiments described herein.

Figure 19A:
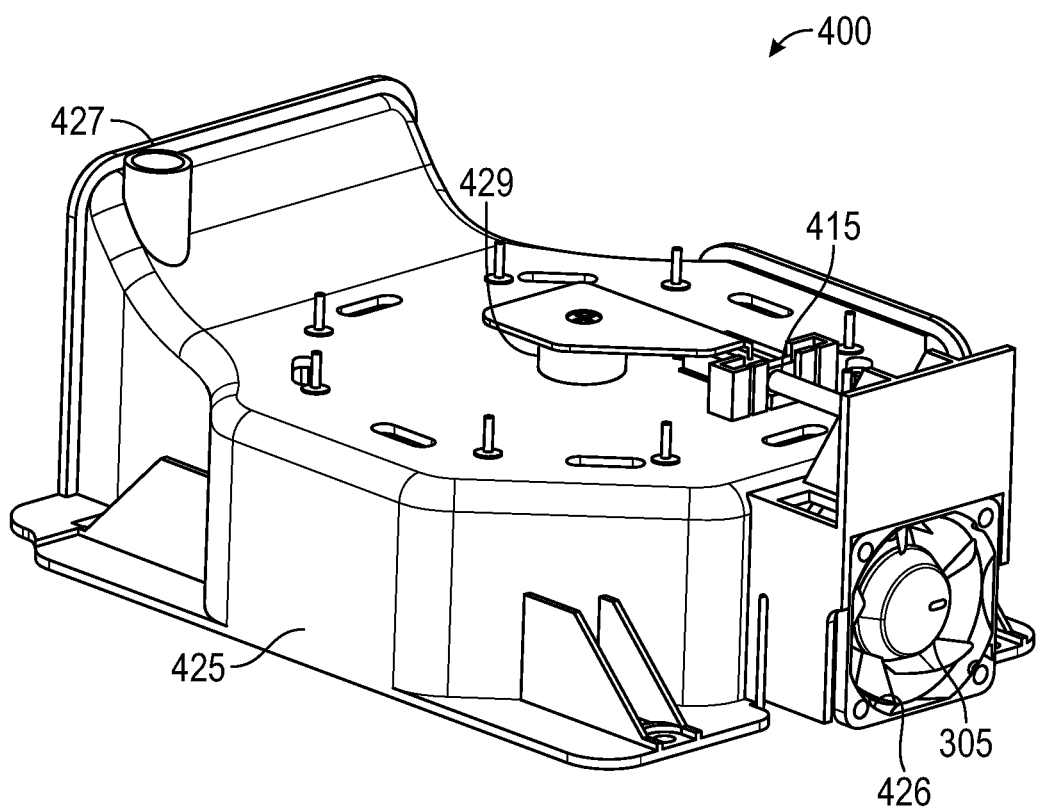

FIG. 19A shows a front, right side perspective view of an example securing assembly, in accordance with some embodiments described herein.

Figure 19B:
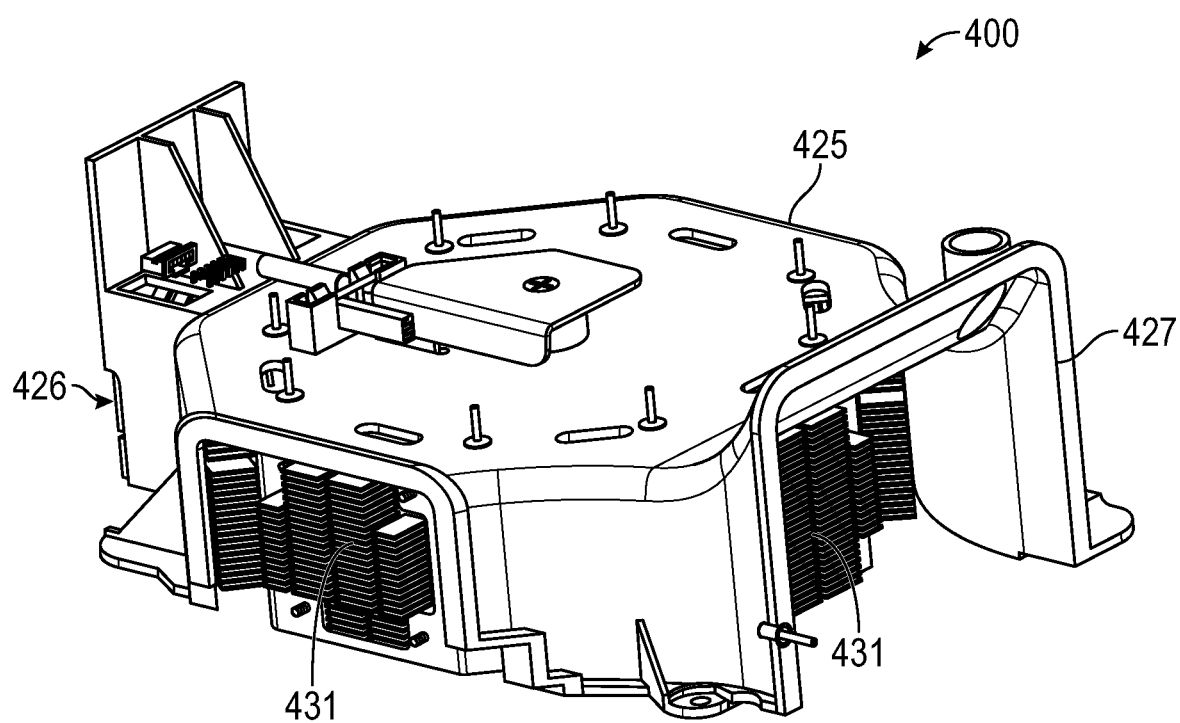

FIG. 19B shows a rear, left side perspective view of the example securing assembly, in accordance with some embodiments described herein.

Figure 20:
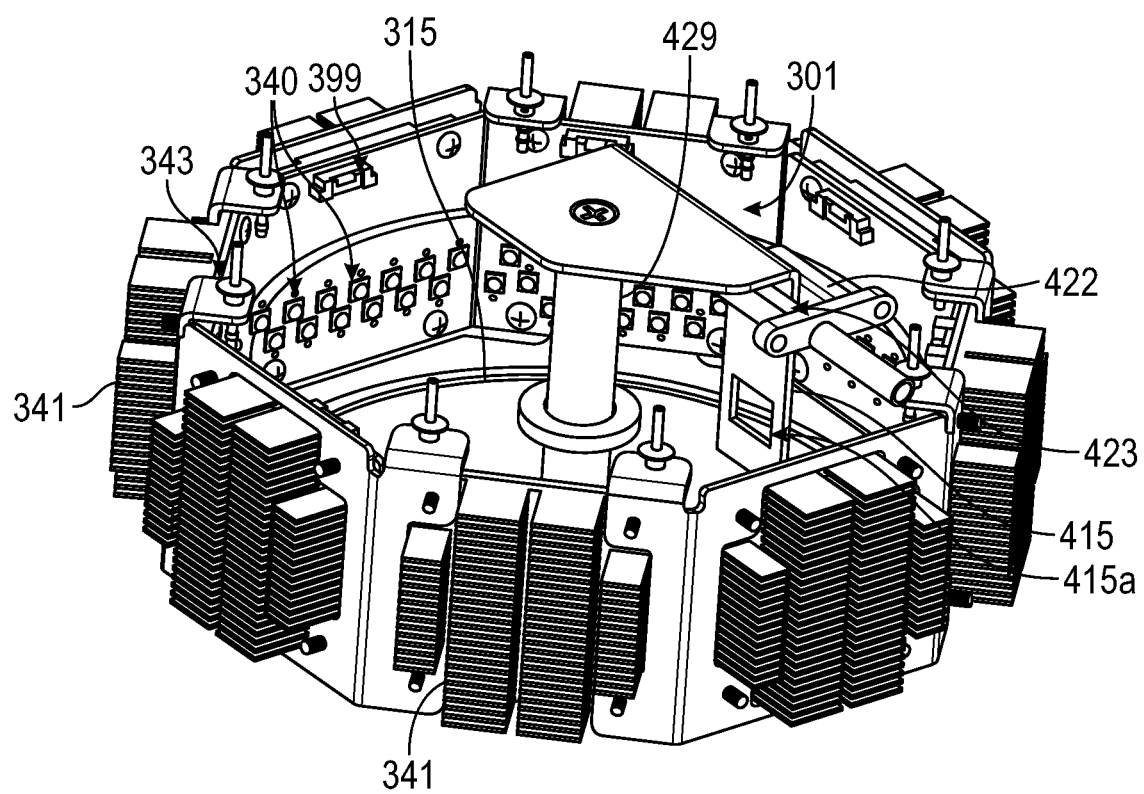

FIG. 20 is a perspective view of a portion of the securing assembly, wherein a sensor is shown, in accordance with some embodiments described herein.

Figure 20A:
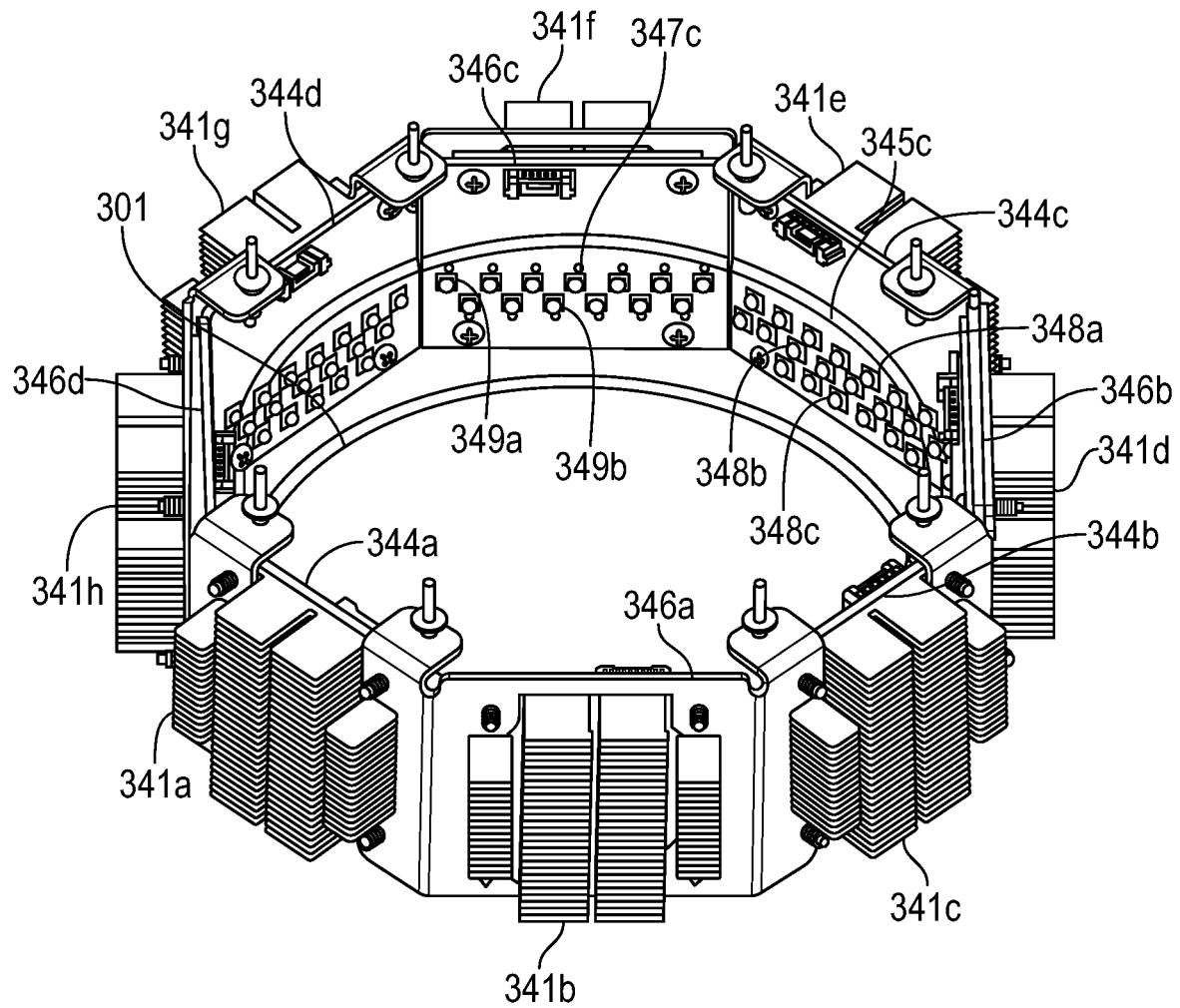

FIG. 20A is a perspective view of a portion of the securing assembly, wherein a plurality of NIR LEDs are shown attached to printed circuit boards (PCBs), in accordance with some embodiments described herein.

Figure 20B:
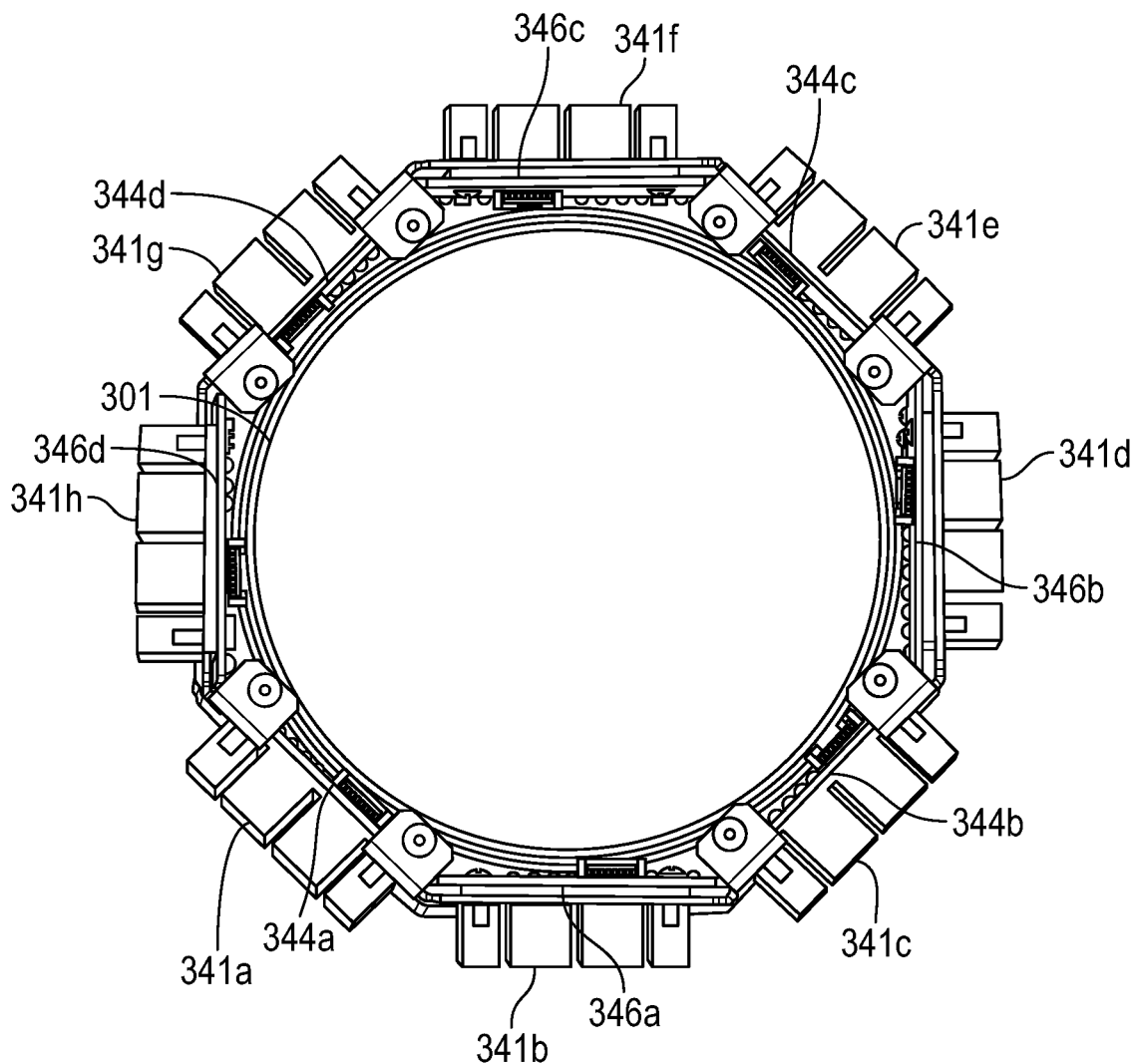

FIG. 20B is a top view of the portion of the securing assembly shown in FIG. 19A, illustrating an example circular shape of the sealing volume, in accordance with some embodiments described herein.

Figure 21A:
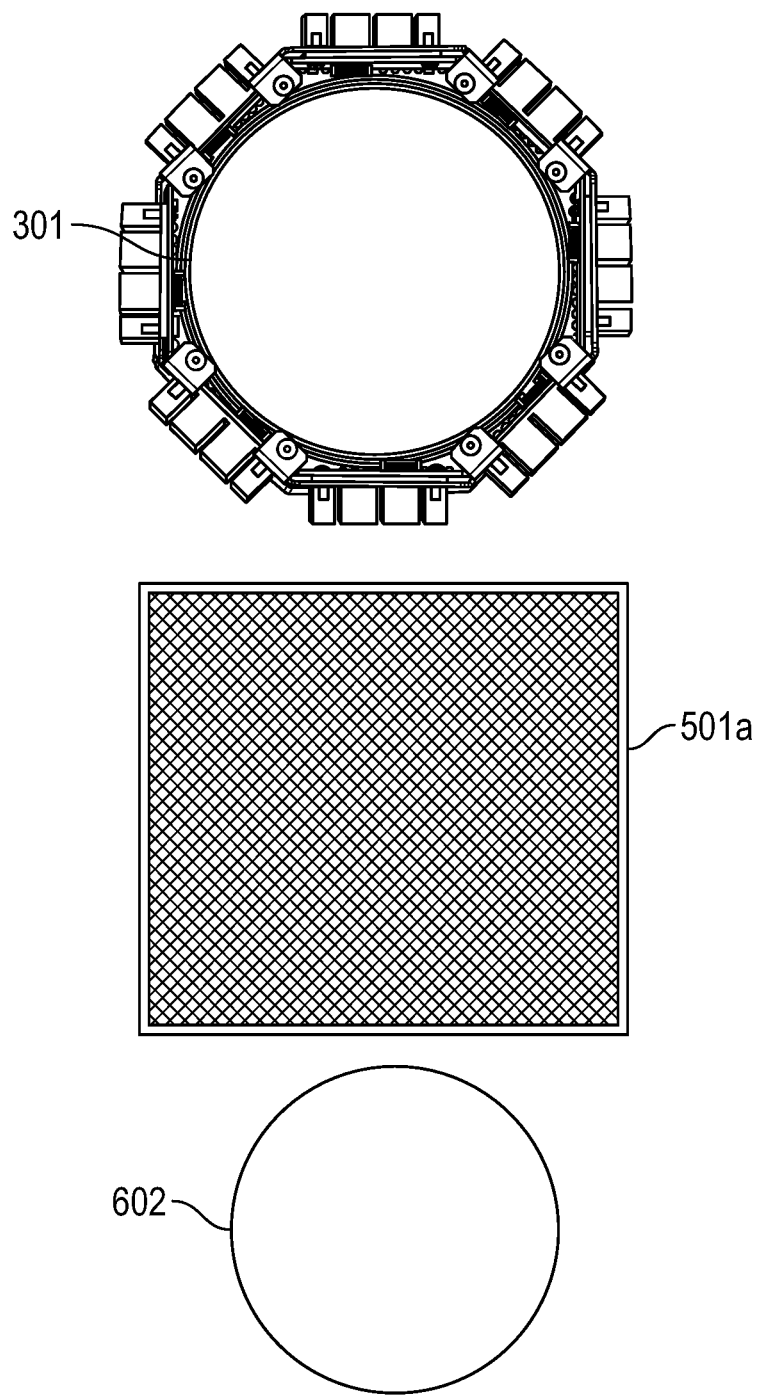

FIG. 21A illustrates the portion of the securing assembly shown in FIG. 20B along with a portion of the film and a circular shape corresponding to the shape of a top portion of a container to be sealed, all separated for explanatory purposes, in accordance with some embodiments described herein.

Figure 21B:
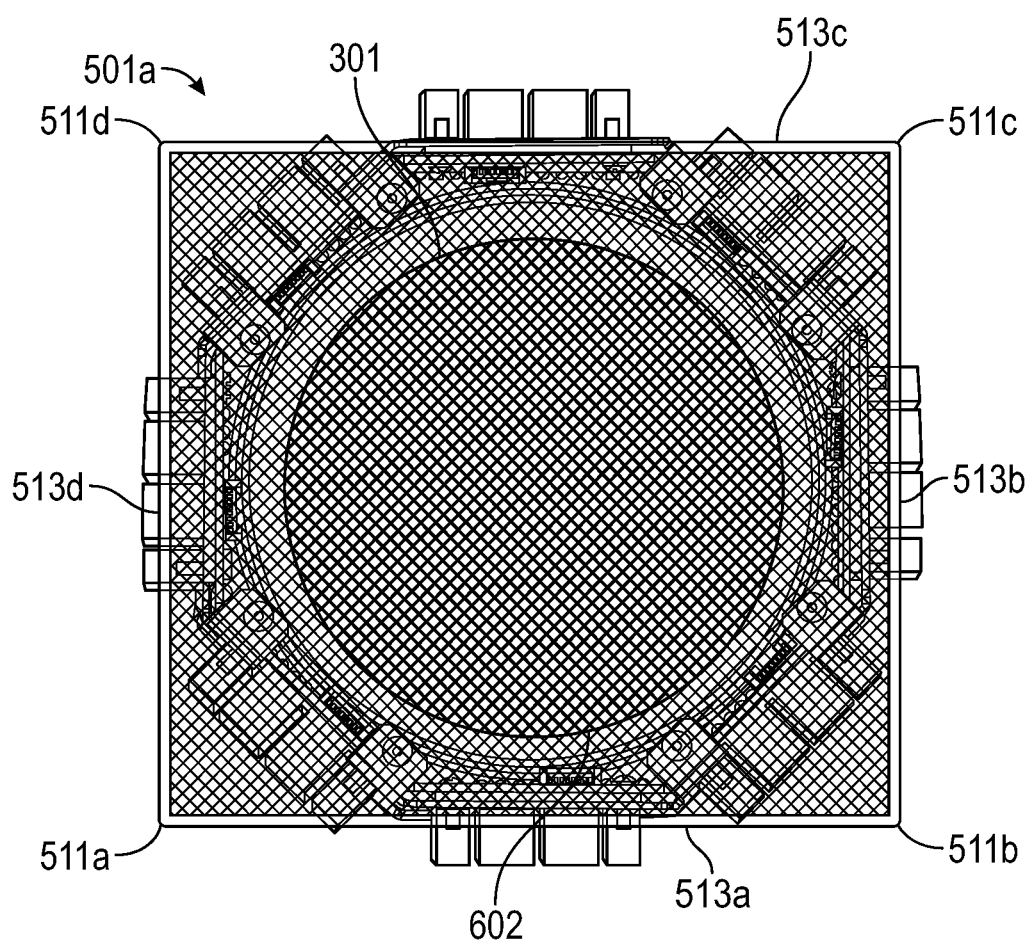

FIG. 21B illustrates the portion of the securing assembly shown in FIG. 20B along with a portion of the film and a circular shape corresponding to the shape of a top portion of a container to be sealed, all stacked together for explanatory purposes, in accordance with some embodiments described herein.

Figure 22:
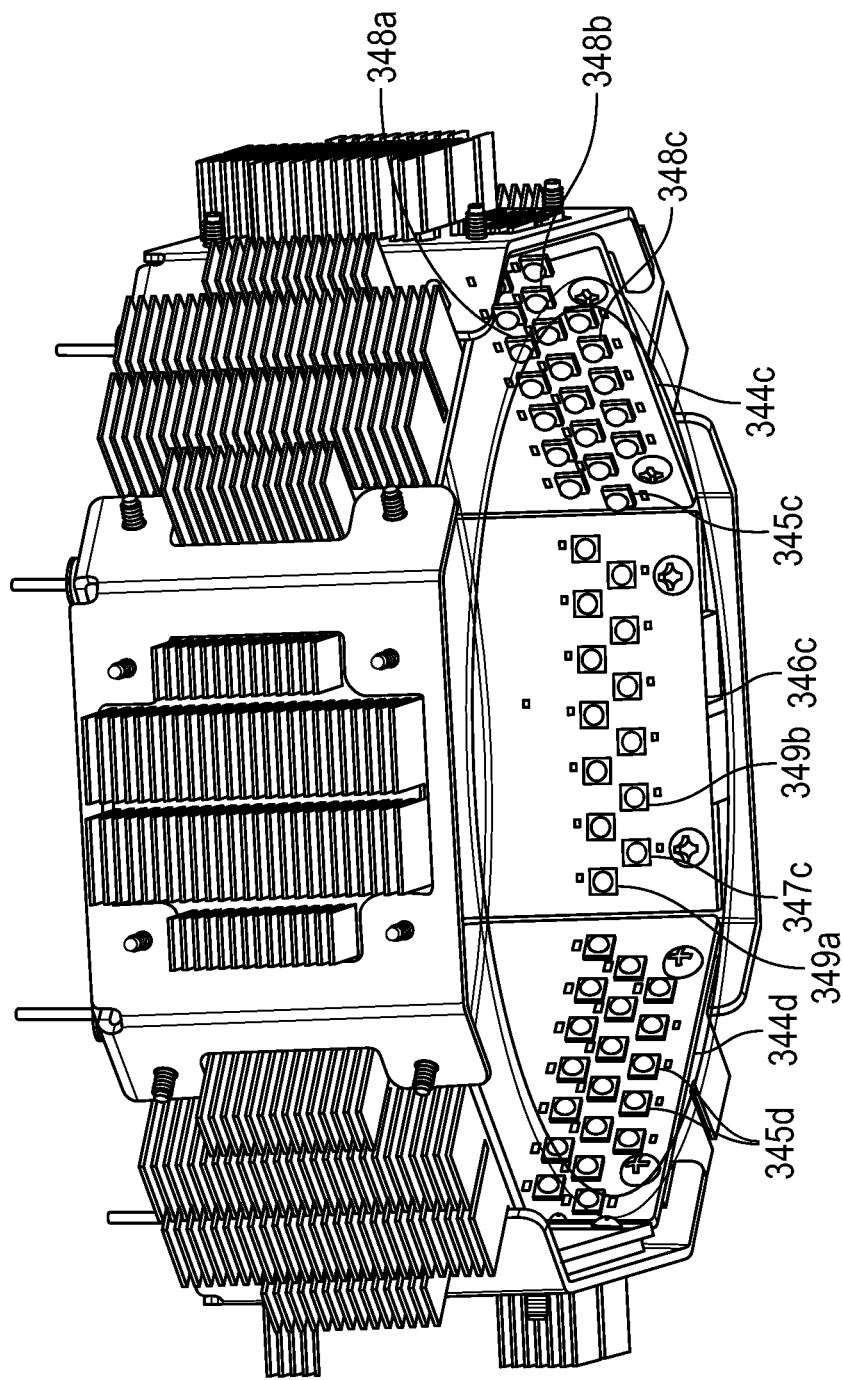

FIG. 22 is a bottom perspective view of a portion of the securing assembly illustrating different rows of NIR LEDs, in accordance with some embodiments described herein.

Figure 22A:
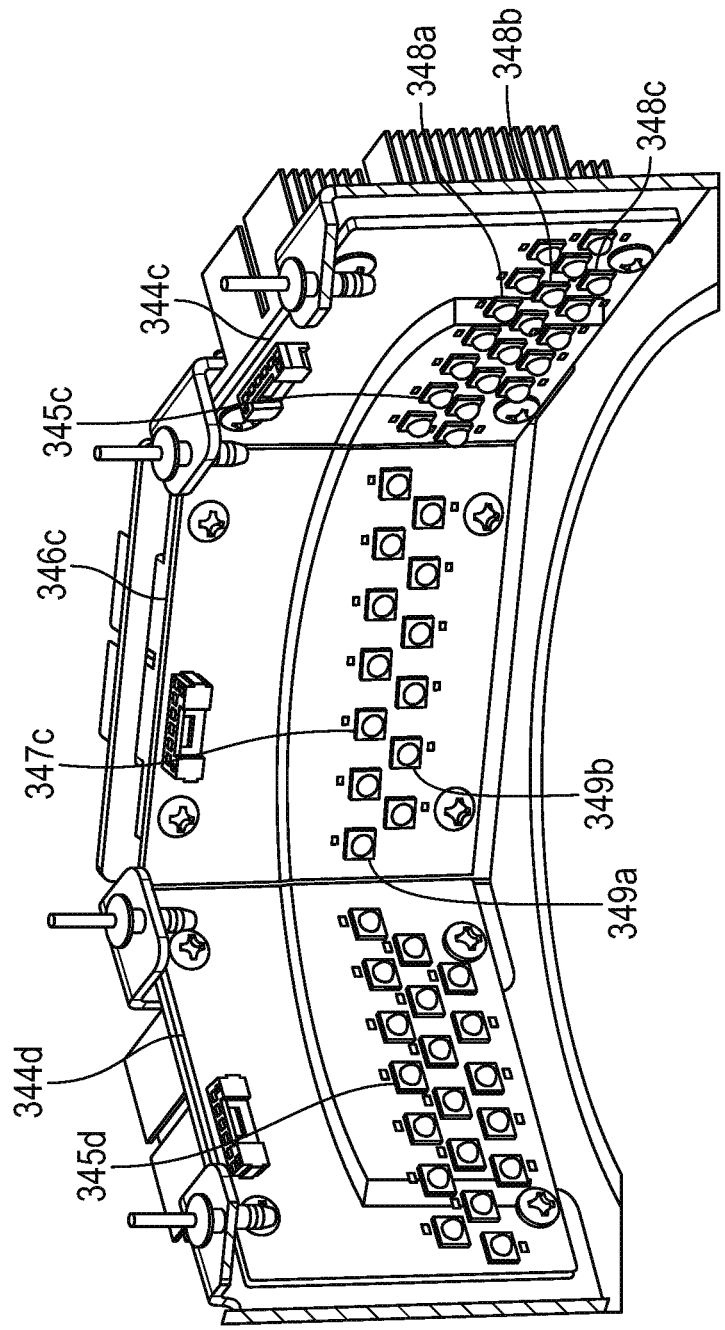

FIG. 22A shows two sets of corner NIR LEDs and a set of edge NIR LEDs for a sealing volume, in accordance with some embodiments described herein.

Figure 23:
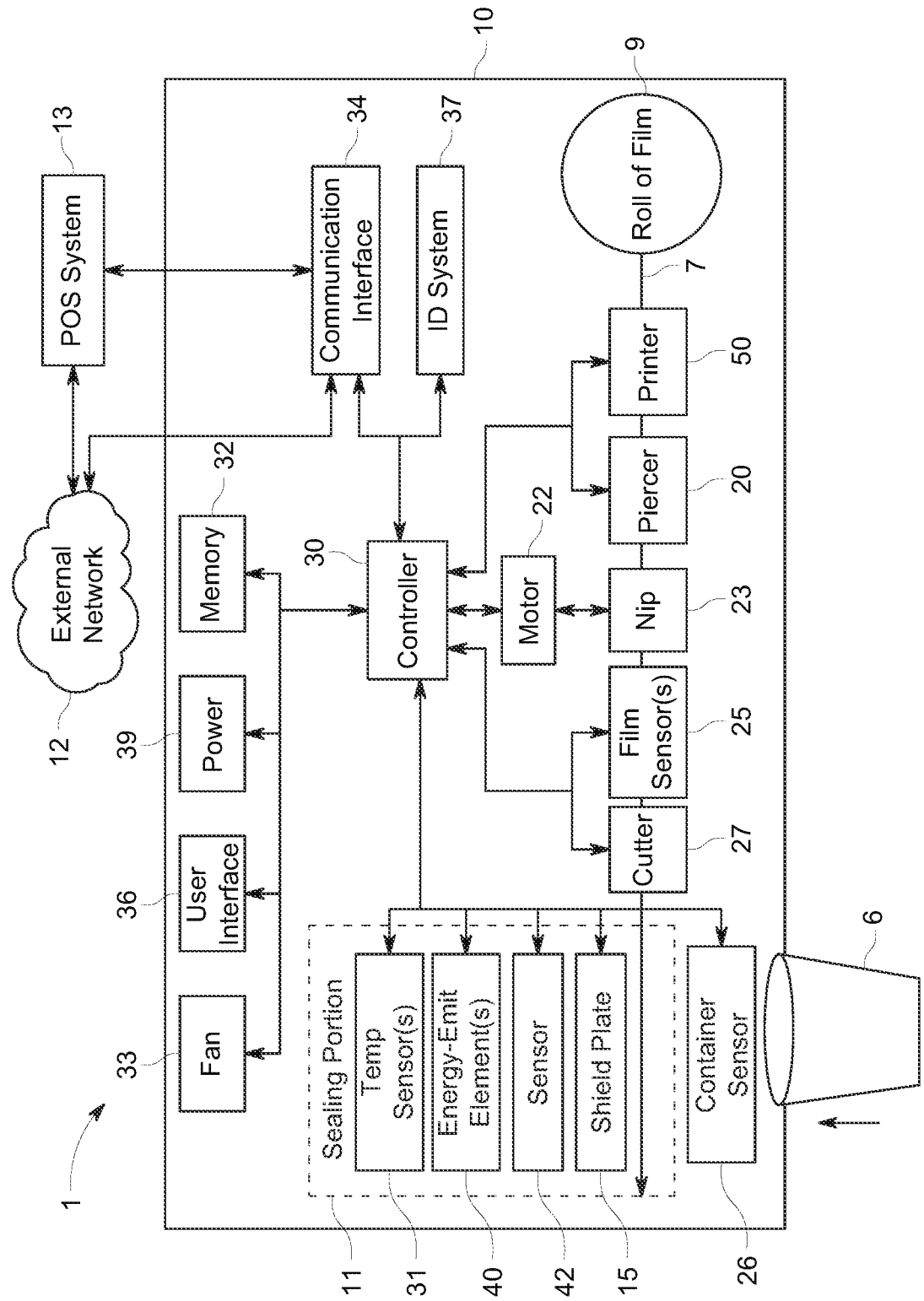

FIG. 23 shows a block diagram of an example system utilizing an example sealing apparatus, in accordance with some embodiments described herein.

Figure 24:
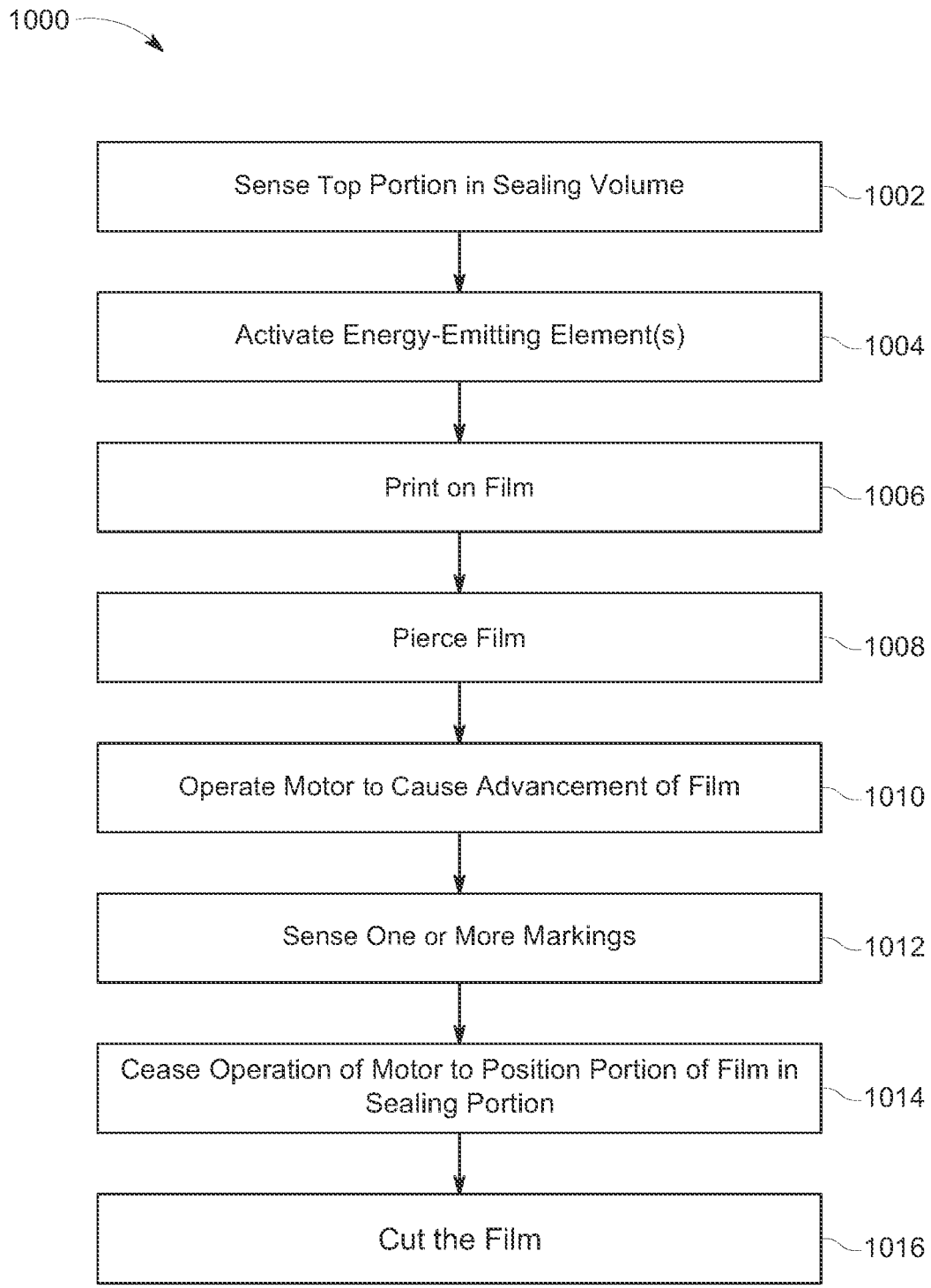

FIG. 24 illustrates a flowchart of an example method for operating an example sealing apparatus, in accordance with some embodiments described herein.

Figure 25:
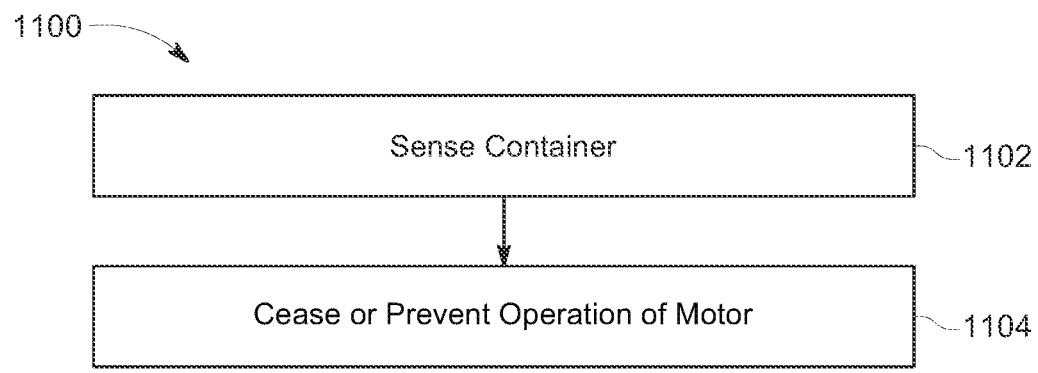

FIG. 25 illustrates a flowchart of an example method for preventing a feeding error within an example sealing apparatus, in accordance with some embodiments described herein.

Figure 26:
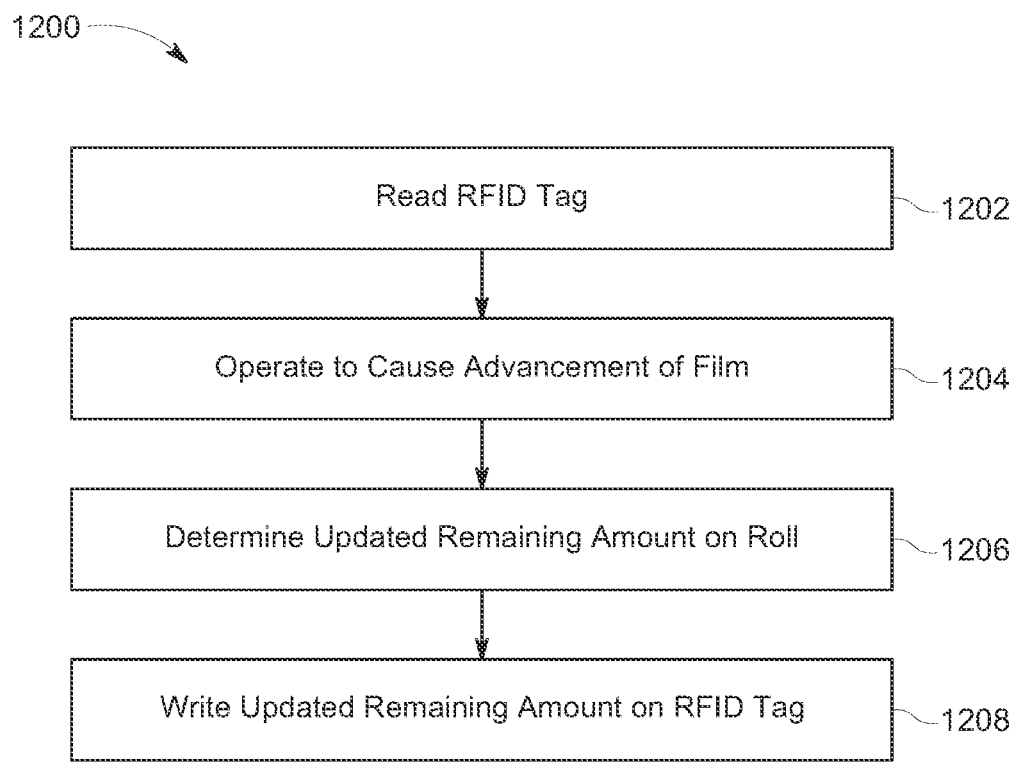

FIG. 26 illustrates a flowchart of an example method for reading from and writing to an RFID tag of a roll of film installed in an example sealing apparatus, in accordance with some embodiments described herein.

Figure 27:
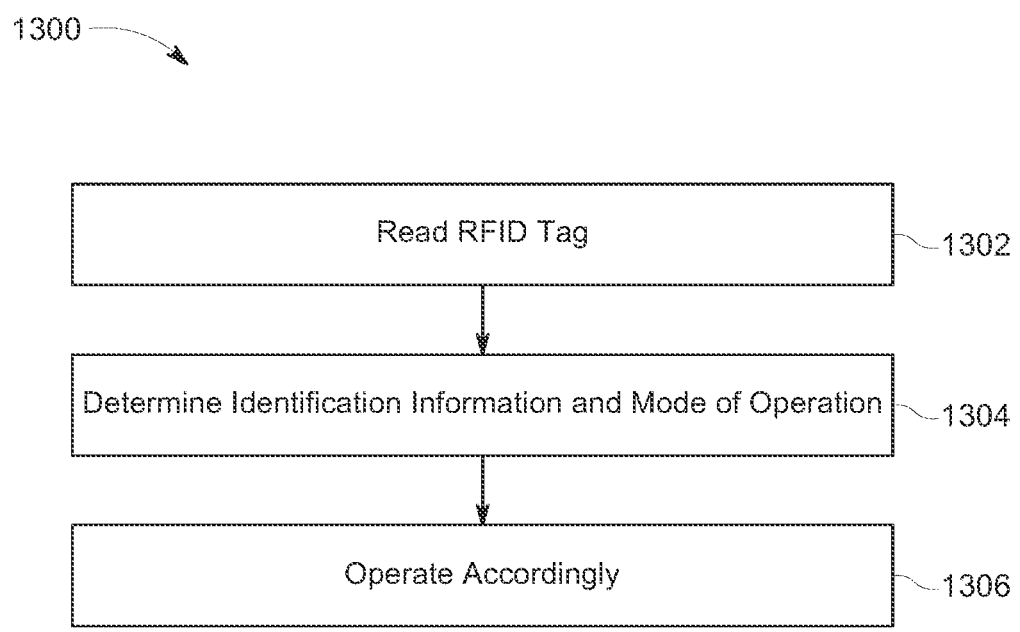

FIG. 27 illustrates a flowchart of an example method for operating an example sealing apparatus utilizing an RFID tag associated with an installed roll of film, in accordance with some embodiments described herein.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

In accordance with the disclosed subject matter, an apparatus to secure film to a container to form a seal (e.g., a full seal, a partial seal, etc.) of the container to at least partially cover and/or inhibit flow from the container is provided.

With reference to FIGS. 1-2, an example sealing apparatus 100 may include a body portion 200 and a sealing portion 300.

The body portion 200 may include a body housing 204 that includes a body base 207 and a body cover 205, and any other suitable structure to contain the various components therein. The body cover 205 may be coupled to the body base 207, for example pivotably coupled by a hinge, screws, positioning, or other coupling devices, and additionally or alternatively, by friction and/or gravity alone. The body housing 204 may improve the usability, safety, aesthetics, and other properties of the apparatus 100. For example, the body housing 204 can improve usability by reducing the amount of debris that enters the body portion 200. The body housing 204 can contribute to the safe operation of the apparatus, such as by reducing the likelihood of bodily contact with internal components. The body housing 204 can be sized and/or shaped to accommodate a roll of film to be used for securement to containers.

The body portion 200 may contain one or more components of the sealing apparatus 100, such as described herein. With reference to FIG. 2, a plug 209 and corresponding electrical cord may extend out from the body portion 200 and may enable obtaining access to an external power supply (e.g., plug into an external power outlet).

The sealing portion 300 may also contain one or more components of the apparatus 100, such as described herein.

The sealing portion 300 may define a shaped housing 305 that may, for example, define a container receiving volume 329. The container receiving volume 329 may be sized to encourage positioning of a container, such as for insertion into an aperture 325 defined into the sealing portion 300 (shown in FIG. 2). In some embodiments, one or more indicators 327 may be utilized to provide instructions or indications of where to position the container or maneuver the container to cause initiate of forming a seal thereto.

The sealing portion 300 may also comprise a container presence sensor 390, such as formed by a transmitter 391 and receiver 392. Such as further described herein, the container presence sensor 390 may be configured to sense the presence or absence of a container and may be positioned proximate (e.g., just below or within) the aperture 325.

The apparatus 100 may be configured to receive inputs and commands. Such inputs and commands can be effectuated by way of a user interface operatively coupled with the apparatus. Alternatively or additionally thereto, the apparatus can be configured to receive inputs and commands remotely or wirelessly from a user and/or remote electronic devices.

In some embodiments, the sealing portion 300 includes a user interface 310 to receive inputs and commands from a user and/or provide information to the user. The user interface 310 can include a display 311 that may, for example, be a touchscreen display that enables receipt of user input. In some embodiments, the user interface 310 may be formed by one or more other interfaces, such as one or more light emitting diodes, a light, a rotating indicator, sound device, an actuating indicator, a smart device, push button, a lever, a dial, a virtual input on a graphical user interface, or the like.

The user interface 310 may provide various information to a user. For example, the user interface 310 can indicate the status or mode of the apparatus 100. For example, the user interface 310 can indicate that the apparatus 100 is in a ready state, a securing state, a preparing state, or another state. Additionally or alternatively, the user interface 310 can indicate how many cycles the apparatus has performed since reset, the status of adjustable settings, repair information, a warning such as to replace a roll of film therein, ink levels, an error message, and/or other information about the apparatus, as desired. Upon operation of the apparatus 100 for example, the user interface 310 can indicate completion of a sealing cycle.

In some embodiments, the user interface 310 may be configured to display and receive user input, such as one or more user selections. For example, in some embodiments, a user may be able to select and/or provide instructions for the apparatus 100. As an example, the user interface may display printing options for a user to select from for printing on the film (such as with a printer—such as described herein). In some embodiments, the user may enter a desired message for printing on the film. In such embodiments, the resulting sealed lid then includes the user selected message and/or image. As another example, the user may select a desired product that is within the container being sealed. Such a selection may lead to certain operation parameters being applied to the next sealing cycle—such as for use in sealing the corresponding container. For example, for a cold beverage, it may be desirable to include a pierced hole in the seal (e.g., for a straw) and, accordingly, the apparatus 100 may utilize a piercer to pierce such a hole in the film for use in sealing the container with the cold beverage contained therein. Such instruction could be provided through the user interface 310 and/or could be automatically applied (e.g., based on identification of the film, based on selection of a beverage profile, based on the last sealing cycle, etc.).

In some embodiments, and as further discussed herein, the apparatus 100 further includes at least one controller 30 (shown in FIG. 23) that may be positioned therein and/or be configured to cooperate with an external computer or device. The controller 30 can be configured to control operation of the apparatus 100 and/or various components thereof. In some embodiments, the controller 30 may communicate with the user interface 310 such as to receive user input and/or cause presentation of information to the user.

Returning to FIG. 1, the apparatus 100 may include a heat management system, such as within the sealing portion 300 and/or body portion 200. Accordingly, the housing 305 of the sealing portion 300 may include one or more vents 307 for enabling air flow between the inside of the housing 305 and the external environment—such as for managing heat within the housing 305. In some embodiments, the body housing 204 of the body portion 200 may include one or more vents.

FIG. 3 is a cross-sectional side view of the apparatus 100, in accordance with the disclosed subject matter. As depicted, the sealing portion 300 can be positioned at a front of the apparatus 100 and adjacent to the body portion 200. The body portion 200 can be positioned at the back of the apparatus. As further described herein, and with reference to FIG. 4, the body portion 200 can house a supply of film therein, such as a roll of film 500, that can feed into the sealing portion 300 (e.g., along the film path 211).

With reference to FIG. 5, the body cover 205 may be opened (e.g., with respect to the body base 207) to enable removal and/or installation of a roll of film 500. With the body cover 205 in the open position, the roll of film 500 can be positioned on one or more support rollers 210, 215. An arm 255 that includes a pinch roller 230 may be lifted to cause the pinch roller 230 to move from an engaged position (forming a nip 236 with the drive roller 235) to an unengaged position spaced therefrom—enabling feeding of a leading edge of film from the roll of film 500 along the film path 211. Notably, a user may pull the film off the roll of film 500 and position it at least over a drive roller 235. With the film in that position (e.g., along the film path 211), closing of the arm 255 will cause the pinch roller 230 to sandwich the film between itself and the drive roller 235—which together form the nip 236 (shown in FIG. 4). With the film in the nip 236, a motor 213 may operate to cause the roll of film to rotate and/or the film to be pulled off the roll of film 500 and translated along the film path 211. In some embodiments, the arm 255 may be attached (e.g., through an attachment feature 256) to the body cover 204 such that moving the body cover 204 to the open position will cause the arm 255 to also move to the open position.

Returning to FIGS. 3 and 4, the body portion 200 may comprise various components, including for example a first support roller 210 and a second support roller 215, a first pinch roller 230 and a first drive roller 235 (defining a first nip 236 when contacting each other), a piercer 220 with a piercing tip 225, a printer 250, a second pinch roller 230' and a second drive roller 235' (defining a second nip 236'), a motor 213 (such as for operating the first drive roller 235, the second drive roller 235', and/or the first support roller 210), a cutter 214, one or more film sensors 240, an RFID read/write system 595, and one or more controllers 260. Although depicted and described as being in the body portion 200, any of the features can be located in any other suitable location. For example, at least one of the piercer 220, the printer 250, the second nip 236', and the film sensor 240 can be located in the sealing portion 300.

With reference to FIG. 6, an installed roll of film 500 may rest on a first support roller 210 and second support roller 215. That is, the roll of film 500 can rest between the first support roller 210 and the second support roller 215 and be capable of rotation with respect thereto (although other forms of holding the roll of film are contemplated herein, such as with a roll holder). As shown in FIG. 6, the first and second support rollers 210, 215 can support the roll from underneath.

In some embodiments, one or both of the film support rollers 210, 215 is rotated, such as via operation of the motor 213 (e.g., through a belt connection or other drive means, such as a gear). As such, the rotation of one or both of the support rollers 210, 215 may impart rotation to the supported roll of film. Additionally or alternatively, force applied to the leading portion of the film 501 by the first nip 236 and/or second nip 236' may cause the film to be pulled off the roll of film 500—which may impart rotation of the roll of film 500. In some embodiments, one or more of the nips 236, 236' (such as via a corresponding drive roller) may be configured to impart a translating film speed faster than a speed of rotation of the roll of film so as to cause tension in the film being translated through the film path 211. For example, the motor 213 may be configured to cause rotation of the first drive roller 235, the second drive roller 235', and the first support roller 210. In some such embodiments, the motor 213 may impart the same speed of rotation on each the rollers. However, the first drive roller 235 and/or the second drive roller 236 may have a smaller diameter than the first support roller 210 such that the there is tension created along the film path 211—such as because the first drive roller 235 and/or the second drive roller 235' are operating with a faster rate of turn to pull on the film at a faster rate than the support roller 210 forces rotation of the roll of film 500 positioned thereon.

In some embodiments, one or both of the film support rollers 210, 215 is capable of passively rotating, such as with non-negligible resistance. In those embodiments, rotation of the roll of film imparts a rotational force on those such support rollers 210, 215. In still other embodiments, one or both of the support rollers 210, 215 can be prevented from rotating. In such embodiments, lack of rotation causes slippage to occur between one or both of the support rollers 210, 215 and the roll of film 500, imparting rotational resistance to the roll of film, thereby imparting tension in the film between the roll of film and the drive rollers 235, 235'. In this regard, in some embodiments, the controller is configured to operate the motor to cause a different rotation speed to one or more of the drive rollers 235, 235' in comparison to one or more support rollers 210, 215 for the supply of film so as to form tension in the film (which may aid with piercing and/or printing of the film). Although the one or more support rollers are depicted upstream from the sealing portion 300, the one or more support rollers can be positioned at any suitable location along the film path 211.

In some embodiments, at least one of the first drive roller 235, the second drive roller 235', and the first support roller 210 can be mechanically rotated (e.g., via a crank mechanism, a rotational driver, a drive shaft, a drive belt, a drive chain, or any other means of imparting rotational force). In some embodiments, the first drive roller 235, the second drive roller 235', and the first support roller 210 can be driven together by the motor 213, such as via one or more gears or one or more drive belts. In some embodiments, the first pinch roller 230 and the second pinch roller 230' can freely rotate in response to a torque (although in some embodiments, one or more pinch rollers may be driven, such as by one or more motors). For example, torque could be applied by friction between the pinch rollers 230, 230' and the respective rotating drive rollers 235, 235', or by friction between the pinch rollers 230, 230' and the film 501. Notably, while some of the depicted embodiments show a gap between the first pinch roller 230 and the first drive roller 235, some embodiments may enable contact between the first pinch roller 230 and the first drive roller 235. Further, in some embodiments, one or more drive or pinch rollers may be replaced with other drive means, such as a conveyor belt, pull drives, tracks, among other things.

With reference to FIG. 7, the apparatus 100 may also include a printer 250. The printer 250 may be configured to print any suitable information (e.g., messages or images) on the film 501, such as the type of drink or product (or symbol or emoji thereof) disposed within the container (e.g., an example image (e.g., COLA 459) is shown printed on the sealed lid 460 in FIG. 8). The printer 250 can be any suitable type of printer to provide information on film 501. For example, the printer can utilize laser printing, ink jet printing, laser etching, or any other type of printing suitable for film 501.

In some embodiments, the printer 250 can be used to print the same message on film 501 during multiple sealing cycles. Additionally or alternatively, printer 250 can be used to print a message on film 501 depending on an input. For example, the apparatus 100 can further comprise a controller 30 to receive at least one command. The controller 30 can be operatively coupled with the apparatus (e.g., controller 260). Accordingly, the controller 30 can send a signal to the printer 250 to print a determined message on film 501 associated with the at least one command when the at least one command is received. For example, the message can indicate at least one of the type of contents secured within the container, a trademark, a safety message, or any other suitable message. Alternatively or in addition thereto, the printer can be configured to receive commands through a network and wirelessly.

The printer 250 can be positioned at any suitable location within the apparatus and is not limited to placement within the body portion 200. In some embodiments, the printer 250 may be positioned at a specific lateral position along the film path. For example, with reference to FIG. 7, the printer 250 may be configured to print generally on a right half of the film as it passes along the film path 211 (although any lateral position is contemplated and, in some embodiments, the printer 250 may be movable laterally (or longitudinally) along the film path to enable printing anywhere on the film 501). In some embodiments, the printer 250 can be positioned in the sealing portion 300. For example, the printer 250 can be positioned above the sealing volume 301. The printer can be configured to print on film 501 shortly before securement, during securement, or shortly after securement. In some embodiments, a shield plate of the sealing portion may include a printing window through which printer 250 can print a message on film 501.

In some embodiments, such as described herein, the controller may be configured to print one or more messages or icons on the film based on input from an external device/network. For example, the controller may be in communication with a remote device/server and receive instructions or other data that may cause the controller to cause printing on the film, such as using the printer 250. As an example, the sealing apparatus 100 may be in communication with a point-of-sale (POS) system (e.g., the POS system 13 shown in FIG. 23). In such an embodiment, the POS system may receive an order that may include one or more drink orders. In response, the controller 30 of the sealing apparatus 10 may be configured to receive data corresponding to the order and control its operations accordingly, such as by printing a label on the film to indicate the drink order (e.g., "Cola" or "Diet Cola"). In some embodiments, the printed message or image may be customized, such as indicating the customer (e.g., "JOHN'S COLA" 459 in FIG. 8). In such a manner, the corresponding sealed lid may include the appropriately printed data that can be used with fulfilling the order. In some embodiments, the determination as to what to print may occur remotely from the sealing apparatus 10 and communicated thereto, such as at the POS system 13 or some other remote system. An example customized lid 460 with a logo 458 and a printed customized message ("JOHN'S COLA") 459 is shown in FIG. 8. Example systems for use with a point-of-sale system, including example print determinations and data management, may be found in U.S. patent application Ser. No. 16/212,047, entitled "Personalized Food Service Material Printing Systems", which published as U.S. Publication No. 2019/0180392, and which is owned by the Assignee of the present invention and incorporated by reference herein in its entirety.

In some embodiments, the sealing apparatus and/or the components thereof may form part of a beverage forming apparatus or system. For example, the beverage forming apparatus/system may create (e.g., mix, satisfy, dispense, form, etc.) a beverage order, such as pour a cup of soda, water, coffee, or juice, from one or more supplies. In addition to forming the beverage, the beverage forming apparatus/system may employ various components/systems described herein (e.g., a sealing apparatus) in conjunction with creating the beverage such that the beverage is produced to a customer with a sealed lid. In some embodiments, such as described herein, the sealed lid may include one or more identifying messages or images appropriate for the created beverage.

In some embodiments, the controller may be configured, such as in response to certain operation conditions, to have the printer print a specific code on the film to provide one or more indications to an operator, such as the position of a splice, an amount of film remaining in the supply, or other indication. In the case of the splice, this may allow the sealing device to alert the operator that a certain film and/or components within the sealing device may be non-functional (e.g., due to presence of splice). In the case of an amount of film remaining, the operator may be alerted that the sealing apparatus may need a replacement supply of film (e.g., due to an indication of a low amount of film supply remaining).

With reference to FIG. 7, the apparatus 100 may also include a piercer 220 configured to pierce one or more holes in the film 501—such as to create a ventilation hole and/or straw hole for the sealed lid. Example holes 457 formed in a sealed lid 460 are shown in FIG. 8. In some embodiments, the apparatus 100 may include a piercer 220 having one or more protrusions 225 (e.g., tips, blades, etc.). In some embodiments, the piercer and the protrusions are monolithic such that the piercer is actuatable. The protrusions 225 can impart an impression upon (or through) a film to weaken the film at such a location for ventilation and/or for insertion of a drinking straw, for purposes of example. The piercer 220 can actuate the protrusions 225 in any suitable way, for example by electromagnetism via a solenoid, by hydraulics, by a rotating arm actuator, by a linear actuator, or the like. In other embodiments, the entire piercer 220, including protrusions 225, is actuatable with respect to the body portion. In other embodiments, the piercer 220 does not contain protrusions 225. Piercers without protrusions can include, for example, air jets, lasers, blast heaters, or any other suitable piercer. In some embodiments, the piercer 220 may be configured with two or more spaced apart protrusions (e.g., tips, blades, etc.).

The piercer 220 can be positioned at any suitable location in the apparatus including being positioned in the sealing portion 300. In some embodiments, the piercer 220 may be positioned at a specific lateral position along the film path. For example, with reference to FIG. 7, the piercer 220 may be configured to pierce the film generally in the center (laterally) of the film as it passes along the film path 211 (although any lateral position is contemplated). In some embodiments, the piercer 220 can be positioned in the sealing portion 300. The piercer can be configured to pierce film 501 shortly before securement, during securement, or shortly after securement. In some embodiments, the piercer 220 includes a piercing rod coupled to the piercing tip 225, wherein the piercing rod is coaxial with and movable with respect to the guide rod of the securing assembly 400.

In some embodiments, a controller (e.g., controller 30 described with respect to FIG. 23), may be configured to cause actuation of the piercer 220 to cause the perforations or slits to be created in the film, such as it travels along the film path 211. In some embodiments, the controller may be configured to control the relative position of the perforations or slits on the lid, such as based on a desired operational parameter for the anticipated product or the utilized film. In some embodiments, the controller 30 may be configured to determine whether to apply the piercer to the film or not based on user input provided. For example, if a user indicates that the contents of the container are hot, then the controller 30 may operate the piercer to provide the corresponding ventilation holes. In some embodiments, if the user indicates that the contents of the container are cold or not hot, then the controller 30 may operate the piercer so that a hole is provided for use with a straw. In some embodiments, if the user indicates that the contents of the container are not hot, then the controller 30 may not operate the piercer so that no ventilation hole is provided. In some embodiments, if the user indicates that the contents of the container are frozen, then the controller 30 may not operate the piercer so that no hole is provided, as ventilation or use with a straw may not be desired. In some embodiments, the pierced hole may be provided for any temperature of the contents, such as for ventilation and/or use with a straw.

With reference to FIG. 7, the apparatus 100 may also include one or more film sensors 240 configured to detect one or more indicators on the film 501, such as to determine a distance of travel of the film on the film path 211. In this regard, in some embodiments, and as shown in FIG. 7, the film sensor 240 can comprise a film signal emitter 241 and a film signal sensor 242 to detect a film sensor window 510 passing therebetween (although other types of sensors are contemplated). An example sensor window 510 is shown in FIG. 9. The film sensor window 510 positioning can directly correspond to the position of the film as moved past the second nip 236'. The film signal emitter 241 can continuously emit a light signal capable of being detected by the film signal sensor 242. Film 501 can be positioned between the film signal emitter 241 and the film signal sensor 242, such that opaque portions of the film 501 block the light signal where opaque. However, when the film sensor 240 detects a change of the film, such as when detecting a transparent portion/window of the film or a film sensor window 510, the film sensor 240 can send a signal input indicating that the continuous emission of the signal emitter has been disrupted. Accordingly, as the film 501 moves between the film signal emitter 241 and film signal sensor 242, the film sensor window 510 can allow transmission of the light signal to the film signal sensor. The film signal sensor, upon detecting the light signal or a change in the intensity of the light signal, can register that the film 501 has progressed upstream and generate a film sensor input. In other embodiments, a reverse set up can be provided. That is, the film can allow transmission of the light signal to the film signal sensor 242 until it is blocked or partially blocked by the film once the film has progressed. The film signal sensor, upon detecting the reduction of the light signal, can register that the film has progressed and generate a film sensor input to deactivate the drive nip.

In other embodiments, the film sensor 240 can be any sensor suitable for detecting the progression. For example, the film sensor 240 can include at least one of a light sensor as described, a mechanical sensor, a motion sensor, among others. A mechanical sensor can include a rotational sensor that rotates by progression of the film and registers that the film has progressed upon such rotation. For example, a mechanical sensor can register a degree of progression by the amount of rotation. In some embodiments, a rotational sensor can be coupled to the pinch roller 230 to detect rotation thereof.

In some embodiments, the motor 213 can be operated according to input from the film sensor 240. That is, in response to film sensor inputs by the film sensor 240, the drive rollers 235, 235' may have their rotation initiated, continued, or ceased. For example, after a sealing cycle, rotation of drive rollers 235, 235' can be initiated, film sensor 240 can detect progression of film 501, and film sensor 240 can provide a film sensor input. In response to the film sensor input, rotation of drive rollers 235, 235' can be ceased.

With reference to FIG. 10, the apparatus 100 may also include one or more cutters 214 (e.g., film cutters) configured to separate the film 501 (e.g., via one or more cuts), such as to a predetermined length of film (e.g., a portion of the film sized to fit within a loading zone 326 of the sealing portion 300 and designed to be sealed around the top portion of a container). For example, FIG. 10 illustrates an example cutter 214 that includes driving mechanism 216. The predetermined length of film can be sized to cover the top opening of a container to allow the film to be secured to the container for a suitable seal thereon. In some embodiments, the film cutter is positioned along the film path 211 between the loading zone 326 and the second nip 236' comprised of the second drive roller 235' and the second pinch roller 230'. In some embodiments, the film cutter comprises at least one of a guillotine cutter and a shear cutter. Additionally or alternatively, the film cutter can comprise any film separator suitable for separating portions of the film 501 or at least perforating the film to create segments of film. For example, the film cutter can include a rotary cutter, an air jet cutter, a laser cutter, a blast heater cutter, or any other suitable cutter, tear mechanism, or separator.

In some embodiments, a controller (e.g., the controller 30) may be configured to control actuation of the film cutter to cause the portion of the film to be separated (e.g., cut) from the roll of film. As described herein, such control may be based on, for example, a measured distance of travel of the film along a film path 211 and may be based on data conveyed from the one or more film sensors 240.

In accordance with some embodiments, the apparatus 100 can be used in conjunction with any suitable type of film. In operation, once energy-emitting elements are activated and energy is channeled towards the free ends of the film, the free ends of the film change shape and heat shrink about the top portion of the container, such as about a top portion 602 (e.g., a lip) of the container 600, as shown in FIG. 12A and further discussed herein. Suitable films include those that will shrink in the presence of heat or radiant energy. For example, the film can be a plastic wrapping film which has the capability of shrinking when it is heated, and in some cases to near the melting point of the film. These films are commonly manufactured from plastic resins such as polyvinyl chloride (PVC); polypropylene (PP); linear-low density polyethylene (LLDPE); low density polyethylene (LDPE); high density polyethylene (HDPE); copolymers of ethylene and vinyl acetate (EVA); copolymers of ethylene and vinyl alcohols (EVOH); ionomers (e.g., SURLYN™, by E.I. du Pont de Nemours and Company of Wilmington, Del.)); copolymers of vinylidene chloride (e.g., PVDC, cling wrap, etc.); copolymers of ethylene acrylic acid (EAA); polyamides (PA); polyester, polystyrene, nylon and copolymers of ethylene and octene. Additionally or alternatively, the film can be a bi-axially oriented thin shrink film having a thickness of between 40 to 120 gauge (1.02 mm to 3.05 mm). In another embodiment, the film can be a bi-axially oriented thin shrink film having a thickness of between 60 to 100 gauge (1.52 mm to 2.54 mm).

In accordance with some embodiments, the film can further include at least one energy absorbing substance (e.g., a radiation-absorbing layer of ink) on at least part of the film. In some embodiments, the one or more energy absorbing substances can be pre-applied to the film, such as by printing, brushing, spray coating, electrostatic coating, electrodeposition coating, flow coating, roller coating, dip coating, among others. Additionally or alternatively, the substances can be incorporated into the film during formation or manufacture thereof. In other embodiments, the one or more substances can be printed onto the film during operation of the disclosed apparatus. Such substances can allow or enable shrinking of the film at the desired locations to create a suitable seal. In some embodiments, a reduced amount or a lack of such substance in certain sections/positions of the portion of the film may lead to formation of a partial seal at such sections/position, which may, for example, be useful for enabling peeling back of the seal (e.g., for drinking and/or pouring). For example, a pull-tab could be designed into the seal for enabling easy lifting of that portion of the seal. In some embodiments, corresponding instructions for lifting the pull-tab could be provided on the film (and, thus, the seal).

The film can be dimensioned to operate within the confines of the apparatus. In one embodiment, the film can have a width dimension of between approximately 8 and approximately 30 cm. In some embodiments, the film can be cut to a predetermined length dimension of between approximately 8 to approximately 30 cm. In some embodiments, the width and lengths dimensions of the predetermined dimensioned film can be the same. In some embodiments, the predetermined dimensioned film can be square, although other shapes are contemplated herein.

In some embodiments, the film can have a degree of elasticity. As such, when the film is secured to a top of the container and thereafter removed from the container, the removed film generally maintains its shape with respect to the heat shrunk edges, and the film can be reapplied to the top of the container for securement. In some embodiments, the film may be pre-printed prior to installation into the sealing apparatus.

Turning back to FIGS. 3-4, the sealing portion 300 can be configured to enable securing of a portion of the film to a container to form a seal of the container. For example, the sealing portion 300 may comprise various components, including, for example, a loading zone 326, a sealing volume 301, and an aperture 325. In some embodiments, the sealing volume 301 may be contained within a securing assembly 400. In some embodiments, the user interface 310 (or portions thereof) may be housed in the sealing portion 300. Although depicted and described as being in the sealing portion 300, any of the features can be located in any other suitable location, such as within the body portion 200.

With reference to FIG. 11, the loading zone 326 may be sized to receive and hold a portion of the film that is prepared for use during the sealing process. For example, FIG. 4 illustrates an example portion of film 501a that has been separated from the film using the cutter 214 and is waiting in the loading zone 326 for engagement with a top portion of a container (such as described herein).

Referring back to FIG. 11, the sealing portion 300 may include various features/structures to enable or encourage proper positioning of a portion of film 501a within the loading zone 326. For example, the sealing portion 300 may include an entry structure 270 positioned proximate the cutter 214 to aid in holding a side of the portion of the film 501a to prevent it from falling through the aperture 325. The other side of the portion of the film 501a may be held up by one or more ribs 447a-447d that are spaced apart from each other and positioned on the opposite side of the aperture 325 from the entry structure 270.

In some embodiments, two or more of the ribs 447a-447d may define varying heights in order to promote stiffness of the portion of the film 501a in the loading zone 326 so that the portion of the film 501a is spread across the aperture 325 and ready for engagement with a top portion of the container so as to form a complete seal around the top portion of the container. Said differently, the ribs 447a-447d may be designed to cause the portion of the film 501a to maintain a profile that retains it within the loading zone 326 so that it doesn't fall through the aperture 325 and so that edges of the portion of the film 501a extend over the top portion of the container so that the excess film over the edges of the top portion of the container can be secured around the top portion of the container to form the seal (e.g., when heated within the sealing volume 301). In some embodiments, the one or more ribs 447a-447d may increase in height toward a lateral edge of the portion of the film 501a, such as corresponding to the illustrated embodiment of FIG. 11. In such example embodiments, the ribs 447a-447d may impart a desired curvature to the portion of the film 501a that may promote stiffness.

With the portion of the film 501a positioned within the loading zone 326 and ready for securement, a user can insert the container through the aperture 325 and into the sealing volume 301 to obtain a seal for the container. For purposes of illustration, and not limitation, FIGS. 12A-12C show the operation of the apparatus 100 with respect to a representative container 600, such as a disposable beverage cup.

FIG. 12A depicts a portion of film 501a in the loading zone 326 in the sealing portion 300 in a position ready to be secured to a container 600. In order to form a seal over a top portion 602 of the container 600, a user moves the container 600 up into the aperture 325. The top portion 602 of the container 600 pushes against (e.g., engages with) the portion of the film 501a in the loading zone 326 as the top portion 602 of the container 600 moves upwardly and into contact with a shield plate 315 of the securing assembly 400.

With reference to FIG. 12B, the user continues to push the top portion 602 of the container 600 along with the portion of the film 501a upwardly into the sealing volume 301 of the securing assembly 400. The shield plate 315 moves with the top portion 602 of the container into the sealing volume 301. A sensor 421 senses the presence of at least a portion of the container 600 within the sealing volume 301 and a sealing cycle is activated. With reference to FIG. 11 and as further described herein, in some example embodiments, the shield plate 315 moves upwardly along with a shaft 429, and once the shaft 429 and a corresponding sensor trigger 415 reaches a certain position, the sensor 421 senses the sensor trigger 415 as an indication that the at least a portion of the container 600 is within the sealing volume 301. During the sealing cycle, one or more energy-emitting (e.g., heating) elements 340 are activated to cause the portion of the film 501a to seal the top portion 602 of the container 600. For example, extra film from the portion of the film 501a may hang over the top portion 602 (e.g., a lip) of the container 600. The energy-emitting elements 340, when activated, may cause the extra film to shrink around the top portion 602 of the container 600 to form the seal—such as shown in FIG. 12B. As detailed herein, in some embodiments, the energy-emitting elements may be near-infrared light emitting diodes (NIR LEDs), although other energy-emitting elements may be utilized.

FIG. 12C depicts the film 501a secured to the container 600 prior to the apparatus 100 feeding a next portion of film (from along the film path 211) into the loading zone 326. That next portion of film may have been pierced, printed, and then may be cut—similar to or according to different operations—in conjunction with being fed into the loading zone 326 for the next sealing cycle.

FIG. 11A illustrates another example securing assembly 400' where the energy-emitting elements 340' comprise a plurality of NIR LEDs that are mounted on a PCB 343' that is positioned above the shield plate 315 at the top of the sealing volume 301. Notably, the plurality of NIR LEDs 340' face downwardly and are positioned on the PCB 343' in a circle so as to surround the top portion of the container when it is positioned within the sealing volume 301 (although other configurations are contemplated). One or more reflective elements 487 may be positioned within the sealing volume 301 and configured to redirect energy emitted from the plurality of NIR LEDs toward the top portion of the container when it is placed therein. As shown, the reflective elements 487 may define an angled surface that reflects and redirects the energy (e.g., via a mirror, a polished surface, etc.). In this regard, any angle or varying angle of slope is contemplated.

A barrier 488, such as a glass barrier, may be positioned within the sealing volume 301 and above the aperture 325, and configured to receive the shield plate 315 and/or top portion of the container therein. The barrier 488 may provide protection to the sealing volume 301 and various components therein, such as from contents of the container that may splash or spill out. In some embodiments, the barrier 488 is stationary, whereas in other embodiments, the barrier may move, such as with the shield plate 315. In some embodiments, there may be no barrier 488 present. Notably, a similar barrier may be used in other embodiments described herein.

A single large heat sink 341' can be provided opposite the plurality of NIR LEDs 340' to gather heat generated by the apparatus and dissipate the heat based on air flow over the heat sink 341'. Such a single heat sink 341' allows for efficient heat management such as through size of the heat sink and the ability to direct air thereover.

Some potential benefits of example embodiments like that shown in FIG. 11A include enabling increased air flow over the heat sink 341', providing for more space for other components (e.g., the cutter), providing for ease of assembly and/or reduced part count. Further, utilizing reflective elements enables increased optimization for directing energy emitted from the NIR LEDs. Along these lines, in some embodiments, a lens or collimating reflector may be positioned between the NIR LEDs and the reflective element(s)

to further direct the energy emitted from the NIR LEDs, such as prior to be redirected by the reflective element(s).

While the above description of various embodiments details an aperture in which a user places a top portion of a container therethrough, in some embodiments, the sealing volume may be brought down around the top portion of the container. For example, a user may place the container on a surface and one or more components of the sealing volume may be brought down around the top portion of the container to begin the sealing cycle. In such example embodiments, one or more components of the apparatus may be movable, such as with respect to other components and/or the container.

In some embodiments, the apparatus 100 may be configured to automatically present the next portion of film within the loading zone 326 after completion of a sealing cycle. Alternatively, the apparatus 100 may be configured to advance the film and perform various operations (e.g., piercing, printing, etc.) based on instructions provided and, in some such embodiments, may wait for such instructions to be provided (e.g., via the user interface 310, controller 30, and/or remotely) prior to performing the operations and advancing a portion of film into the loading zone 326 for use in a sealing cycle.

In the operating condition where the apparatus 100 automatically advances the film and provides a next portion of film in the loading zone 326 for a next sealing cycle, there is a chance that a user may prematurely try to insert a container into the aperture 325. In such a situation, the advancement of the film into the loading zone 326 may be disrupted. For example, the film may jam or bunch, thereby creating a maintenance issue and wasting film—and likely frustrating the user. As another example, the user may cause some amount of the film to be brought into the sealing volume. This may cause the film to become wrinkled or bent. In some cases, the sealing cycle may be inadvertently triggered, causing a partial seal to be formed—which may waste the film and/or create an undesirable situation for a user that is planning on having a proper seal for the container.

Accordingly, in some embodiments, the apparatus 100 may include a container presence sensor that is configured to sense the presence of the container and stop or prevent advancement of the film into a loading zone. The container presence sensor may be positioned proximate to the aperture 325 and sense the container as it is brought near or within the aperture 325. The container presence sensor may be configured to transmit an indication to the controller 30 to indicate when the container presence sensor senses the container. Accordingly, the controller may receive the indication (e.g., sensor input) from the container presence sensor and cease or prevent advancement of the film into the loading zone—thereby avoiding or limiting the above indicated undesirable scenarios.

An example container presence sensor 390 is shown in FIGS. 2, 13A, and 13B. The container presence sensor 390 includes a transmitter 391 arranged on a first side of the aperture 325 and a corresponding receiver 392 arranged on a second, opposite side of the aperture 325. In this regard, the transmitter 391 is configured to transmit a signal 393 to the receiver 392 across the aperture 325, such as shown in FIG. 13A. However, when a container 600 is brought proximate (e.g., just below or into) the aperture 325, the signal 393 is disrupted at 394 by the container 600 so that it is not received by the receiver 392 (e.g., illustrated in FIG. 13B). Accordingly, the container presence sensor 390 can transmit an indication to the controller that the container is present. In response, the controller can cause operation of the motor to cease or otherwise cease or prevent advancement of the film along the film path 211.

While the above example container presence sensor 390 is a break beam sensor, other forms of sensors are contemplated, such as a reflection sensor, a light curtain sensor, an infrared sensor, a mechanical switch sensor, etc.

Depending on various factors, such as manufacturing and/or handling of the rolls of film, the rolls may not be perfectly straight on their side edge (e.g., the roll of film may be lopsided). To explain, FIG. 14A illustrates a front view of an example lopsided roll of film 700 positioned on an example support roller 710. In this regard, the roll of film 700 is formed by film 701 that is wrapped around the core 702 (shown as broken lines to illustrate its position—although it would be hidden by the film 701 in this view). As the film 701 wraps around the core 702, the diameter of the roll of film 700 increases as each new layer is placed. Whether during roll creation or handling, various layers of film 701 within the roll of film 700 may become skewed laterally (e.g., left and right of the core 702—depending on its relative position to the core 702). For example, FIG. 14A illustrates that a top layer corresponding to the outer circumferential surface of the roll of film 700 has become skewed with a portion 706a (the top part in this view) being skewed to the left laterally and a corresponding portion 706b (the bottom part in this view) being skewed to the right laterally. In this regard, the side edges 700a, 700b of the roll of film 700 define some sort of slope (which is generally linear in FIG. 14, but may be any curve depending on which layers across the radius of the roll of film 700 are skewed and to what degree). Notably, in this view, the center of the roll of film 700 is generally over the center 710c of the support roller 710.

FIG. 14B illustrates a schematic view of the roll of film 700 (broken line 700d illustrates the front edge of the roll of film 700) installed on two support rollers 710, 715 and a top layer of film 701 being pulled off (e.g., by force from two drive rollers 735, 735'), such as similar to various embodiments described herein. As shown, the roll of film 700 is generally positioned in the center of the support roller 710 between a first end 710a and a second end 710b. The film 701 travels along a film path 711 (the bounds of a desired film path are illustrated by two bold dashed lines). Generally, the desired film path 711 has a first end 711a, a second end 711b, and a center 711c. In this regard, there may be one or more components designed to operate at a certain lateral position along the film path 711 (e.g., consider the lateral axis, as indicated by the double arrows LA). For example, the piercer 720 may be designed to pierce the center of the film and, accordingly, may be laterally positioned as such along the film path 711 at its center 711c. Likewise, the printer 750 may be configured to print at a certain lateral position, such as shown.

As the film 701 travels along the film path 711 (e.g., in the machine direction, as indicated by the arrow MD) it is pulled off the roll of film 700—causing the roll of film 700 to rotate on the support rollers 710, 715. However, due to the lopsided nature of the roll of film 700 (e.g., illustrated in FIG. 14A), the center of the roll of film 700 will reposition laterally (e.g., along arrow C in FIG. 15A) as the film 701 is pulled off the roll of film 700. In this regard, FIG. 15A illustrates that the center of the roll of film 700 has moved to the left in the view relative to, for example, the center 710c of the support roller 710.

Referring now to FIG. 15B, such a scenario may have a negative downstream effect on operation of the sealing apparatus. In this regard, in comparison to FIG. 14B, you can see that the film 701 now has come at an angle into the first drive roller 735 and is generally skewed along the lateral axis LA as it travels through the sealing apparatus along the machine direction MD. Accordingly, a center 701c' of the film 701 is offset from the center 711c of the desired film path 711 (as highlighted in 799a). In comparison, looking back at FIG. 14B, the center 701c of that film 701 was aligned with the center 711c of the desired film path 711. With the film 701 misaligned with the desired film path 711, various components of the sealing apparatus may be misaligned and perform their operations in a less desirable position along the lateral axis of the film. For example, the piercer 720 may pierce the film 701 at an offset position. Likewise, the printer 750 may print in an offset position on the film 701. In more extreme cases, the film 701 may bunch and lead to a jam or other maintenance event. Possible bunching could occur, for example, in the area highlighted by 799b, which shows a relatively larger degree at which the film 701 is offset from the desired film path 711.

Notably, although the above described example illustrates an example of a lopsided roll, in some cases a similar problem of the roll of film being off center may be created without the roll of film being lopsided. Such a circumstance may occur for a number of reasons, such as improper installation, vibrations, physical moving of the apparatus, etc. In this regard, such misalignment (whether being from an off center roll and/or a lopsided roll) may lead to misalignment from the desired film path 711.

In some embodiments, a support roller for supporting the roll of film supplying the film to the apparatus may be employed, where the support roller is designed to automatically cause alignment of the film laterally as it is pulled off the roll of film and translated along the film path within the file sealing apparatus. FIG. 16 illustrates an example support roller 210 configured along these lines. Notably, the illustrated support roller 210 is positioned to support a front portion of the roll of film 500 thereon, however, in some embodiments, the support roller 210 may be positioned to support another portion of the roll of film 500. Additionally or alternatively, multiple support rollers 210 can be employed, such as corresponding to the front and back portions of the roll of film 500. As noted herein, in some embodiments, the support roller 210 may be driven by the motor 213 to aid in translating the film from the roll of film 500 along the film path 211.

FIG. 17 illustrates a front view of the support roller 210. The support roller 210 defines a first end 210a, an opposite second edge 210b, and a center 210c. The support roller 210 includes a spindle 217 that is configured to rotate about an axis AsR. The spindle 217 may include a contact surface 218 that has a relatively raised radius such that it is configured to contact and rotate with (or impart rotation) on an outer circumferential surface of a roll of film installed thereon.

The support roller 210 may also include one or more edge shuttles 280a, 280b. In some embodiments, the edge shuttles 280a, 280b are configured to translate relative to the spindle 217. In some embodiments, the edge shuttles 280a, 280b may be configured to rotate freely about the spindle 217. The illustrated support roller 210 includes a first edge shuttle 280a proximate its first end 210a and a second edge shuttle 280b proximate its second end 210b. Notably, however, in some embodiments, only one edge shuttle may be utilized. The edge shuttles 280a, 280b each include a corresponding engagement feature 281a, 281b protruding radially and configured to interact with a corresponding edge of an installed roll of film. In some embodiments, the engagement feature 281a is a flange extending radially from the axis of rotation of the support roller (ASR). For example, with brief reference to FIG. 18A, the engagement feature 281a of the first edge shuttle 280a abuts the first edge 700a of the roll of film 700 installed on the support roller 210. Returning the FIG. 17, the engagement feature 281a includes a tapered surface 283 leading from a top end 283a downwardly to a bottom edge 283b—where the slope of that tapered surface 283 generally leads toward a center 217 of the support roller 210. In this regard, that tapered surface 283 may utilize gravity to aid in redirecting the side edge of the roll of film.

In some embodiments, the edge shuttle 280a, 280b may be configured to not contact the outer circumferential surface of the roll of film. In this regard, the contact surface 218 of the spindle 217 may extend radially further away from the axis of rotation of the support roller ASR than a corresponding surface 288 of the edge shuttle 280a (e.g., illustrated in FIG. 17A).

With reference to FIG. 17A, the support roller 210 further includes at least one biasing element (e.g., springs 285a, 285b, although other biasing elements are contemplated, such as an elastic band, magnets, etc.) corresponding to each edge shuttle 280a, 280b. For example, the first spring 285a is configured to provide a bias to the first edge shuttle 280a to bias translation of the first edge shuttle 280a toward the center 210c of the support roller 210. In this regard, the edge shuttles 280a, 280b are configured to translate laterally along the spindle 217 (e.g., as illustrated by double arrow D). In the illustrated embodiment, the spindle 217 includes a stop feature 218a that is configured to prevent translation of the first edge shuttle 280a further toward the center 210c of the support roller 210 (such as though interaction with a corresponding stop feature 284a of the edge shuttle 280a).

As noted above, and with reference to FIG. 18A, in some cases, a misaligned roll of film 700 may be installed on the support roller 210. Notably, the support roller 210 is configured to maintain alignment of the roll of film and the corresponding film pulled off the roll of film during operation of the motor (and the sealing apparatus 100). In some embodiments, the support roller 210 is configured to passively maintain such alignment (such as without utilizing control signals, etc.). Accordingly, as the roll of film rotates, the edge 700a would come into contact with the engagement feature 281a. Due to the taper of the tapered surface 283 and the force of the spring 285a, the engagement feature 281a will redirect the edge 700a (e.g., along arrow E) into alignment so that the center of the roll of film 700c is aligned with the center 210c of the support roller 210. Accordingly, even after 100-180 degrees of rotation (now with a new portion of the outer circumference of the roll of film 700 contacting the contact surface 218 of the support roller 210), the center 700c of the roll of film 700 will be generally aligned with the center 210c of the support roller 210—thereby generally maintaining downstream alignment of the film 701 along the film path 211. Accordingly, for example, the piercer (which may be in a fixed lateral position) may form the pierced hole in a desired hole position on the film and the printer may print the printed information in a desired printed position on the film (ensuring that a resulting seal has the pierced hole and the printed information in the desired position). Similarly, the cutter may cut the film at a desired orientation/position. Notably, the floating nature of the edge shuttle 280a enables passive alignment as it compensates for the variances in the relative position of the edge of the roll of film.

As described herein, the apparatus 100 may include a securing assembly 400, such as positioned within the sealing portion 300 (e.g., shown in FIGS. 3-4). An example securing assembly is shown in FIGS. 19A and 19B. Notably, while various features/components are described as being within or part of the securing assembly 400, any such features/components may be positioned separately and/or not form part of a securing assembly.

As shown in FIGS. 19A-B, the securing assembly 400 includes a housing 425. The housing 425 may be shaped to contain (at least partially) one or more features/components of the securing assembly 400. Further, the housing 425 may be shaped to provide one or more flow paths for air. For example, the securing assembly 400 may include an outlet 426 that includes fan 304 that may be configured to pull in air from inside the housing 425 (e.g., around the various heat sinks 341 and PCBs) for expulsion of the now heated air to an external environment (such as through a vent 307 shown in FIG. 1). In this regard, the housing 425 may include an inlet 427 that enables air from the external environment to enter into the housing 425. In some embodiments, the direction of air flow may be switched.

Returning to FIG. 11, the securing assembly 400 also includes a shield plate 315 that can move up and down within the housing 425. As described herein, as the shield plate 315 moves upwardly, so does a shaft 429 and corresponding sensor trigger 415. While some embodiments described herein detail that the shield plate 315 moves with the top portion of the container, in some embodiments, the shield plate 315 may be stationary. For example, the shield plate 315 may be positioned above the sealing volume 301.

The shield plate 315 may be positioned above an aperture 325 and lead to a sealing volume 301, such as described herein. Notably, the aperture 325 and/or shield plate 315 may each have a diameter larger than the average diameter of a container, such as a disposable drinking cup. In one embodiment, the diameter can range up to approximately 30 cm, and in one embodiment can be approximately 15 cm. The aperture 325 and/or shield plate 315 can have any suitable shape such as polygonal, square, rectangular, elliptical, rectilinear, ovoid, circular, or irregular. As detailed with respect to FIGS. 21A and 21B, the aperture 325 may be sized to deflect corners of the portion of the film as the top portion of the container is pushed therethrough, such as to position the excess film around a top portion of the container for securement around the top portion (e.g., due to heat shrinking).

Further detail regarding the shaft 429 and sensor trigger 415 attached to the illustrated shield plate 315 is illustrated in FIG. 20. In the illustrated embodiment, the sensor trigger 415 is operatively coupled to the shield plate 315 when the shield plate is embodied as a movable part. As noted above, the sensor trigger 415 can be sensed by the sensor 421 when the top portion of the container (and the shield plate) move to a certain position within the sealing volume—thereby indicating that it is appropriate to begin a sealing cycle. In other examples, such as when the shield plate is embodied as a static part, the sensor 421 can be positioned within the apparatus to sense the presence of the container in the sealing volume 301, such as beyond the aperture 325.

The illustrated sensor 421 includes a signal emitter 423 and a signal sensor 422. The sensor 421 positioning can directly correspond to the position of the shield plate as moved by the container. The signal emitter 423 can continuously emit a signal capable of being detected by the signal sensor 422. The sensor trigger 415 can be positioned between the signal emitter 423 and the signal sensor 422, such that sensor trigger 415 blocks the signal where opaque. However, the sensor trigger 415 can further define a window 415a therein at a predetermined location in order to allow the signal to trigger the signal sensor 422. Accordingly, as the signal trigger 415 moves between the signal emitter 423 and signal sensor 422, the window 415a can allow transmission of the signal to the signal sensor 422. The signal sensor 422, upon detecting the signal, can register that the shield plate 315 has moved to a certain position within the sealing volume 301 and, thus, generate a corresponding sensor input to the controller 30 to indicate that the container is appropriately positioned within the sealing volume 301.

In other embodiments, the sensor 421 can be any sensor suitable for detecting the presence of the container within the sealing volume 301. For example, the sensor can include at least one of a signal sensor as described, a mechanical sensor, a motion sensor, amongst others.

During the sealing cycle, the controller 30 may be configured to activate one or more energy-emitting elements 340 to transmit energy to the portion of the film 501a to cause securement of the film to the container 600 (e.g., radiation-absorbing layers of ink on the film may absorb the energy and shrink around the top portion of the container to form a seal over the top portion of the container). The one or more energy-emitting elements may be any suitable device that can be configured to emanate a suitable amount of energy to cause the film to secure to a container to form a seal thereon. In one example, the at least one energy-emitting element comprises a near-infrared light emitting diode (NIR LED), although in some embodiments a plurality of NIR LEDs are utilized. Other example energy-emitting elements include, but are not limited to, a light bulb (e.g., a tungsten-halogen light bulb), a resistor, a cathode ray tube, a light emitting diode, a carbon filament bulb, a ceramic heater, amongst others. In some embodiments, the energy-emitting element(s) may be chosen/tailored to the specific component of the film which absorbs the radiant heat (e.g., carbon black pigment or other near infrared absorbing pigment/dye which could be a component of the applied coatings/inks). For example, an appropriate energy-emitting element may be chosen that radiates a type of heat that maximizes efficient absorption from the type of film and/or ink/coating thereon for sealing purposes. In some embodiments, two or more different types of energy-emitting elements may be installed in the sealing device and the most efficient/effective type of energy-emitting element may be chosen to operate based on the film that is currently being utilized (such as described with respect to various embodiments herein).

The at least one energy-emitting element 340 can be activated, such as via a controller (e.g., controller 30) to emanate energy. In this regard, the term "emanate" may encompass any type of heat transfer to the film (e.g., conduction, convection, radiation, transfer, etc.). The emanated energy from the at least one energy-emitting element 340 can contact and heat the film, causing it to shrink. For example, energy from the at least one energy-emitting element can contact the film. The shrinkage of the film then causes the film to secure or tightly secure to or around a top portion (e.g., lip, rim, or edge) of a container. In this regard, in some embodiments, the film is not adhered or heat glued to the container, but rather is heat-shrunk around the container. In some embodiments, the film can cooperate with the container to melt and fuse together. For example, the container can include a coating that interacts with the film upon the activation of energy thereto. Though the described example NIR LEDs radiate energy, some embodiments of the present invention contemplate other types of energy-emitting elements that emanate energy via other methods, such as convention, conduction, heat transfer, radiation, etc.

In some embodiments, the apparatus 100 is configured to utilize a plurality of NIR LEDs as the energy-emitting elements for causing securement of the portion of the film to the container within the sealing volume. As used herein, in some embodiments, the NIR LEDs may be configured to operate at a wavelength ranging from 0.75 µm—1.4 µm. Notably, in some embodiments, the film being utilized absorbs radiated energy at 0.94 µm (which falls within the wavelength range of operation of the NIR LEDs). FIG. 20 illustrates an example arrangement of a plurality of NIR LEDs 340. In this regard, the sealing volume 301 is defined by a plurality of NIR LEDs 340 that face toward and at least partially surround the sealing volume 301 so as to face toward and at least partially surround the top portion of the container when present inside the sealing volume 301.

Notably, the use of NIR LEDs as the energy-emitting elements has shown to provide increased sealing efficiency over light bulbs and other energy-emitting elements. For example, testing has shown an increase in overall efficiency to 37.8% when using NIR LEDs versus an overall efficiency of 12.5% when using halogen light bulbs. To explain, and without being bound by theory, some notable differences that may lead to such increased efficiency include, for example, the fact that NIR LEDs provide focused energy whereas light bulbs spread out the energy in 360 degrees. Additional notable benefits include having an increased lifespan versus halogen light bulbs, thereby leading to less maintenance. Further, the NIR LEDs do not flash visible light, as the wavelength of operation is imperceptible to the human eye. Thus, there is no irritation to the user due to a flash of light. A further benefit is that NIR LEDs are mounted to printed circuit boards (PCBs), which allows mounting of heat sinks and thermistors in close proximity to increase effective thermal management options.

The above noted benefits lead to decreased cycle time—thereby enabling more seals to be occur (such as per minute). Another potential benefit is the increased ability to control operation of the power output and/or the specific ones of the NIR LEDs, which allows variation and unique positioning/placement of the NIR LEDs to further increase efficiency when the seal is formed, such as described herein.

In some embodiments, with reference to FIG. 20, the NIR LEDs 340 may be mounted on printed circuit boards (PCBs) 343, such as in rows, and operated to cause formation of the seal. Further, in some embodiments, heat sinks 341 may be mounted opposite the NIR LEDs 340 to draw heat away form the NIR LEDs 340. Referring to FIGS. 20A-B, in some embodiments, there may be a heat sink 341a-h for each PCB. With reference to FIGS. 19A-B, air flow around the heat sinks 341 draws that heat away from the heat sinks 341 and out of the apparatus 100—thereby further enabling heat management and decreasing off time needed for cooling of the NIR LEDs 340.

In some embodiments, one or more temperature sensors (e.g., thermistors 399) may be mounted proximate the NIR LEDs 340, such as on a PCB (and even, in some embodiments, the same PCB). The temperature sensors may provide temperature information to the controller to help know the temperature of the NIR LEDs, which may be used for heat management and to control operation of the NIR LEDs and other components of the apparatus 100. In this regard, in some embodiments, it may be desirable to only operate the NIR LEDs below a certain first (e.g., critical) temperature threshold (e.g., 100° C., 85° C., or another selected temperature). Knowing the temperature of the NIR LEDs may enable the controller 30 to know whether to operate the NIR LEDs or let them cool (such as may occur when the NIR LEDs are not operating). For example, if the temperature of one or more NIR LEDs reaches the first temperature threshold, the controller 30 may cease or prevent operation of the NIR LED(s)—e.g., the specific set of NIR LEDs corresponding to the temperature reading and/or any or all of the NIR LEDs.

In some embodiments, a second (e.g., restart) temperature threshold may be applied, such that the NIR LEDs may not begin operation again until the temperature has dropped below the second temperature threshold (e.g., 75° C., 60° C., or another selected temperature). The second temperature threshold may be below the first temperature threshold to enable room in the temperature range for additional operations before the first temperature threshold is reached. Such "room" would allow for variances (e.g., time between uses) or other features (e.g., operation of the fan) to aid in maintaining a cooler temperature.

In some embodiments, a third (e.g., fan start) temperature threshold may be applied, such that the controller 30 is configured to start operation of the fan once the third temperature threshold is reached. Depending on the configuration of the securing assembly, the third temperature threshold may be any temperature and may correspond, for example, to the second (e.g., restart) temperature threshold (although it need not in some embodiments).

The above noted example temperature thresholds are just some example features and controls that can be applied to aid in heat management of the NIR LEDs in order to maintain operation ability and provide for completion of a desirable number of sealing cycles, such as per minute. In some embodiments, a desirable number of sealing cycles per minute is 8-10, such that the sealing cycle should take no longer than 6 seconds. In this regard, in some embodiments, the controller 30 may be configured to operate the NIR LEDs for less than 2 seconds and allow for 4 seconds of other operations of the apparatus 100 to be performed (e.g., advancing a new portion of film into the loading zone and separating of the portion of film). This would enable initiation of the next sealing cycle. Notably, in conjunction with the 4 seconds of other operations, the apparatus and the NIR LEDS may also benefit from cooling during that time.

In some embodiments, the NIR LEDs may be arranged in a particular manner, such as to provide for efficiency sealing during a sealing cycle. For example, with reference to FIGS. 20A-B, the NIR LEDs may be arranged in rows and two or three rows of NIR LEDs may be mounted on a single PCB. For example, there may be eight PCBs—four PCBs 344a-344d arranged in the sealing volume 301 to face the corners of the portion of the film and four PCBs 346a-346d arranged in the sealing volume 301 to face the edges of the portion of the film.

The four PCBs 344a-344d arranged to face the corners of the portion of the film may each include three rows 348a-348c of NIR LEDs totaling 19 NIR LEDs (though any number of NIR LEDs and rows can be used). Such NIR LEDs of a corner facing PCB 344a-344d may be referred to herein as the corner NIR LEDs 345a-d. Referring to FIGS. 21A-B, it can be seen that the corner NIR LEDs (on the corner PCBs 344a-344d) face the corners 511a-d of the portion of the film 501a (which is, in the illustrated example, a rectangular shape (such as including a square shape)) when it is brought into the sealing volume 301 to cause securing of the film that overhangs the perimeter of the top portion 602 of the container near the corners 511a-d. While the above example illustrates a rectangular shape, other shapes of the portion of film are contemplated and may be formed, such as utilizing one or more film separators described herein.

The four PCBs 346a-346d arranged to face the edges of the portion of the film may each include two rows 349a-349b of NIR LEDs totaling 13 NIR LEDs (though any number of NIR LEDs and rows can be used). Such NIR LEDs of an edge facing PCB 346a-346d may be referred to herein as the edge NIR LEDs 347a-d. Referring to FIGS. 21A-B, it can be seen that the edge NIR LEDs (on the edge PCBs 346a-346d) face the edges 513a-d of the portion of the film 501a (e.g., proximate a center point along each edge 513a-d) when it is brought into the sealing volume 301 to cause securing of the film that overhangs the perimeter of the top portion 602 of the container near the edges 513a-d.

It can be seen that there is more extra (e.g., excess) film that overhangs the perimeter of the top portion 602 of the container in the corners 511a-d beyond the extra film that overhangs the perimeter of the top portion 602 of the container near the edges 213a-d. Accordingly, in some embodiments, to account for the additional extra material and provide increased energy to that area, additional NIR LEDs are positioned on the corner PCBs 344a-344d (e.g., there are three rows 348a-348c with 19 total NIR LEDs as compared to two rows 349a-349b and 13 total NIR LEDs on the edge PCBs 346a-346d). Additionally, in some embodiments, as noted below, the controller 30 may be configured to operate the corner NIR LEDs 345a-d according to different operation characteristics (e.g., different power output and/or different time of operation (amount and/or position of time in the sealing cycle)) than the edge NIR LEDs 347a-d in order to, for example, account for the additional extra film near the corners 511a-d of the portion of the film 501a. For example, the controller 30 may operate the corner NIR LEDs 345a-d to provide more energy than the edge NIR LEDs 347a-d during a sealing cycle.

As noted above, an example benefit of utilizing NIR LEDs is the ability to vary operation to adjust energy output, such as by varying an operation characteristic of one or more of the NIR LEDs (e.g., utilize different power output and/or different time of operation (amount and/or position of time in the sealing cycle)). In this regard, in some embodiments, depending on the circumstance (e.g., type of film, desired sealing cycle duration, temperature of the NIR LEDs, characteristics of the contents of the container, the type or shape of the container, among many other things), the operation of the NIR LEDs can be customized and/or adapted. For example, only some of the NIR LEDs may be operated. Additionally or alternatively, the power output may vary for one or more of the NIR LEDs during the sealing cycle (e.g., full power for 1 second and half power for 1 second, although any suitable variation is contemplated). In this regard, for example, the controller 30 may be configured to operate the NIR LEDs according to different operation profiles that may correspond to, for example, specific film that is installed (which may be determined from identification information via, for example, the RFID read/write system described herein or through user input, such as provided by the user interface).

In some embodiments, the NIR LEDs may be arranged to provide for increased efficiency of securing of the film to the container. For example, with reference to FIGS. 22-22A, the NIR LEDs may be positioned in two or more rows on a PCB. For example, the edge PCB 346c may include a top row 349a of NIR LEDs and a bottom row 349b of NIR LEDs (e.g., at different vertical positions). Similarly, the corner PCB 344c may include a top row 348a of NIR LEDs, a middle row 348b of NIR LEDs, and a bottom row 348c of NIR LEDs (e.g., at different vertical positions). In some embodiments, one or more of the rows may be aligned with the anticipated plane corresponding to the top portion of the container. For example, that plane may be designed to align with (e.g., match, fall just above, or fall just below) the top row 349a of NIR LEDs and the top row 348a of NIR LEDs. This would leave the bottom row 349b, the middle row 348b, and the bottom row 348c of NIR LEDs below the top portion of the container—which may correspond to where the film will heat shrink to itself to secure around the top portion of the container. In such a regard, the controller 30 may be configured to operate the rows differently to achieve securement. For example, the rows falling below the top portion of the container may be operated according to a higher power output than the rows at or above the top portion of the container. Additionally or alternatively, the amount of time of the operation of the rows falling below the top portion of the container may be greater than the amount of time of the operation of the rows at or above the top portion of the container. In such example embodiments, certain portions of the film may receive additional energy.

In some embodiments, the apparatus 100 may include a film identification system that is configured to determine (e.g., sense, read, compare, etc.) identification information and/or supply information regarding an installed roll of film. Accordingly, in some embodiments, the film may include one or more identification indicia associate therewith. For example, the film may include a radio frequency identification (RFID) tag suitably positioned or attached to the roll of the film (e.g., at an end of the film, on the core of the film, etc.) that includes identification information and/or supply information that can be read therefrom. In some embodiments, the RFID tag can be configured to enable writing of information thereto, such as from a corresponding RFID read/write system. Additionally or alternatively, the film may include one or more markings that can be read (e.g., along the film, such as near an edge). The markings may be unique to the film or type of film and may correlate to identification information and/or supply information. Some example markings include unique marking patterns, bar codes, quick response (QR) codes, among others.

The identification information may enable identification of the type of film and/or desired products to be produced from the film. Accordingly, the controller 30 of the apparatus 100 may be configured to determine corresponding desired operation of various features/components of the apparatus 100 when such film is installed in the apparatus 100. The supply information may include, for example, the amount of film remaining on the roll.

In some embodiments, with reference to FIG. 6, the apparatus 100 may include an RFID read/write system 595 positioned proximate the installed roll of film 500. The RFID read/write system 595 may be configured to read from and write to an RFID tag 598 of the installed roll of film 501 (e.g., the RFID tag 598) is positioned on the core 502 of the roll of film. Accordingly, the RFID read/write system 595 may read identification data (e.g., corresponding to an unique or semi-unique identification of the film or roll) and/or supply data (e.g., corresponding to supply information, such as the amount of film remaining on the roll) from the RFID tag 598 and provide it to the controller 30.

In some such example embodiments, the apparatus 100, such as through the RFID read/write system 595, may write to the RFID tag 595 to update the information stored therein. For example, the controller 30 may determine the amount of film remaining on an installed roll of film 500. This can be accomplished in many different ways. For example, the controller 30 may keep track of a count of the number of times the controller 30 has advanced film into the loading zone 325 and cut the film. With a known or estimated starting amount of film on the installed roll of film, the controller 30 may be able to estimate the amount of film remaining (e.g., the number of portion of film remaining—which may also correspond to a distance). Notably, the starting amount of film on a roll of film may, for example, be read from an RFID tag associated with the roll of film. In some embodiments, one or more film amount sensors may be utilized, such as a weight sensor, roll radius sensor (e.g., mechanical paddle, line-of-sight sensor, infrared sensor, etc.), or other sensor used to determine a size of the roll or an amount of film remaining on the roll (e.g., the size of the roll of film decreases as film is removed therefrom).

With knowledge of the amount of film remaining on the installed roll of film, the controller 30 may be configured to utilize the RFID read/write system 595 to update the supply data of the RFID tag 598 with the current estimated amount of film remaining on the roll of film—thereby keeping an updated amount of film remaining with the roll. In that way, if the roll of film is moved to a new apparatus or re-installed (such as after swapping it out with a different roll of film—perhaps for a different product), then the apparatus 100 could read the amount of film remaining for the roll and could keep track accordingly. Such information could be used to help inform a maintainer of the current amount of film on the roll (e.g., the controller could continue to keep track from that point or determine the amount of film remaining as indicated above). In some embodiments, various thresholds of film remaining could be used to inform the maintainer of the amount of film remaining on the roll. For example, when 10% of the roll is remaining, the user interface 310 may provide a corresponding message or indication and/or a message or indication could be provided in other ways (e.g., remotely, audibly, etc.). In some embodiments, additional or different thresholds are contemplated. In some embodiments, automatic or semi-automatic re-order functionality can be employed to automatically order new rolls of film and/or set-up such orders for approval by the maintainer.

In some embodiments, the RFID read/write system 595 may be configured to read identification information from the RFID tag 598 of the installed roll of film 500. In some such example embodiments, the identification information may be used to control operation of the apparatus 100, such as by enabling and/or disabling various features/components of the sealing apparatus. Such functionality may help ensure that proper sealing of the containers is occurring.

For example, the controller 30 may be configured to access a database (such as in memory) of approved identification data (e.g., corresponding to the identification data read from the RFID tag 598) and determine if the detected identification data is approved. Then, if approved, the apparatus 100 and/or various functions/components (e.g., such as described herein) of the apparatus 100 may be enabled for use. If unapproved, the apparatus 100 and/or various functions/components (e.g., such as described herein) of the apparatus 100 may be disabled or altered. Additionally, reports of the approved or unapproved film usage may be provided to a remote server for data generation and use (e.g., re-ordering, maintenance, etc.). In this regard, the controller 30 may affect operation by enabling operation, disabling operation, or changing (e.g., revise) operation of the apparatus 100 and/or one or more components of the apparatus 100. For example, the controller 30 may enable/disable/change power transfer to the apparatus 100 (or its components); enable/disable/change operation of the motor 213, enable/disable/change operation of the energy-emitting element(s) 340, enable/disable/change operation of the printer 250, enable/disable/change operation of the piercer 220, and/or enable/disable/change operation of other various components. In some embodiments, the current or future sealing cycle of the apparatus may be affected.

As an example, if the detected identification information is not approved, the controller 30 may cause one or more components to operate in a reduced or hindered capacity to discourage further use of the unauthorized film. For example, the controller 30 may decrease a speed of operation of the motor 213, cause the film to misalign with the top portion of the container, decrease a power output or amount of time of operation of the at least one energy-emitting element 340, cause the printer 250 to print one or more messages or images in an offset position on the film, cause the printer 250 to print one or more messages indicating that an unapproved film is being utilized, increase a delay time between sealing cycles performed by the apparatus 100, or cause the piercer 220 to pierce the film in a undesired location. As more examples, the controller may cause an increased or over anticipated amount of film to be used to cause faster depletion of the unauthorized supply of film and/or misalignment of features to provide a less desirable end product.

In some embodiments, the identification information may be read and used to provide information (e.g., characteristics) relevant to the installed film. For example, various characteristics of the film (e.g., thickness, pre-printed information, etc.) may be determined and/or various desired operational parameters of the apparatus during use with the film (e.g., how long to activate the energy-emitting element(s), what to print on the film, whether or not to pierce the film, etc.) may be determined. For example, an installed roll of film may have a thickness that would require a longer than normal time of operation for the energy-emitting element(s) to remain active for providing a sealed lid. Similarly, the planned seal may be printed with a lighter ink that may require a different than normal amount of time of operation for the energy-emitting element(s) to remain active for providing a sealed lid.

For example, in response to determining identification information, the controller 30 may further determine and cause a desired operation of one or more components of the apparatus. As an example, the controller may cause the at least one energy-emitting element 430 to operate according to at least one of a specific amount of time or a specific power output based on the determined one or more characteristics (e.g., the specific film may require a certain heat for proper shrinkage and sealing). As another example, the controller may cause the motor 213 to operate according to at least one of a specific amount of time or according to a specific number of detected markings based on the determined one or more characteristics (e.g., the film may correspond to a specific product and/or may be designed for use with a specifically-sized container—which may lead to a desire to provide a portion of film of a specific length. As yet another example, the controller may cause the piercer 220 to operate based on the determined one or more characteristics (e.g., the associated product may not require the piercer to operate or it may be desirable to utilize the piercer to provide a slit/perforation in a specific location or of a specified dimension). As yet another example, the controller may cause the printer 250 to operate based on the determined one or more characteristics, such as by printing one or more messages or images on the film based on the determined one or more characteristics (e.g., the associated product that is utilized with the film may be associated with a certain logo to be printed on the film). In addition to the above examples, other example operations/features that would be controllable are contemplated, such as providing a delay between sealing cycles, controlling the fan air flow, controlling the motor operation speed, controlling which ones and how many energy-emitting elements to activate, controlling the user interface, among many others.

Example System Architecture

FIG. 23 illustrates an example system/environment in which some example embodiments of the present invention may be employed. The system 1 may include an example sealing apparatus 10 (such as described herein). The sealing apparatus 10 may comprise hardware and/or software capable of performing functions described herein. In this regard, the apparatus 10 may include a roll of film 9 (although the film may be in stacks in some embodiments) that includes a leading edge that extends through the sealing apparatus along a film path 7. Additionally, the apparatus 10 may include a controller 30 (e.g., controller 260), a motor 22, a memory 32, a communication interface 34, a user interface 36, an identification (ID) system 37, a fan 33, a container sensor 26, and a power source 39. Further, the apparatus 10 may include a printer 50, a piercer 20, a nip 23, one or more film sensors 25, a cutter 27, and a sealing portion 11 that are positioned along the film path 7. The sealing portion 11 may include a shield plate 15, a sensor 42, one or more energy-emitting elements 40, and one or more temperature sensors 31. A user may position a container 6 within the sealing portion 11 to cause sealing thereof. In this regard, various described components and features of the example system 1 may correspond to components and features described herein, such as with respect to apparatus 100 (among the other described embodiments). Notably, while some components/features are described within certain parts of the apparatus 100 and not others, it is contemplated that any components or features can be positioned anywhere in the system 1.

The controller 30 may be any suitable means configured to execute various programmed operations or instructions stored in a memory device such as a device or circuitry operating in accordance with software or otherwise embodied in hardware or a combination of hardware and software, thereby configuring the device or circuitry to perform the corresponding functions of the controller 30 as described herein. In this regard, the controller 30 may be configured to receive (such as via the communication interface 34 or user interface 34) and/or determine (such as based on sensor data) one or more instructions for operating one or more components of the apparatus 10. In this regard, the controller 30 may be connected to and control or cause operation of the user interface 36, memory 32, communication interface 34, motor 22, printer 50, piercer 20, film sensor(s) 25, cutter 27, shield plate 15, a sensor 42, energy-emitting element(s) 40, temperature sensor(s) 31, a fan, a container sensor 26, and an ID system 37. Though shown as a single controller, in some embodiments, various separate controllers (whether alone or in communication with each other) may perform functions described herein.

The one or more motors 22 may be used to drive (e.g., through rotation or otherwise) the nip(s) 23 (e.g., the drive roller) to cause advancement of the film from the roll of film 9 along the film path 7. In some embodiments, the controller 30 may be configured to operate the motor 22 accordingly.

The printer 50 may be configured to print on the film. In some embodiments, the printer 50 includes ink that enables the printing, such as provided from one or more ink cartridges, tanks, reservoirs, etc. In some embodiments, the controller 30 may be configured to instruct the printer 50 to cause printing of various messages and/or images.

The piercer 20 may be configured to pierce one or more holes into the film along the film path 7. In some embodiments, the controller 30 may operate the piercer 20 to cause the piercer 20 to move toward and puncture the film and/or the film to move toward the piercer 20 accordingly.

The nip(s) 23 may be formed of a drive roller and a pinch roller, such as described herein. The film path 7 may include multiple nips, which can be used to create tension in the film and drive translation of the film along the film path 7. As detailed herein, other film transportation means and/or variations of drive and pinch rollers may be utilized.

The film sensor(s) 25 may be configured to detect one or more markings on the film, such as described herein. The film sensor(s) 25 may be configured to provide the sensor data to the controller 30, such as described herein.

The cutter 27 may be configured to operate to separate one or more portions of the film from a remainder of the film, such as in response to instruction from the controller 30.

The container sensor 26 may be configured to sense the presence of the container, such as proximate an aperture leading to the sealing portion 11, such as described herein. The container sensor 26 may be configured to provide sensor data to the controller 30.

The shield plate 15 may be configured to provide a shielded surface for positioning of the container 6 within the sealing portion 11. The shield plate 15 may provide physical resistance and/or heat dispersion or other characteristic to aid in sealing of the container 6. In some embodiments, the shield plate 15 may connect with or interact with the sensor 42 to indicate that the container 6 is properly positioned in the sealing volume so that the sealing cycle can begin.

The energy-emitting element(s) 40 may be configured to operate, such as based on instructions from the controller 30 or other sensor assembly, such as described herein. In particular, in some embodiments, the energy-emitting element(s) 40 may be configured to emanate energy to cause shrinkage of the film to or around the top portion of the container 6 to form a sealed lid thereon. In some embodiments, the formed seal may be configured to be absolute. In other embodiments, the formed seal may be configured to be partial such that a portion of the top container is unsealed or lightly sealed. In such an example embodiment, a user may be able to drink from the unsealed portion and/or peel back the unsealed or lightly sealed portion (e.g., to facilitate drinking therefrom and/or pouring therethrough).

The sensor 42 may be configured to sense the presence of the container inside the sealing volume and provide corresponding sensor data to the controller 30, such as to initiate the sealing cycle.

One or more temperature sensor(s) 31 may be utilized to determine the temperature within the sealing volume and/or for one or more of the energy-emitting elements 40, such as described herein. The temperature sensor(s) 31 may provide the sensor data to the controller 30.

The fan 33 may be configured to pull in air from an external environment to aid in heat management within the apparatus 10. The controller 30 may control operation of the fan 33, such as described herein.

The ID system 37 may be configured to read information from the roll of film, such as from the film directly or an associated tag. In some embodiments, an RFID tag is associated with the roll of film 9 and can be read from and written to by the ID system 37, such as described herein.

The memory 32 may be configured to store instructions, computer program code, approved marking schemes and/or characteristics, and other data/information associated with the apparatus 10 in a non-transitory computer readable medium for use, such as by the controller 30.

The communication interface 34 may be configured to enable connection to external systems (e.g., an external network 12 and/or one or more other system(s)/device(s), such as another apparatus 10). In some embodiments, the communication interface 34 may comprise one or more transmitters configured to transmit, for example, one or more signals according to example embodiments described herein. Likewise, the communication interface 34 may include at least one receiver configured to, for example, receive data according to example embodiments described herein. In some embodiments, the transmitter and receiver may be combined as a transceiver. In this regard, the apparatus 10 may be configured for wired and/or wireless communication. In some embodiments, the communication interface 34 may comprise wireless capabilities for WiFi, Bluetooth, or other wireless protocols. In some embodiments, the apparatus 10 may be connected to one or more point-of-sale (POS) system(s) 13 to aid in performance of food orders (such as by forming sealing lids for use with an order).

The user interface 36 may be configured to receive input from a user and/or provide output to a user. The user interface 36 may include, for example, a display, a keyboard, keypad, function keys, mouse, scrolling device, input/output ports, touch screen, or any other mechanism by which a user may interface with the system. Although the user interface 36 is shown as being directly connected to the controller 30 and within the apparatus 10, the user interface 36 could alternatively be remote from the controller 30 and/or apparatus 10. Likewise, in some embodiments, other components of the apparatus 10 could be remotely located.

The power source 39 may be any suitable type of power source, such as a battery (or batteries) and/or an external power source (e.g., a plug 209 may be used to receive power from an outlet). Power from the power source 39 may be used to provide power to any of the components/devices utilized in the apparatus 10.

Example Flowchart(s)

Embodiments of the present invention provide methods, apparatuses and computer program products for operating example sealing apparatuses according to various embodiments described herein. Various examples of the operations performed in accordance with embodiments of the present invention will now be provided with reference to FIGS. 24-27.

FIG. 24 illustrates a flowchart according to an example method for operating an example sealing apparatus according to an example embodiment. Notably, while FIG. 24 provides a flow of various operations, the order of occurrence of the operations is not meant to be limited to that illustrated in FIG. 24 and may vary within embodiments of the present invention. In some embodiments, however, the order of operations and/or certain operations may be necessary, where others may be optional—such as corresponding to described embodiments herein. The operations illustrated in and described with respect to FIG. 24 may, for example, be performed by, with the assistance of, and/or under the control of one or more of the components of example systems/device described herein, such as apparatus 10, 100 among other things.

The method 1000 may include sensing a top portion of a container (e.g., via a shield plate) within the sealing portion at operation 1002. At operation 1004, the method may include activating one or more energy-emitting element(s) to cause sealing of the film to a container. At operation 1006, the method may include printing on the film, such as including one or more messages or images. Then, the method may include piercing the film with a piercer at operation 1008. The method may further include operating the motor to cause advancement of the film along the film path at operation 1010. At operation 1012, the method may include sensing one or more markings on the film. Then, at operation 1014, the method may cause ceasing operation of the motor to position portion of the film in the sealing portion. Next, at operation 1016, the method may include cutting the film, thereby putting the sealing device back into a ready status.

As noted above, in some embodiments, different orders of operations of FIG. 24 may occur in various embodiments described herein. For example, the printing and/or piercing may occur before the energy-emitting elements are activated. Likewise, the printing and/or piercing may occur after the motor has operated to advance the film. In some embodiments, the operations may occur at the same time (e.g., the piercing may occur while the motor is operating to advance the film, the sensing may occur while the motor is operating to advance the film, etc.).

FIG. 25 illustrates a flowchart according to an example method for preventing a feeding error within an example sealing apparatus according to an example embodiment. FIG. 25 provides a flow of various operations, the order of occurrence of the operations is not meant to be limited to that illustrated in FIG. 25 and may vary within embodiments of the present invention. In some embodiments, however, the order of operations and/or certain operations may be necessary, where others may be optional—such as corresponding to described embodiments herein. The operations illustrated in and described with respect to FIG. 25 may, for example, be performed by, with the assistance of, and/or under the control of one or more of the components of example systems/device described herein, such as apparatus 10, 100 among other things.

The method 1100 may include sensing the presence of the container, such as proximate an aperture leading to a sealing volume, at operation 1102. Then, at operation 1104, the method may include ceasing or preventing operation of the motor to cease or prevent advancement of the film—such as into the loading zone. In some embodiments, when the presence of the container is no longer sensed, the operation of the motor may resume or be enabled.

FIG. 26 illustrates a flowchart according to an example method for reading from and writing to an RFID tag of a roll of film installed in an example sealing apparatus according to an example embodiment. FIG. 26 provides a flow of various operations, the order of occurrence of the operations is not meant to be limited to that illustrated in FIG. 26 and may vary within embodiments of the present invention. In some embodiments, however, the order of operations and/or certain operations may be necessary, where others may be optional—such as corresponding to described embodiments herein. The operations illustrated in and described with respect to FIG. 26 may, for example, be performed by, with the assistance of, and/or under the control of one or more of the components of example systems/device described herein, such as apparatus 10, 100 among other things.

The method 1200 may include reading an RFID tag, such as to gather supply data therefrom, at operation 1202. At operation 1204, the method may include operating the motor to cause advancement of the film, such as into the loading zone. At operation 1206, the method may include determining an updated remaining amount of film on the installed roll of film, such as by accounting for a count of uses by the controller. Then, the method may include writing the updated remaining amount of film onto the RFID tag at operation 1208.

FIG. 27 illustrates a flowchart according to an example method for operating an example sealing apparatus utilizing an RFID tag associated with an installed roll of film according to an example embodiment. FIG. 27 provides a flow of various operations, the order of occurrence of the operations is not meant to be limited to that illustrated in FIG. 27 and may vary within embodiments of the present invention. In some embodiments, however, the order of operations and/or certain operations may be necessary, where others may be optional—such as corresponding to described embodiments herein. The operations illustrated in and described with respect to FIG. 27 may, for example, be performed by, with the assistance of, and/or under the control of one or more of the components of example systems/device described herein, such as apparatus 10, 100 among other things.

The method 1300 may include reading an RFID tag, such as to gather identification data therefrom, at operation 1302. At operation 1304, the method may include determining the identification information and a corresponding mode of operation of the one or more features/components of the apparatus 100. For example, various operation of various features/components may be disabled, enabled, and/or changed/revised. Then, at operation 1306, the method includes operating according to the determined identification information, such as in accordance with the corresponding mode of operation.

FIGS. 24-27 illustrates an example flowchart of a system, method, and computer program product according to various example embodiments described herein. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory and executed by, for example, the controller 30. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

Conclusion

Many modifications and other embodiments of the inventions set forth herein may come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. An apparatus for securing a film to a container, the apparatus comprising:
   a body portion to house film;
   a sealing portion comprising:
      a sealing volume for receiving a top portion of the container;
      a plurality of near-infrared light emitting diodes (NIR LEDs) positioned within the sealing volume so as to at least partially surround the top portion of the container when the top portion of the container is positioned within the sealing volume;
      a sensor configured to sense when the top portion of the container is at least partially positioned within the sealing volume; and
      a loading zone sized to receive a portion of film from the body portion and position the portion of the film for insertion into the sealing volume with the top portion of the container; and
   a controller configured to:
      receive sensor input from the sensor indicating that the top portion of the container is at least partially positioned within the sealing volume;
      cause, in response thereto, activation of at least one of the plurality of NIR LEDs to secure the portion of the film to the top portion of the container;
      operate the at least one of the plurality of NIR LEDs for a sealing cycle to secure the portion of film to the top portion of the container; and
      adjust the energy output of at least one first NIR LED of the plurality of NIR LEDs relative to at least one second NIR LED of the plurality of NIR LEDs during the sealing cycle such that an operation characteristic of the at least one first NIR LED is different than the at least one second NIR LED, wherein the operation characteristic is at least one of an amount of time of operation or a power output.

2. The apparatus of claim 1, wherein the portion of the film defines a rectangular shape with four sides and four corners, wherein the top portion of the container defines a circular shape with a perimeter, wherein the four corners of the portion of the film extend past the perimeter of the circular shape of the top portion a greater distance than a center point along each of the four sides such that there is a relative excess of film past the top portion at each of the four corners, wherein the at least one of the plurality of NIR LEDs comprise at least a first set of edge NIR LEDs and a second set of corner NIR LEDs, wherein the first set of edge NIR LEDs is positioned within the sealing volume proximate at least one center point of one side of the portion of the film, wherein the second set of corner NIR LEDs is positioned within the sealing volume proximate at least one corner of the portion of the film, wherein, during the sealing cycle, the controller is configured to operate the first set of edge NIR LEDs differently than the second set of corner NIR LEDs.

3. The apparatus of claim 2, wherein, during the sealing cycle, the controller is configured to operate the second set of corner NIR LEDs to provide a greater amount of energy to the portion of the film than the first set of edge NIR LEDs so as to provide increased energy to the corners of the portion of the film to encourage increased film shrinking at the corners of the portion of the film.

4. The apparatus of claim 3, wherein the controller is configured to operate the second set of corner NIR LEDs for a greater amount of time of operation or at a greater power output than the first set of edge NIR LEDs.

5. The apparatus of claim 3, wherein the first set of edge NIR LEDs is positioned within the sealing volume proximate each center point of the four sides of the portion of the film, and wherein the second set of corner NIR LEDs is positioned within the sealing volume proximate each corner of the portion of the film.

6. The apparatus of claim 1, wherein the top portion of the container defines a plane corresponding to a container lip, wherein the at least one of the plurality of NIR LEDs comprise at least a first set of NIR LEDs and a second set of NIR LEDs, wherein the first set of NIR LEDs is positioned within the sealing volume at a first vertical position corresponding to the plane corresponding to the container lip when the top portion of the container is positioned within the sealing volume, wherein the second set of NIR LEDs is positioned within the sealing volume at a second vertical position, wherein the second vertical position is below the first vertical position, wherein, during the sealing cycle, the controller is configured to operate the first set of NIR LEDs differently than the second set of NIR LEDS.

7. The apparatus of claim 6, wherein, during the sealing cycle, the controller is configured to operate the second set of NIR LEDs to provide a greater amount of energy to the portion of the film than the first set of NIR LEDs so as to provide increased energy below the container lip to encourage increased film shrinking below the container lip.

8. The apparatus of claim 7, wherein the controller is configured to operate the second set of NIR LEDs for a greater amount of time of operation or at a greater power output than the first set of NIR LEDs.

9. The apparatus of claim 1, wherein the controller is configured to operate the at least one of the plurality of NIR LEDs according to one of a plurality of operation profiles during the sealing cycle to secure the portion of film to the top portion of the container, wherein the plurality of operation profiles include at least a first operation profile and a second operation profile, wherein an operation characteristic of the first operation profile is different than the second operation profile, wherein the operation characteristic is at least one of an amount of time of operation of one or more of the plurality of NIR LEDs or a power output of the one or more of the plurality of NIR LEDs.

10. The apparatus of claim 9 further comprising an identification sensor configured to sense identification data associated with the film housed in the body portion, and wherein the controller is configured to determine, based on the identification data, to operate the at least one of the plurality of NIR LEDs according to the first operation profile during the sealing cycle.

11. The apparatus of claim 9 further comprising a user interface configured to receive user input, wherein the controller is configured to determine, based on the user input, to operate the at least one of the plurality of NIR LEDs according to the first operation profile during the sealing cycle.

12. The apparatus of claim 1, wherein the controller is configured to operate the at least one of the plurality of NIR LEDs for less than 2 seconds during the sealing cycle to achieve securement of the portion of the film to the top portion of the container.

13. The apparatus of claim 1, wherein the at least one of the plurality of NIR LEDs comprise at least a first set of NIR LEDs and a second set of NIR LEDs, wherein the first set of NIR LEDs is mounted to a first printed circuit board, wherein the second set of NIR LEDs is mounted to a second printed circuit board, wherein the first printed circuit board includes a first thermistor configured to measure temperature corresponding to operation of the first set of NIR LEDs, wherein the second printed circuit board includes a second thermistor configured to measure temperature corresponding to operation of the second set of NIR LEDs.

14. The apparatus of claim 13, wherein the controller is configured to prevent or adjust operation of the at least one of the plurality of NIR LEDs in an instance in which the first thermistor or the second thermistor indicate that a temperature is greater than a temperature threshold.

15. The apparatus of claim 13, wherein the first printed circuit board further includes a first heat sink, and wherein the second printed circuit board further includes a second heat sink.

16. The apparatus of claim 13 further comprising a fan configured to circulate air around the plurality of NIR LEDs, wherein the controller is configured to operate the fan in an instance in which the first thermistor or the second thermistor indicate that a temperature is greater than a temperature threshold.

17. The apparatus of claim 1, wherein each of the plurality of NIR LEDs operates at a wavelength ranging from 0.75 µm-1.4 µm.

18. The apparatus of claim 1, wherein the body portion comprises a support roller configured to hold a roll of film thereon, wherein the support roller comprises:

a spindle configured to rotate about an axis, wherein the spindle comprises a contact portion that is configured to contact an outer circumferential surface of the roll of film;

an edge shuttle configured to translate along the axis between a first position and a second position, wherein the edge shuttle defines an engagement feature configured to interact with an edge of the roll of film; and a biasing element configured to bias the edge shuttle toward a center of the support roller.

19. The apparatus of claim 1, wherein the film is housed as a roll of film, wherein the roll of film comprises a radio frequency identification (RFID) tag, wherein the RFID tag includes supply data comprising a remaining amount of supply of the roll of film, wherein the apparatus further includes an RFID read/write system configured to read the supply data from the RFID tag when the roll of film is housed in the body portion,
wherein the controller is configured to:
determine an updated remaining amount of supply on the roll of film; and
cause the RFID read/write system to update the supply data on the RFID tag of the roll of film with the updated remaining amount of supply on the roll of film.

20. An apparatus for securing a film to a container, the apparatus comprising:
a body portion to house film;
a sealing portion comprising:
a sealing volume for receiving a top portion of the container, wherein the top portion of the container defines a circular shape with a perimeter;
a plurality of near-infrared light emitting diodes (NIR LEDs) positioned within the sealing volume so as to at least partially surround the top portion of the container when the top portion of the container is positioned within the sealing volume;
a sensor configured to sense when the top portion of the container is at least partially positioned within the sealing volume; and
a loading zone sized to receive a portion of film from the body portion and position the portion of the film for insertion into the sealing volume with the top portion of the container, wherein the portion of the film defines a rectangular shape with four sides and four corners, wherein the four corners of the portion of the film extend past the perimeter of the circular shape of the top portion a greater distance than a center point along each of the four sides such that there is a relative excess of film past the top portion at each of the four corners; and
a controller configured to:
receive sensor input from the sensor indicating that the top portion of the container is at least partially positioned within the sealing volume;
cause, in response thereto, activation of at least one of the plurality of NIR LEDs to secure the portion of the film to the top portion of the container,
wherein the at least one of the plurality of NIR LEDs comprise at least a first set of edge NIR LEDs and a second set of corner NIR LEDs, wherein the first set of edge NIR LEDs is positioned within the sealing volume proximate at least one center point of one side of the portion of the film, wherein the second set of corner NIR LEDs is positioned within the sealing volume proximate at least one corner of the portion of the film; and
operate, the at least one of the plurality of NIR LEDs for a sealing cycle to secure the portion of film to the top portion of the container, wherein, during the sealing cycle, the controller is configured to operate the first set of edge NIR LEDs differently than the second set of corner NIR LEDs.

21. The apparatus of claim 20, wherein, during the sealing cycle, the controller is configured to operate the second set of corner NIR LEDs to provide a greater amount of energy to the portion of the film than the first set of edge NIR LEDs so as to provide increased energy to the corners of the portion of the film to encourage increased film shrinking at the corners of the portion of the film.

22. The apparatus of claim 21, wherein the controller is configured to operate the second set of corner NIR LEDs for a greater amount of time of operation or at a greater power output than the first set of edge NIR LEDs.

23. The apparatus of claim 21, wherein the first set of edge NIR LEDs is positioned within the sealing volume proximate each center point of the four sides of the portion of the film, and wherein the second set of corner NIR LEDs is positioned within the sealing volume proximate each corner of the portion of the film.

24. An apparatus for securing a film to a container, the apparatus comprising:
a body portion to house film;
a sealing portion comprising:
a sealing volume for receiving a top portion of the container, wherein the top portion of the container defines a plane corresponding to a container lip;
a plurality of near-infrared light emitting diodes (NIR LEDs) positioned within the sealing volume so as to at least partially surround the top portion of the container when the top portion of the container is positioned within the sealing volume, wherein the at least one of the plurality of NIR LEDs comprises at least a first set of NIR LEDs and a second set of NIR LEDs, wherein the first set of NIR LEDs is positioned within the sealing volume at a first vertical position corresponding to the plane corresponding to the container lip when the top portion of the container is positioned within the sealing volume, wherein the second set of NIR LEDs is positioned within the sealing volume at a second vertical position, wherein the second vertical position is below the first vertical position;
a sensor configured to sense when the top portion of the container is at least partially positioned within the sealing volume; and
a loading zone sized to receive a portion of film from the body portion and position the portion of the film for insertion into the sealing volume with the top portion of the container; and
a controller configured to:
receive sensor input from the sensor indicating that the top portion of the container is at least partially positioned within the sealing volume;
cause, in response thereto, activation of at least one of the plurality of NIR LEDs to secure the portion of the film to the top portion of the container; and
operate, the plurality of NIR LEDs for a sealing cycle to secure the portion of film to the top portion of the container, wherein, during the sealing cycle, the controller is configured to operate the first set of NIR LEDs differently than the second set of NIR LEDs.

25. The apparatus of claim 24, wherein, during the sealing cycle, the controller is configured to operate the second set of NIR LEDs to provide a greater amount of energy to the portion of the film than the first set of NIR LEDs so as to provide increased energy below the container lip to encourage increased film shrinking below the container lip.

26. The apparatus of claim 25, wherein the controller is configured to operate the second set of NIR LEDs for a greater amount of time of operation or at a greater power output than the first set of NIR LEDs.

27. An apparatus for securing a film to a container, the apparatus comprising:
a body portion to house film;
a sealing portion comprising:
a sealing volume for receiving a top portion of the container;

a plurality of near-infrared light emitting diodes (NIR LEDs) positioned within the sealing volume so as to at least partially surround the top portion of the container when the top portion of the container is positioned within the sealing volume;

a sensor configured to sense when the top portion of the container is at least partially positioned within the sealing volume; and a loading zone sized to receive a portion of film from the body portion and position the portion of the film for insertion into the sealing volume with the top portion of the container; and a controller configured to:
receive sensor input from the sensor indicating that the top portion of the container is at least partially positioned within the sealing volume;

cause, in response thereto, activation of at least one of the plurality of NIR LEDs to secure the portion of the film to the top portion of the container; and operate the at least one of the plurality of NIR LEDs according to one of a plurality of operation profiles during a sealing cycle to secure the portion of film to the top portion of the container, wherein the plurality of operation profiles include at least a first operation profile and a second operation profile, wherein an operation characteristic of the first operation profile is different than the second operation profile, wherein the operation characteristic is at least one of an amount of time of operation of one or more of the plurality of NIR LEDs or a power output of the one or more of the plurality of NIR LEDs.

28. The apparatus of claim 27, further comprising an identification sensor configured to sense identification data associated with the film housed in the body portion, and wherein the controller is configured to determine, based on the identification data, to operate the at least one of the plurality of NIR LEDs according to the first operation profile during the sealing cycle.

29. The apparatus of claim 27, further comprising a user interface configured to receive user input, wherein the controller is configured to determine, based on the user input, to operate the at least one of the plurality of NIR LEDs according to the first operation profile during the sealing cycle.

30. An apparatus for securing a film to a container, the apparatus comprising:
a body portion to house film;
a sealing portion comprising:
a sealing volume for receiving a top portion of the container;

a plurality of near-infrared light emitting diodes (NIR LEDs) positioned within the sealing volume so as to at least partially surround the top portion of the container when the top portion of the container is positioned within the sealing volume, wherein the at least one of the plurality of NIR LEDs comprises at least a first set of NIR LEDs and a second set of NIR LEDs, wherein the first set of NIR LEDs is mounted to a first printed circuit board, wherein the second set of NIR LEDs is mounted to a second printed circuit board, wherein the first printed circuit board includes a first thermistor configured to measure temperature corresponding to operation of the first set of NIR LEDs, wherein the second printed circuit board includes a second thermistor configured to measure temperature corresponding to operation of the second set of NIR LEDs;

a sensor configured to sense when the top portion of the container is at least partially positioned within the sealing volume; and a loading zone sized to receive a portion of film from the body portion and position the portion of the film for insertion into the sealing volume with the top portion of the container; and a controller configured to:
receive sensor input from the sensor indicating that the top portion of the container is at least partially positioned within the sealing volume; and cause, in response thereto, activation of at least one of the plurality of NIR LEDs to secure the portion of the film to the top portion of the container.

31. The apparatus of claim 30, wherein the controller is configured to prevent or adjust operation of the at least one of the plurality of NIR LEDs in an instance in which the first thermistor or the second thermistor indicate that a temperature is greater than a temperature threshold.

32. The apparatus of claim 30, wherein the first printed circuit board further includes a first heat sink, and wherein the second printed circuit board further includes a second heat sink.

33. The apparatus of claim 30, further comprising a fan configured to circulate air around the plurality of NIR LEDs, wherein the controller is configured to operate the fan in an instance in which the first thermistor or the second thermistor indicate that a temperature is greater than a temperature threshold.

* * * * *